United States Patent
Adiletta et al.

(10) Patent No.: US 11,237,840 B2
(45) Date of Patent: Feb. 1, 2022

(54) ALL IN ONE MOBILE COMPUTING DEVICE

(71) Applicant: Intel Corporation, Santa Clara, CA (US)

(72) Inventors: Matthew J. Adiletta, Bolton, MA (US); Myles Wilde, Charlestown, MA (US); Michael F. Fallon, Tiverton, RI (US); Amit Kumar, Marlborough, MA (US); Chengda Yang, Auburndale, MA (US); Aaron Gorius, Upton, MA (US); William R. Wheeler, Southborough, MA (US)

(73) Assignee: Intel Corporation, Santa Clara, CA (US)

( * ) Notice: Subject to any disclaimer, the term of this patent is extended or adjusted under 35 U.S.C. 154(b) by 818 days.

(21) Appl. No.: 16/091,201

(22) PCT Filed: Apr. 26, 2016

(86) PCT No.: PCT/US2016/029389
§ 371 (c)(1),
(2) Date: Oct. 4, 2018

(87) PCT Pub. No.: WO2016/176219
PCT Pub. Date: Nov. 3, 2016

(65) Prior Publication Data
US 2020/0326955 A1 Oct. 15, 2020

Related U.S. Application Data

(60) Provisional application No. 62/152,929, filed on Apr. 26, 2015.

(51) Int. Cl.
*G06F 9/00* (2006.01)
*G06F 9/4401* (2018.01)
(Continued)

(52) U.S. Cl.
CPC .......... *G06F 9/4408* (2013.01); *G06F 1/1632* (2013.01); *G06F 1/1684* (2013.01);
(Continued)

(58) Field of Classification Search
CPC .... G06F 9/4408; G06F 1/1632; G06F 1/1684; G06F 13/4081; G06F 9/4406; G06K 19/042
(Continued)

(56) References Cited

U.S. PATENT DOCUMENTS 5,568,634 A * 10/1996 Gordons ............... G06F 3/0601
711/103
5,935,228 A * 8/1999 Shinomura ........... G06F 13/102
710/302

(Continued)

OTHER PUBLICATIONS

International Preliminary Report on Patentability for PCT Patent Application No. PCT/US2016/029389, dated Oct. 31, 2017, 9 pages.

(Continued)

*Primary Examiner* — Volvick Derose
(74) *Attorney, Agent, or Firm* — Compass IP Law PC

(57) ABSTRACT

All in one mobile computing devices and methods performed by the devices. The all in one mobile computing device includes a processor, memory, and software instructions configured to be executed on the processor to enable the mobile computing device to perform various operations. The all in one device may include various wired and wireless interfaces that enable it to communicate with a wide-range of devices, including smartphones, tablets, laptops, personal computers, smart TVs, and others. The all in one device is capable of being remotely accessed when linked in communication with a second device, and is enabled to aggregate data from various user devices and cloud-based services to create unified data resources. Data that is accessed by the (Continued)

device may be synched with a cloud-based storage service to enable a user to access data from across a range of devices via the all in one device. The all in one device has a form factor that is approximately the size of a credit card, yet is capable of running a full-fledged desktop operating system.

14 Claims, 52 Drawing Sheets

(51) Int. Cl.
  *G06F 1/16* (2006.01)
  *G06F 13/40* (2006.01)
  *G06K 19/04* (2006.01)
(52) U.S. Cl.
  CPC ....... *G06F 13/4081* (2013.01); *G06K 19/042* (2013.01); *G06F 9/4406* (2013.01)
(58) Field of Classification Search
  USPC .......................................................... 713/2
  See application file for complete search history.

(56) References Cited

U.S. PATENT DOCUMENTS

| | | | | |
|---|---|---|---|---|
| 6,275,933 | B1* | 8/2001 | Fine | G06F 21/34 |
| | | | | 713/2 |
| 6,427,177 | B1* | 7/2002 | Chang | G06F 9/4411 |
| | | | | 710/10 |
| 6,769,036 | B1* | 7/2004 | Cortopassi | G06F 21/34 |
| | | | | 710/15 |
| 7,191,275 | B2* | 3/2007 | Arackal | G06F 13/4081 |
| | | | | 710/262 |
| 7,477,919 | B2 | 1/2009 | Warren | |
| 8,453,063 | B1* | 5/2013 | Hendry | G06F 3/1431 |
| | | | | 715/761 |
| 2002/0068618 | A1* | 6/2002 | Shoobridge | H04B 1/1027 |
| | | | | 455/574 |
| 2002/0147924 | A1* | 10/2002 | Flyntz | G06F 21/32 |
| | | | | 726/4 |
| 2003/0051178 | A1* | 3/2003 | Liu | G06F 1/3281 |
| | | | | 713/300 |
| 2003/0191931 | A1* | 10/2003 | Yonemura | G06F 9/4406 |
| | | | | 713/1 |
| 2004/0003307 | A1* | 1/2004 | Tsuji | G06F 1/3209 |
| | | | | 713/310 |
| 2004/0230710 | A1 | 11/2004 | Goodman | |
| 2005/0055591 | A1* | 3/2005 | Cho | G06F 1/3203 |
| | | | | 713/320 |
| 2006/0149977 | A1* | 7/2006 | Cooper | G06F 1/325 |
| | | | | 713/300 |
| 2007/0185648 | A1* | 8/2007 | Gretton | G01C 21/34 |
| | | | | 701/430 |
| 2008/0059782 | A1* | 3/2008 | Kruse | G06F 8/63 |
| | | | | 713/1 |
| 2009/0034211 | A1 | 2/2009 | Doczy et al. | |
| 2009/0168493 | A1* | 7/2009 | Kim | G11C 5/02 |
| | | | | 365/148 |
| 2009/0276509 | A1 | 11/2009 | Huang | |
| 2009/0300251 | A1 | 12/2009 | Lu | |
| 2011/0016248 | A1* | 1/2011 | Takahashi | G06K 7/0008 |
| | | | | 710/301 |
| 2012/0023598 | A1* | 1/2012 | Mulcahy | G06F 21/85 |
| | | | | 726/32 |
| 2012/0196571 | A1* | 8/2012 | Grkov | H04W 12/126 |
| | | | | 455/411 |
| 2015/0309951 | A1* | 10/2015 | Breakstone | G05B 11/01 |
| | | | | 710/313 |
| 2016/0246751 | A1* | 8/2016 | Cai | G06F 13/4081 |
| 2016/0335220 | A1* | 11/2016 | Breakstone | G06F 13/4282 |

OTHER PUBLICATIONS

International Search Report and Written Opinion for PCT Patent Application No. PCT/US2016/029389, dated Jul. 26, 2016, 11 pages.

* cited by examiner

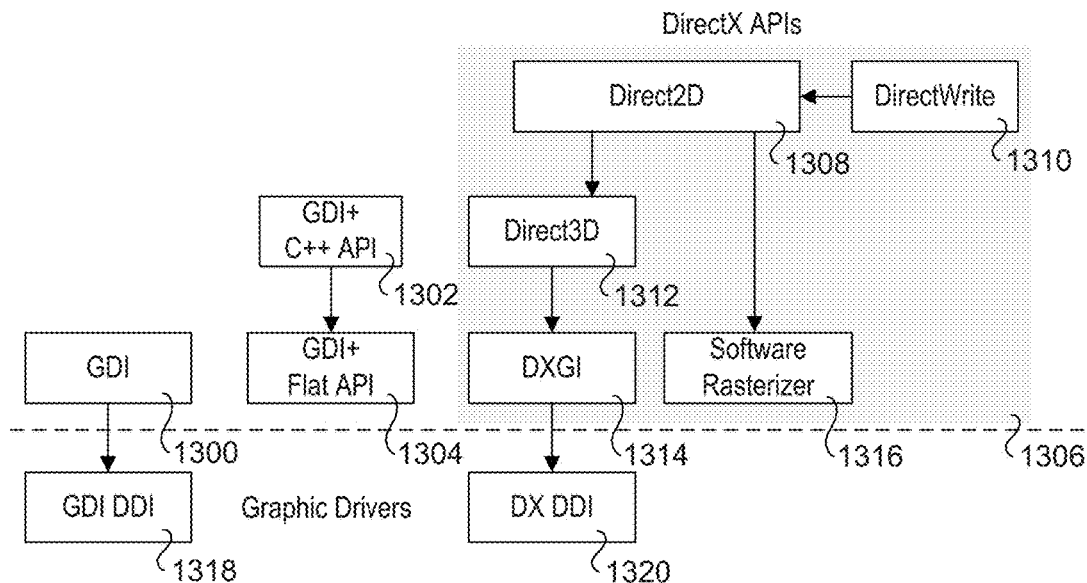
*Fig. 13* *(prior art)*
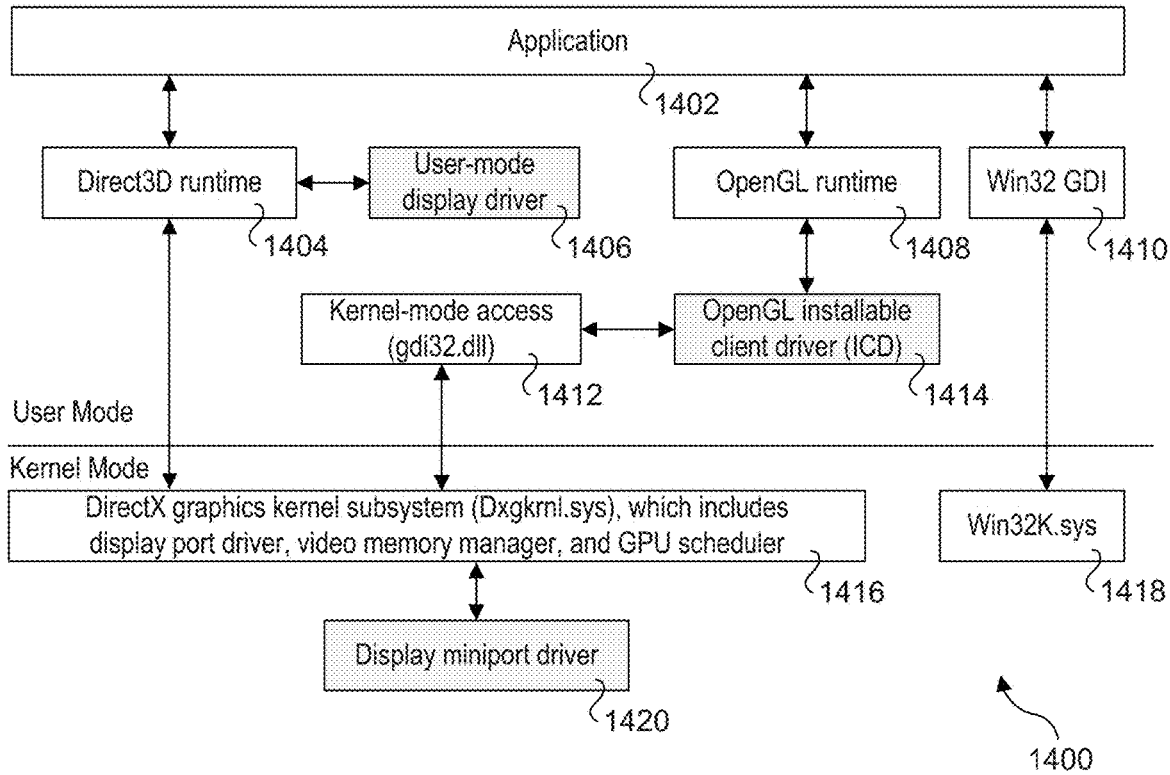
*Fig. 14* *(prior art)*

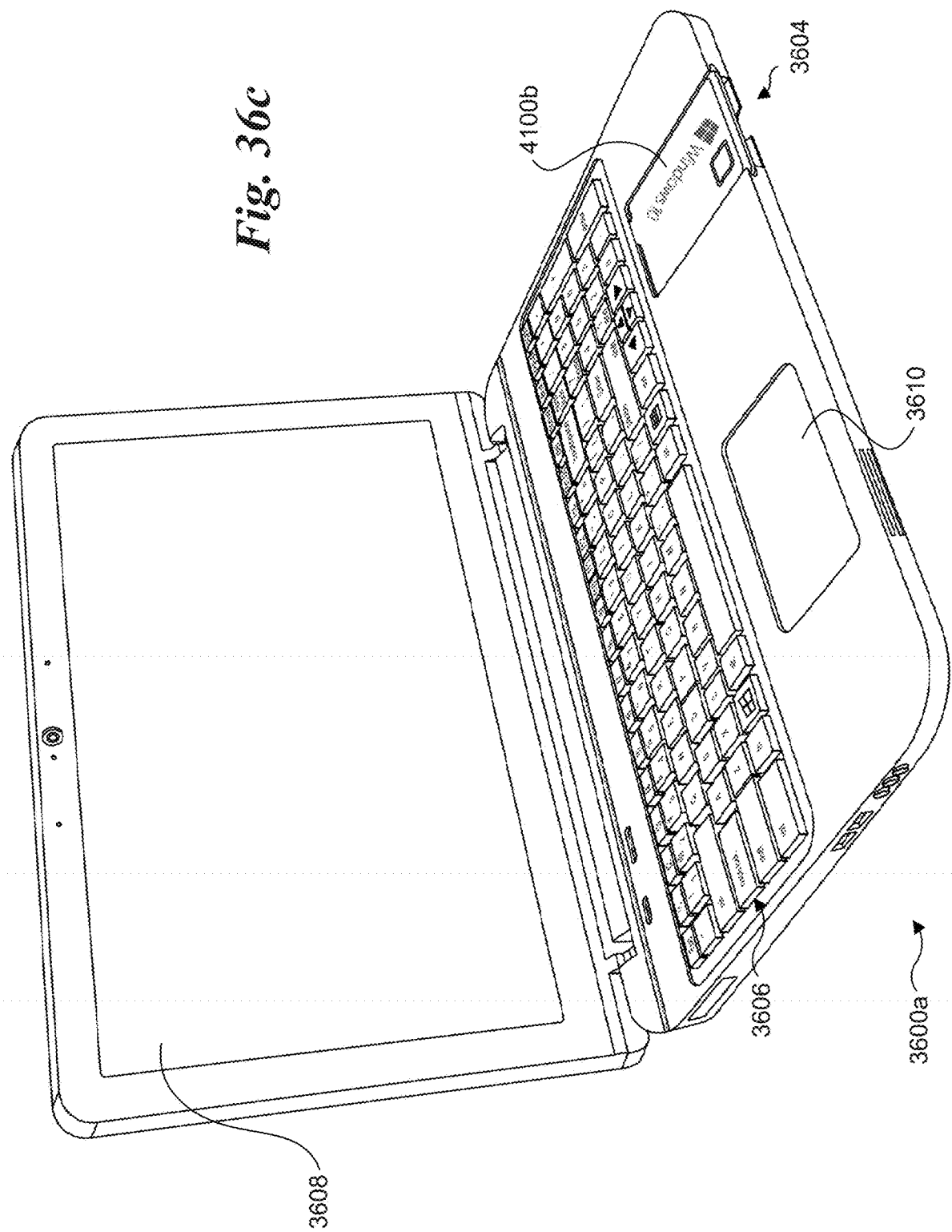

ALL IN ONE MOBILE COMPUTING DEVICE

CROSS-REFERENCE TO RELATED APPLICATION

This patent application is a U.S. National Phase Application under 35 U.S.C. Section 371 of International Application No. PCT/US16/29389, filed on Apr. 26, 2016, entitled "ALL IN ONE MOBILE COMPUTING DEVICE" which claims benefit of provisional 62/152,929, filed on Apr. 26, 2015, which is hereby incorporated herein by reference in its entirety and for all purposes.

BACKGROUND INFORMATION

In today's ever-connected society, it is common for users to have several devices that are used for specialized purposes. For example, users typically have a smartphone for voice and electronic communication and entertainment (as well as other purposes), at least one desktop, laptop, notebook or similar type of computer for work and/or personal tasks, and may further have a tablet, netbook, or Chromebook that is used (generally) for accessing the Internet, watching videos, etc. Each of these devices provide means for connecting to the Internet and accessing data from various sources and repositories.

Software and device manufacturers have been targeting universal platforms and seamless environments, but so far have come woefully short in reaching their objectives. For example, Microsoft has been pushing for a unified platform around Windows 8 (and soon to be Windows 10) under which various classes of devices (desktop/laptop, smartphone, and tablet) share a similar user interface (UI) and provide a similar user experience (UX). The Windows 8 paradigm of using a tile-based UI that is inherently designed for use with touch-based user input has not been well-received by the business community, which is entrenched with using Microsoft productivity software applications and networking services. In particular, UI functionality, such as the start menu used in Windows 7, was stripped out of Windows 8, but added back in (with some limitations) in Windows 8.1 after a huge level of user complaints. Worse yet, for Microsoft, is the market share for Windows Phones is hovering around 2-3% in the United States, with slightly higher penetration in other markets. Microsoft's Surface tablets have a similar irrelevant market share. In view of the dominance of Android and Apple's iOS devices in the smartphone and tablet markets, it is very unlikely Microsoft will ever gain much traction in these markets. Conversely, it is likely Microsoft will continue to dominate in the business and consumer software and operating system markets.

Another aspect that is being addressed by various companies is universal access to data. This is typically facilitated via "cloud"-based data facilities, such as provided by Google (e.g., Google Docs and Google Drive), Microsoft (Office 365 and SkyDrive), Apple (iCloud), Dropbox, and others. On one hand, cloud-based data facilities provide some level of universal access to at least some user data. However, this is not without problems. Notably, you need to have access to the Internet-hosted facilities just to access the data; no Internet access means no data access. In addition, there are issues with network latencies and security concerns. While Microsoft emphasizes Office 365's ability to access documents from multiple devices, from an actual usage standpoint it is primarily being used as a subscription service for accessing Microsoft Office's productivity applications on a single device using local storage of application document data rather than using cloud-storage of the documents produced and accessed by the applications.

In addition to the foregoing, users generally prefer to have data accessed directly from their devices, a usage model under which the user has more control over their own data. First, this is what users have grown accustom to over the years, and the thought of relying on someone else to protect their data is a bit unsettling. Second, the real-time interaction provided by cloud-based applications, such as Google Docs, is less than optimal, even with a fast network connection. While Google has done a great job of implementing productivity application functionality via web pages (a daunting technical task), there is nothing like using an application running directly on your device.

Having data stored on users' devices has its own drawbacks. First, data may be stored on a different device that is currently not available to the user (e.g., left at home or at work). Second, it is very common to replicate the same data across multiple devices, wasting storage resources. For example, it is very common for iPhone and iPad users to replicate photos and videos across multiple devices, such as having the same photos on an iPhone/iPad and in iPhoto on an Apple Mac computer. While Apple has attempted to address this through the use of its iCloud service, they amount of storage space occupied by the photos in videos typically exceed the amount of iCloud storage offered per user for free, and users are reluctant to pay for the extra storage. Thus, every synching or backup operation just results in further replication of data.

To a large degree, usage models in the foreseeable future will reflect those in the recent past. A typical user will still use his or her Android or iPhone mobile phone for purposes those devices excel in, while using a desktop or laptop computer (often hooked to a second display) for productivity tasks, and possibly using other devices (tablets, netbooks, etc.) for leisure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 12a is a combination schematic and message flow diagram illustrating an embodiment that throws native Android graphics commands and content to a remote Android device using multiple sockets;

FIG. 13 is a block diagram illustrating Windows graphics APIs and display driver interfaces;

FIG. 14 is a block diagram illustrating Windows software components for facilitating Windows rendering operations;

FIG. 36c shows an isometric perspective of one embodiment of a single-slot clamshell host apparatus;

DETAILED DESCRIPTION

Figure 1:
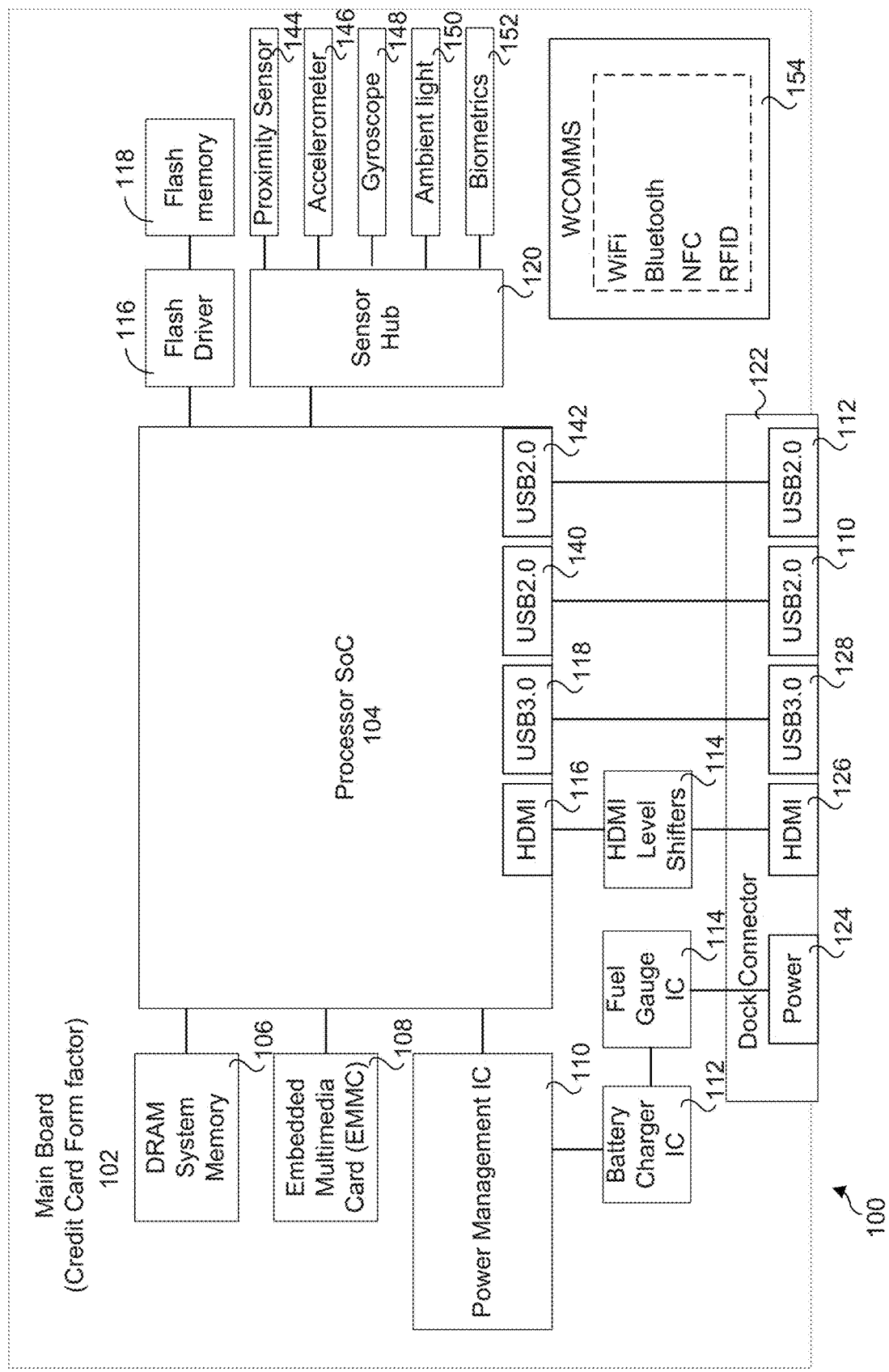
FIG. 1 is a block schematic diagram illustrating functional blocks for a computing card, according to one embodiment.

Embodiments of all in one mobile computing devices and associated methods enabled by the computing cards are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The terms, "communications network," and "communications networks" are interchangeably used herein to refer to one or more systems and/or methods for sending and/or receiving a data signal. These terms encompass short range communication and long range communication. As an option, communication between computing card 100 and Android host device 102 may be via a wireless Wi-Fi connection or a BLUETOOTH® wireless link. In respective embodiments, the wireless Wi-Fi connection is a Wi-Fi Direct link, an INTEL® Wireless Display (WiDi) connection, an INTEL® WiGig connection. The term, "short range communication" is used herein to refer to systems and methods for wirelessly sending/receiving data signals between devices that are relatively close to one another. Short range communication includes, for example, communication between devices using a BLUETOOTH® network, a personal area network (PAN), near field communication (NFC), radio frequency identification (RFID), ZigBee networks, an INTEL® Wireless Display (WiDi) connection, an INTEL® WiGig (wireless with gigabit capability) connection, millimeter wave communication, ultra-high frequency (UHF) communication, combinations thereof, and the like. Short range communication may therefore be understood as enabling direct communication between devices, without the need for intervening hardware/systems such as routers, cell towers, internet service providers, and the like.

In contrast, the term, "long range communication" is used herein to refer to systems and methods for wirelessly sending/receiving data signals between devices that are a significant distance away from one another. Long range communication includes, for example, communication between devices using Wi-Fi, a wide area network (WAN) (including but not limited to a cell phone network (3G, 4G, etc. and the like), the Internet, a global positioning system (GPS), a television whitespace network, combinations thereof and the like. Long range communication may therefore be understood as enabling communication between devices through the use of intervening hardware/systems such as routers, cell towers, television whitespace towers, internet service providers, combinations thereof, and the like.

As used in any embodiment herein, the term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are stored in nonvolatile memory devices, including devices that may be updated (e.g., flash memory). "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a client device or an authentication device.

For the sake of clarity and ease of understanding, the present disclosure often describes mobile computing devices and screens as including one or more modules stored in a memory, wherein the module(s) include(s) computer readable instructions which when executed by a processor of the pertinent device (mobile computing device or screen), cause the device to perform various operations. It should be understood that such descriptions are exemplary, and that mobile computing devices and screens may be configured to perform operations described in association with one or more modules in another manner. By way of example, the mobile computing devices and screens described herein may include logic that is implemented at least in part in hardware to cause the performance of one or more operations consistent with the present disclosure, such as those described in association with various modules identified herein. In this regard, it is noted that "logic" as used herein may include discrete and/or analog circuitry, including for example, a general-purpose processor, digital signal processor (DSP), system on chip (SoC), state machine circuitry, hardwired circuit elements, application specific integrated circuits, combinations thereof, and the like.

The use of mobile devices such as cellular phones, smart phones, tablet personal computers, and laptop personal computers has increased dramatically. In view of the widespread adoption of these mobile technologies, microprocessor developers are increasingly focusing on the development of processors that exhibit both high performance and low power consumption. One goal of such development is to increase processing capability, while maintaining or even increasing battery life of the underlying device. In some instances, it has been demonstrated that shrinking the size of processor components can improve processor performance while simultaneously reducing power consumption. In the coming years, it is expected that manufacturing techniques will have enabled the production of processors with "desktop-like" computing performance as well as power consumption that is low enough to be used in a mobile device.

In recent years consumer demand has trended towards mobile devices that have large integral displays but which are thin enough to fit in a pocket or a small bag. Improved manufacturing techniques have allowed device manufacturers to increasingly miniaturize the driving electronics of such devices. Although this has enabled the production of increasingly thin devices, the length and width dimensions of current mobile devices is often constrained by the requirement of an integral display. While further miniaturization of the driving electronics may enable further reductions in device thickness, the length and width of a mobile device may be dictated by the corresponding dimensions of an integral display. This may limit the degree to which a mobile device may be miniaturized as a whole.

As discussed above, it is common today for users to have multiple devices, each having their own applications and data. While some types of data are relatively portable across platforms (e.g., images stored in standard formats such as JPEG and PNG), others are not (e.g., documents produced by productivity applications such as Microsoft Office products). Adding to the mix is use of personal devices in enterprise environments, often referred to as BYOD (Bring Your Own Device). This creates a massive challenge for IT (information technology) managers, as there are more types of devices and data to manage, increasing personnel costs. One approach was to simply not permit employees to use their own devices for business purposes. However, BYOD is here to stay, as employees in many industries and technologies expect to be able to use their own familiar devices, and often will not consider working for companies that do not permit use of the users' personal devices.

One of the challenges is separately managing corporate data and personal data on the same device. Operating systems do no provide inherent facilities for doing this, and application-level approaches have generally been dismal failures. In some enterprise environments, certain types of data and documents may not be permitted to be stored on personal devices (and in some cases, not even be permitted to be stored on computers provided by the companies themselves). While some device manufacturers, such as BlackBerry, have attempted to implement "dual personality" devices that separate corporate data from personal data, there has been little penetration of such devices in enterprise environments.

Another personal and enterprise usage consideration is use of cloud-based resources, both for archiving data and for facilitating active workspaces. Oftentimes, personal users may use cloud-based archiving facilities as a security blanket, when they remember to do so, that is. Cloud-based archiving facilities are also distrusted, by individual users and enterprises alike. How secure is their data? Oftentimes, uses opt for the free storage limit, which is either insufficient to meet their needs (how many users only have 5 GB of data on their devices) or too difficult to implement in a convenient manner (most users do not store their data in only a single or a few folders). Anyone who has a device that syncs will recognize that the same data end up being propagated across multiple devices.

Data organization is also a challenge for many users. How can users easily segregate personal data from business data, not only on a single device but across all devices they may use? Need to locate a particular file . . . that was created many months ago? How about a set of files that may contain related data on one level for a certain purpose, but otherwise may be unrelated for other purposes such that it would not make logical sense to store such files together. While search tools such as Apple OS X's spotlight are nice, they typically return either an over-inclusive or under-inclusive list of results, generally in a flattened format.

In accordance with aspects of the embodiments disclosed herein, the foregoing deficiencies are addressed through the use of a single device (aka "one device") that is configured to support multiple usage scenarios. The one device approach represents a paradigm shift in the current data and application usage models, while at the same time seamlessly integrating into today's user's many-device environments.

In accordance with aspects of a first user experience, one device facilitates access and management of all data from multiple devices using a single device and data management interface. One device automatically organizes data across both physical device and cloud services, with robust security. Separation of personal and business data is provided with minimal setup burden placed on the user. Devices that employ different operating systems? No problem, one device can handle that. Concerned about security? One device "sandboxes" data access, not only between personal and business data, but for other types of data, such as user health data.

In accordance with aspects of a second user experience, one device can be combined with multiple existing user devices, such as desktop or laptop computers, tablets, and HDTVs. Under different use scenarios, users are enabled to access data and run applications hosted by a desktop operating system running on a computer system that is the size of a credit card. One device is also configured to "throw" graphic content to a host device in a manner that substantially improves upon simple screen-mirroring. For example, rather than sending bitmaps of display content and diffs, one device is configured to throw graphics content in native graphics formats used by applications, such as OpenGL and DirectX. Moreover, novel graphic command translators and interfaces are provided for supporting use of native graphics formats across different operating systems.

In accordance with aspects of a third user experience, one device provides scalable performance. For example, depending on user application needs, one device can support different performance levels, ranging from lower performance and long battery life to high-performance tethered experiences. One some embodiments, one device employs a novel processor architecture that includes both low power cores typically found in mobile devices with one or more cores similar to those used in today's desktop/laptop processors.

In accordance with aspects of a fourth user experience, one device supports on-going cloud-caching with encryption. The user never has to worry "is there room on my phone for another picture or video?" Rather, the data on one device is cached using a cloud-based service that enables users to seamlessly extend the effective data storage on the one device. Also, if a one device is ever lost, stolen, or broken, a replacement device can easily be restored to the state of the lost, stolen, or broken device.

In accordance with aspects of a fifth and sixth user experiences, one device provides access management for data sharing and provides one or more dual profiles. For instance the following exemplary dual profiles are supported:

Play/Work.
Public/Private.
Consume/Create.
Chrome/Private.
Public/"Sandbox.

In addition, other dual profiles may also be supported.

In accordance with aspects of a seventh user experience, one device provides unified data and application views. For example, users are enabled to organize and find their data from their devices and their Cloud-based services using unified data views. Moreover, the access is robust and secure, and the user may be presented with multiple unified views in accordance with the profiles setup or selected by the user.

In accordance with aspects of an eighth user experience, one device provides a local "Dropbox," enabling users to share data with other users without using the Internet. Using secure, peer-to-peer connections, one device facilitates sharing of data with paired devices including devices having different ecosystems (e.g., Android devices, iOS devices, Windows devices, etc.).

In accordance with a ninth user experience, one device functions as an electronic wallet (E-Wallet). This enables users to pay for products and services electronically in a highly secure and trustworthy manner.

FIG. 1 shows selected components of a computing card 100, according to one embodiment. Computing card 100 includes a processor board on which various components are mounted and which includes interconnect wiring (not shown) to couple the components. The selected components include a Processor SoC 104, system memory 106, and Embedded Multimedia Card (EMMC) 108, a power management integrated circuit (IC, aka "chip") 110, a battery charger IC 112, a fuel gauge IC 114, a flash driver 116, flash memory 118, a sensor hub 120. A dock connector 122 is also coupled to an edge of processor board 102 that facilitates connection of multiple Input/Output (I/O) signals to external components via applicable cables having mating connectors (or using a mating connector mounted to an external component) (both not shown). Dock connector 122 is depicted as including a power connector 124, and HDMI connector 126, a USB3.0 connector 130, and a pair of USB2.0 connectors 130 and 132. Power connector 124 is coupled to Fuel gauge IC 124, while HDMI connector is coupled to HDMI level shifters 134, which in turn is coupled to an HDMI interface 136 on processor SoC 104. Processor SoC 104 further is depicted as including a USB3.0 interface 138, and USB2.0 interfaces 140 and 142, which are respectively coupled to USB3.0 connector 128, USB2.0 connector 130, and USB2.0 connector 132. In addition to these interfaces depicted in FIG. 1, processor SoC 104 includes further interfaces that are not shown to avoid clutter but are discussed below in connection with the exemplary processor SoCs shown in FIGS. 6 and 7.

Generally, processor 104 may be any processor configured to support the functionality of a particular implementation or set of implementations, as described herein. For example, processor 104 may be a single or multi-core processor, a general purpose processor, an application specific integrated circuit, combinations thereof, and the like. Without limitation, processor 104 is preferably one or more processors offered for sale by INTEL® Corporation, NVIDIA®, ARM®, Advanced Micro Devices (AMD®), SAMSUNG®, APPLE® or QUALCOMM®. Non-limiting examples of suitable processors include the Atom, Nehalem, Ivy Bridge, and Sandy Bridge lines of processors sold by INTEL®.

Generally, the connectors on dock connector 122 may comprise individual physical connectors, or multiple connectors may share a physical connector. For example, in one embodiment, dock connector 122 includes a micro-USB physical connector that is configured to support a power and I/O single interface for power connector 124, and one or more of USB3.0 connector 128, USB2.0 connector 130, and USB2.0 connector 132. The micro-USB connector may also be configured to support an HDMI signal interface that employs an MHL link (Mobile High-Definition Link).

Sensor hub 120 functions as an I/O interface for coupling various sensor data to processor SoC 102. In the illustrated embodiment, these include a proximity sensor 144, an accelerometer 146, a gyroscope sensor 148, an ambient light sensor 150, and a biometrics sensor 152.

System memory 106 preferably comprises some type of Dynamic Random Access Memory (DRAM), such as, but not limited to DDR2 or DDR3 DRAM. Flash memory 118 is illustrative of various types of non-volatile memory, and may generally include, for example, NAND or NOR type memory structures. Additionally or alternatively, one or both of system memory 106 and flash memory 118 may include other and/or later-developed types of computer-readable memory. System memory 106 may be integral with processor 104, separate from processor 104, or a combination thereof. As discussed below, flash memory 118 may store one or more modules that include computer readable instructions that when executed by processor 104 may cause a device in which computing card 100 is implemented to perform functions consistent with the present disclosure.

Depending on the particular implementation, computing card 100 may include one or more wireless communication means, as depicted by WCOMMS 154. WCOMMS 154 may include hardware (e.g., circuitry), software, or a combination of hardware and software that allows computing card 100 to send and receive signals over one or more wireless communications networks and/or via peer-to-peer communication. For example, WCOMMS 204 may include one or more antennas, transmitters, receivers, transceivers, transponders, network interface communications circuitry, and combinations thereof that enable computing card 100 to send and receive signals via one or more wireless communications protocols. Examples of such wireless communication protocols include IEEE 802.11-based protocols (aka, Wi-Fi), and BLUETOOTH®, near field communication. In addition, computing card 100 may be configured to employ radio frequency identification (RFID) for authentication and related purposes, as described below.

Figure 2:
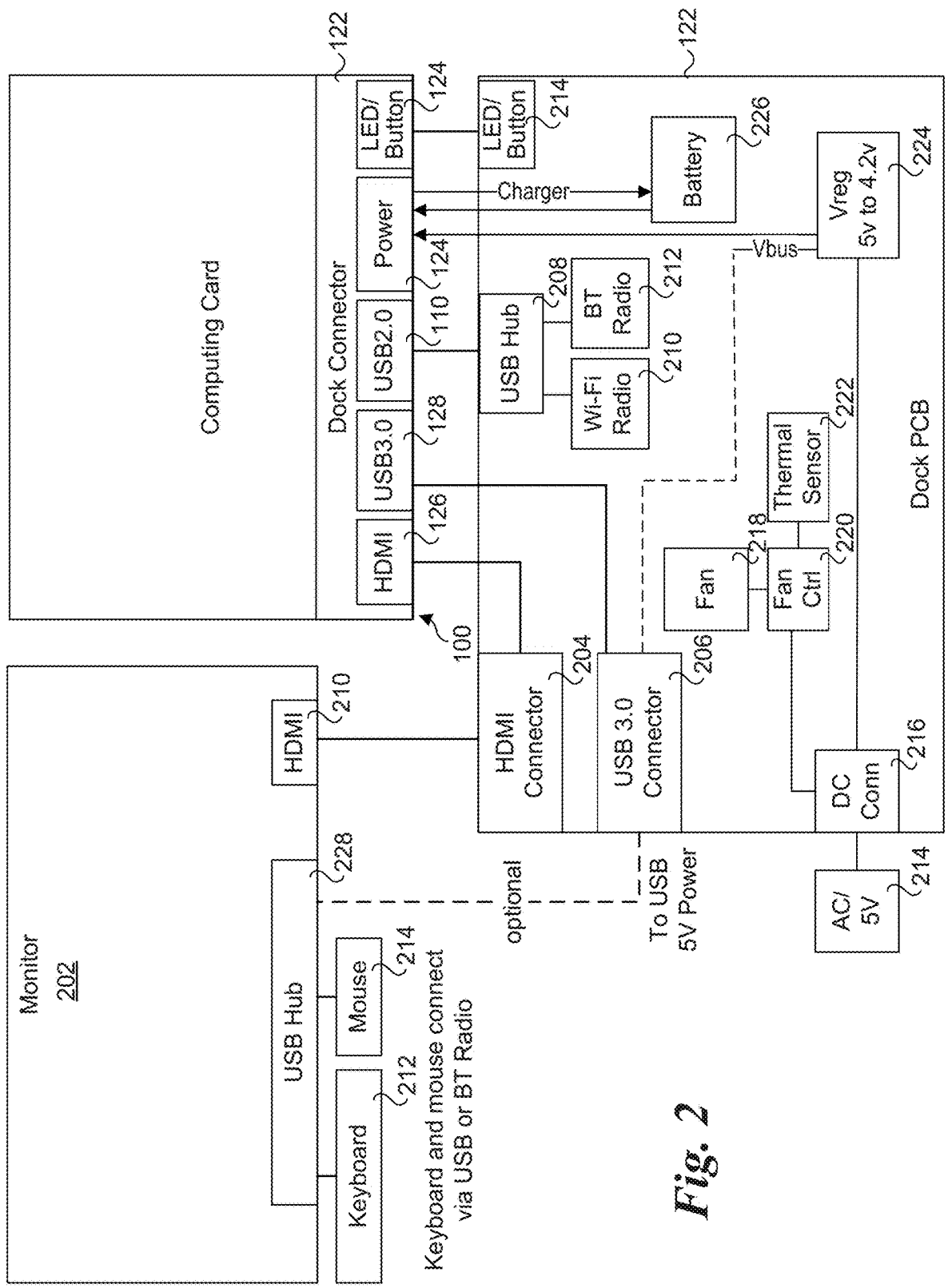
FIG. 2 is a block schematic diagram illustrating a computing card coupled to a dock PCB, which in turn is connected to a monitor.

FIG. 2 shows a computing card 100 coupled to a dock PCB (printed circuit board) 200, which in turn is connected to a monitor 202. Dock PCB 200 includes an HDMI connector 204, a USB connector 206, a USB hub 208, a Wi-Fi radio 210, a BLUETOOTH® radio 212, an LED/Button 214, a DC connector 216, a fan 218 coupled to a fan controller 220, a thermal sensor 222, a voltage regulator 224 and a battery 226. Monitor 202 includes a USB hub 228 and an HDMI connector 230.

As further shown, HDMI connector 204 is connected to HDMI connector 126 on dock connector 122, and to HDMI connector 230 on monitor 202. On one embodiment, HDMI connector 204 operates as a pass-through, enabling computing card 100 to send HDMI signals to monitor 202 to drive the monitor's display.

A keyboard 232 and mouse 234 are depicted as being connected to monitor 202, and are used to provide input to monitor 202 for implementation in which the monitor includes built-in intelligence for accepting keyboard and/or mouse inputs. For example, in one embodiment monitor 202 is a smart TV including an operating system configured to accept keyboard and/or mouse inputs. As an option, one or both of keyboard 232 and mouse 234 may be connected to monitor 202 via a BLUETOOTH® connection (not shown). As another option, dock PCB 200 may also be connected to monitor 202 via USB connector 206.

Dock PCB 200 includes various power system components that are used to power both circuitry on the dock PCB, as well as power computing card 100. As shown, DC connector 216 receives power from a 5 volt AC power adaptor 236. Optionally, dock PCB 200 may receive 5 volt input power via USB connector 206.

Depending on the particular implementation, dock PCB may or may not include battery 226 and associated battery charging circuitry. For example, if dock PCB is projected to always connect to a monitor (or other device) via a USB connection with sufficient power, the inclusion of a battery may not be necessary.

Figure 3:
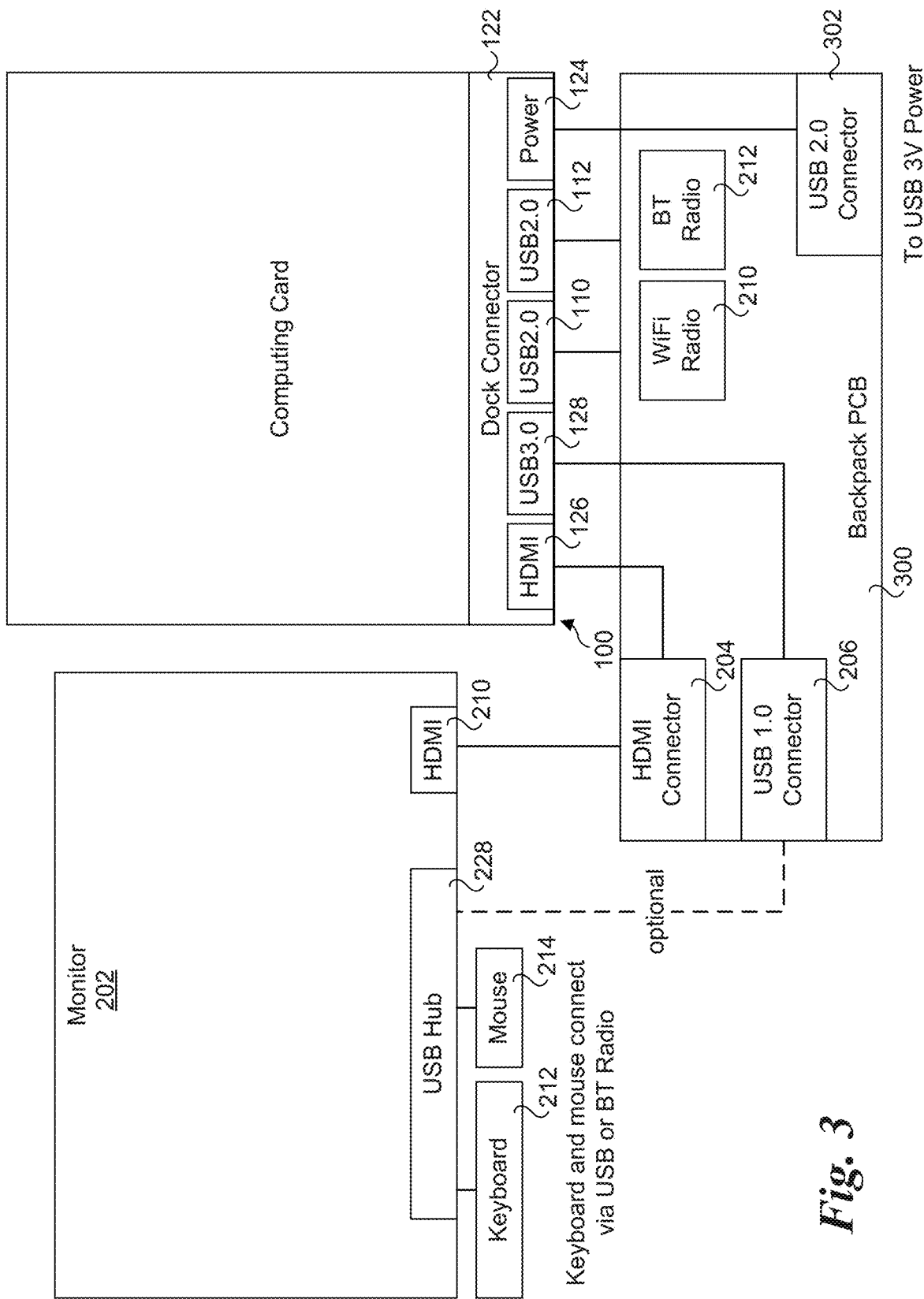
FIG. 3 is a block schematic diagram illustrating a computing card coupled to a backpack, which in turn is coupled to a monitor.

FIG. 3 shows a system including a computing card 100 coupled to a backpack PCB 300, which in turn is coupled to a monitor 202. Backpack PCB 300 includes an HDMI connector 204, a USB connector 206, a Wi-Fi radio 210, a BLUETOOTH® radio 212, and a USB connector 302. In addition, Wi-Fi radio 210 and BLUETOOTH® radio 212 may be connected to a USB hub (not shown) in a similar manner to that shown in FIG. 2. As before, HDMI connector 204 may be configured to operate as a pass through enabling HDMI signals output from HDMI connector 126 to be provided as an input to monitor 202 via HDMI connector 230. Also as before, USB connector 206 may be connected to USB hub 228. In the illustrated embodiment, power to backpack PCB 300 is provided via a 5 volt USB source (not shown) that is connected to USB connector 302.

Figure 4:
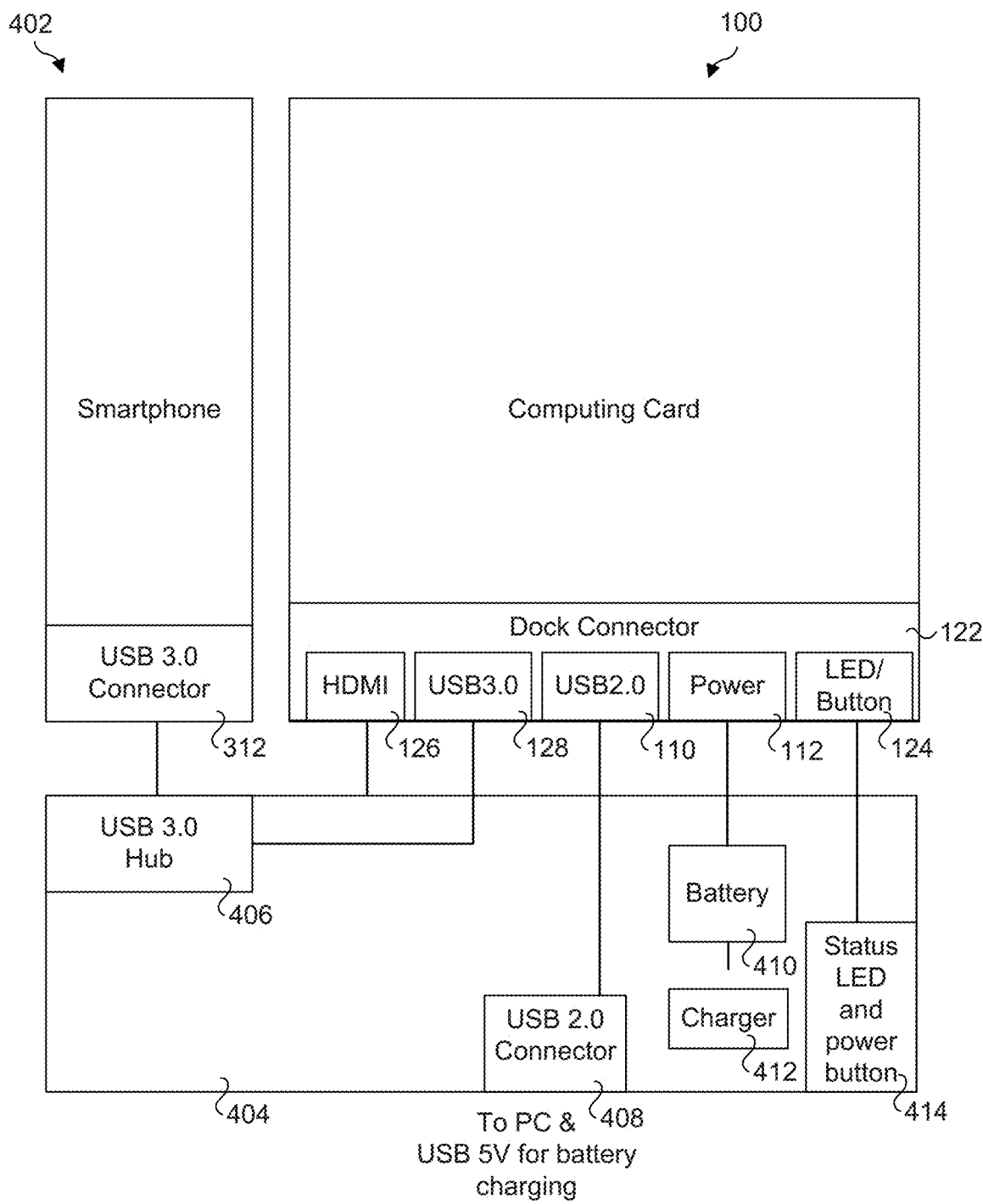
FIG. 4 is a block schematic diagram illustrating selective components for integrating a computing card in a smartphone, according to one embodiment.

FIG. 4 shows one embodiment of a smartphone implementation in which a computing card 100 is coupled to a smartphone 402 via USB adapter board 404. As depicted USB adapter board 404 includes a USB hub 406, a USB connector 408, a battery 410, a charger module 412, and a status LED and power button 414. USB hub 406 is connected to a USB connector 416 on smartphone 402. When dock connector 122 is coupled to a mating connector (not shown) on USB adapter board 404, USB connector 128 on dock connector 122, while USB connector 408 is connected to USB connector 130, battery 410 is connected to power connector 132, and status LED and power button 414 is connect the LED/button 124.

Figure 5:
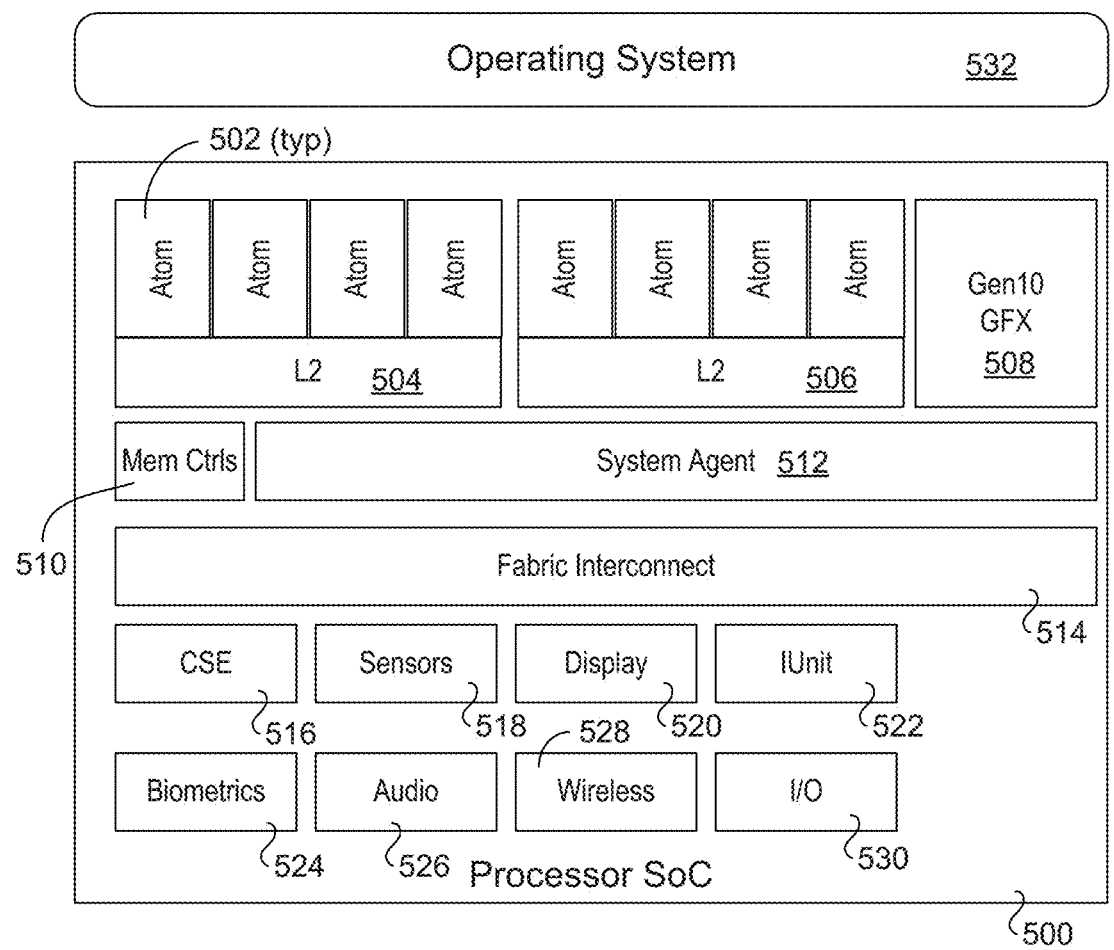
FIG. 5 is a block schematic diagram of a first processor that is suitable for implementation in one or more embodiments described herein.

FIG. 5 shows a processor 500 that may be used in one or more of the embodiments described herein. Processor 500 comprises an SoC architecture, and includes a plurality of Intel® Atom® cores 502 that are coupled to a pair of Level 2 (L2) caches 504 and 506, a graphics processor 508, memory controllers 510, a system agent 512, a fabric interconnect 514, CSE 516, sensors 518, a display interface 520, an IUnit 522, a biometrics block 524, an audio block 526, a wireless block 528, and an I/O interface 530. Processor 500 is configured to employ one or more of Atom® cores 502 to host an operating system 532.

Figure 6:
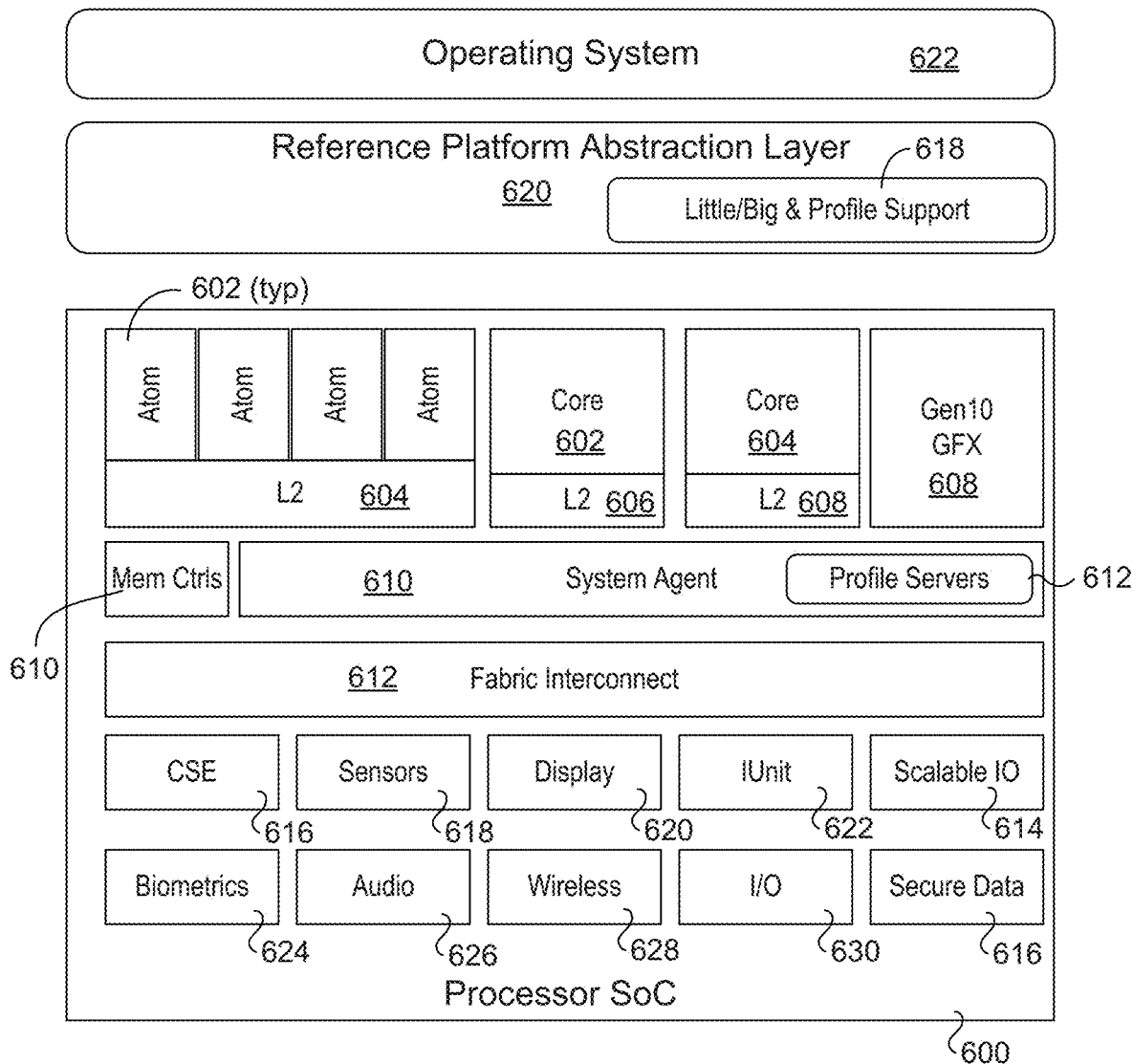
FIG. 6 is a block schematic diagram of a second processor that is suitable for implementation in one or more embodiments described herein.

FIG. 6 shows a processor 600 that may also be used in one or more the embodiments described herein. As shown, a number of components in Processor 500 with like reference numbers are also present in Processor 600. In addition, processor 600 includes two processor cores 602 and 604, each with a respective L2 cache 606 and 608, a system agent 610 including profile servers 612, a scalable I/O block 614, and a secure data block 616. Cores 602 and 604 are termed "big" cores, and Atom® cores 502 are termed "little" cores.

A cores 602 and 604 provides substantially higher performance than an Atom® core 602, but at the tradeoff of also consuming significantly more power. To take advantage of having both high-performance and low-power processor cores, profile servers 612 work in conjunction with a little/big & profile support module 618 in reference platform abstraction layer 620 to enable processor 600 to use cores 502 and 504 when power is available to operate in a high-performance profile, while it uses Atom® cores 602 when operating in a reduced-power profile. Reference platform abstraction layer 620 provides a layer of abstraction between an operating system 622 and processor 600 such that operating system 622 is enabled to operate under a range of profile options without any need to modify the operating system.

Native Graphics Thrower-Catcher Architectures

Figure 7:
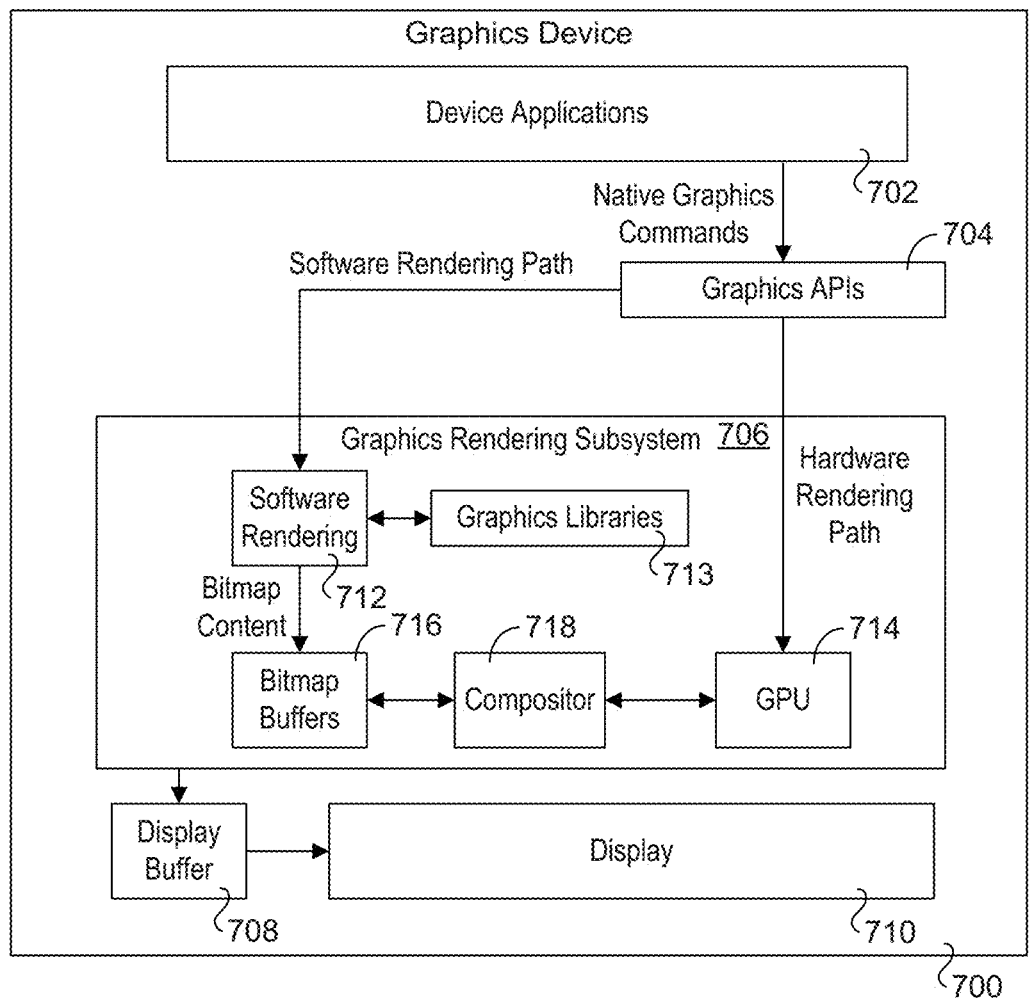
FIG. 7 is a schematic block diagram illustrating components employed by a graphics device for rendering native graphics commands and content.

FIG. 7 illustrates an abstracted graphics rendering architecture of a generic graphics device 700, which includes device applications 702, graphic APIs 704, a graphics rendering subsystem 706, a display buffer 708, and a display 710. Device applications 702 running on the graphic device's operating system issue native graphics commands to graphics APIs 704. The native graphics commands generally comprise any graphic command that may be used for rendering content on a given platform or device, and is not limited to a particular set of APIs in this graphics architecture. For example, the native graphic commands may generally include any graphics command that is supported by the operating system/device implementation; more specific details of exemplary APIs are discussed below.

Graphic APIs 704 are configured to support two rendering paths: 1) a software rendering path; and 2) a hardware rendering path. The software rendering path involves use of software executing on the graphics device's host processor, such as a central processing unit (CPU), as depicted by software rendering 712. Generally, this will be implemented via one or more run-time graphics libraries 713 that are accessed via execution of corresponding graphic APIs 704. In contrast, the hardware rendering path is designed to render graphics using one or more hardware-based rendering devices, such as a GPU 714. While internally a GPU may use embedded software (not shown) for performing some of its operations, such embedded software is not exposed via a graphics library that is accessible to device applications 702, and thus rendering graphics content on a GPU is not considered software rendering.

Graphics rendering subsystem 706 is further depicted to include bitmap buffers 714, and a compositor 718. Software rendering generally entails rendering graphics content as bitmaps that comprise virtual drawing surfaces or the like that are allocated as bitmap buffers 716 in memory (e.g., system memory). Depending on the terminology used by the software platform for graphics device 700, the bitmap buffers are typically referred to layers, surfaces, views, and/or windows. For visualization purposes, imagine a bitmap buffer as a virtual sheet of paper having an array of tiny boxes onto which content may be "painted" by filling the boxes with various colors.

GPU 714 renders content using mathematical manipulation of textures and other content, as well supporting rendering of vector-based content. GPU 714 also uses bitmap buffers, both internally (not shown), as well as in memory. This may include system memory, memory that is dedicated to the GPU (either on-die memory or off-die memory), or a combination of the two. For example, if the GPU is included in a graphics card in a PC or a separate graphics chip in a laptop, the graphics card or graphics chip will generally include memory that is dedicated for GPU use. For mobile devices such as smartphones and tables, the GPU is actually embedded in the processor SoC, and will typically employ some on-die memory as well as memory either embedded on the SoC or on a separate memory chip.

Compositor 718 is used for "composing" the final graphics content that is shown on the graphic device's display screen. This is performed by combining various bitmap content in bitmap buffers 716 and buffers rendered by GPU 714 (not shown) and writing the composed bitmap content into display buffer 708. The display buffer 716 is then read out using a refresh rate to cause bitmap graphical content to be displayed on a display 718. Optionally, graphics content may be written to a "back" buffer or "backing store", which is then copied into the display buffer, or a "ping-pong" scheme may be used in which the back buffer and display buffer are swapped in concert with the refresh rate.

Figure 8:
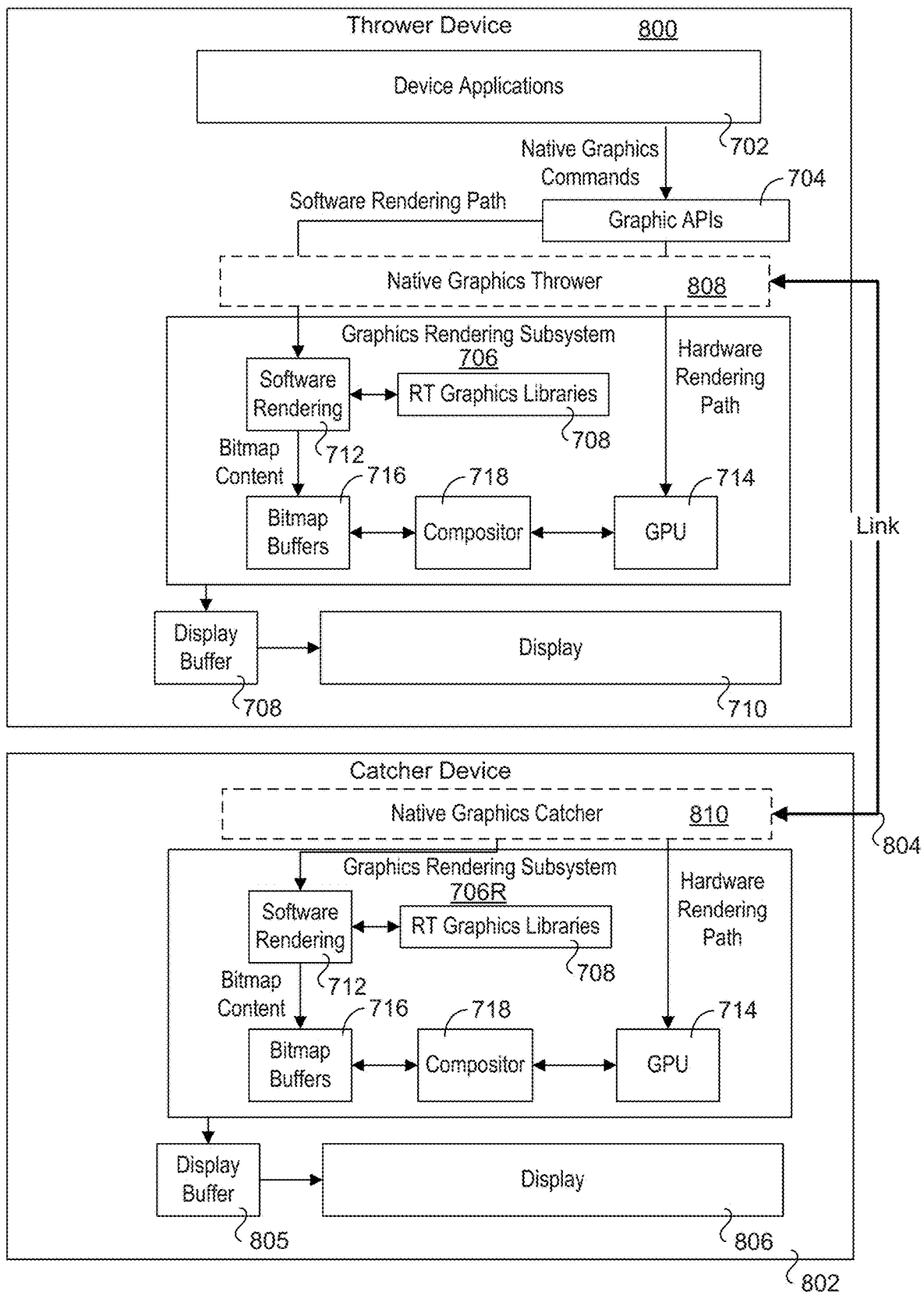
FIG. 8 is a schematic block diagram illustrating a native graphics thrower-catcher architecture, according to one embodiment.

An exemplary native graphics thrower-catcher architecture is shown in FIG. 8 including a thrower device 800 that throws native graphics commands and content to a catcher device 802 via a link 804. As indicated by like reference numbers in FIGS. 7 and 8, the graphics architecture of thrower device 800 is similar to the graphics architecture of graphics device 700. Meanwhile, components comprising graphics rendering subsystem 706 are replicated on catcher device 802, as depicted by graphics rendering subsystem 706R. Catcher device 802 further includes a display buffer 805 and a display 806 that generally function in a similar manner to display buffer 708 and display 710, but may have different buffer sizes and/or configurations, and the resolution of display 806 and display 710 may be the same or may differ.

Throwing of native graphics commands and content is enabled by respective thrower and catcher components on thrower device 800 and catcher device 800 comprising a native graphics thrower 808 and a native graphics catcher 810. These components help facilitated throwing of native graphics commands and content in the following manner.

In one embodiment, native graphics thrower 808 is implemented as a virtual graphics driver or the like that provides an interface that is similar to graphics rendering subsystem 706. Graphic commands and content corresponding to both the software rendering path and hardware rendering path that are output from graphic APIs 704 are sent to native graphics thrower 808. Depending on the operating mode, native graphics thrower 808 may be configured as a trap and pass-through graphics driver, or it may operate as an intercepting graphics driver. When operating as a trap and pass-through graphics driver, native graphics commands and content is trapped, buffered, and sent to native graphics catcher 810. The buffered commands are also allowed to pass through to graphics rendering subsystem 706 in a transparent manner such that the graphics on thrower device 800 appear to operate the same as graphics device 700. Under an intercepting graphics driver, the graphics commands are not passed through on thrower device 800.

As will be readily observed, the thrower-catcher architecture of FIG. 8 implements a split graphics architecture, with the graphics rendering subsystem "moved" to (or otherwise replicated on) the catcher device. From the perspective of graphics rendering subsystem 706R, native graphics catcher 810 output graphics commands and content along both the software (SWF) and hardware rendering paths as if this content was provided directly by graphic APIs 704. The result is that graphics content can be rendered on the remote wireless device (i.e., catcher device 802) at a similar speed to graphics rendered on a graphics device itself (when similar hardware components are implemented for graphics rendering subsystems 706 and 706R). There is substantially no latency incurred through the graphic commands and content throwing process, and the amount of lag resulting from such latency is generally unperceivable to the user, particular for graphics commands and content that is rendered via the hardware rendering path. The greatest amount of latency will typically involve throwing a large image (e.g., a large JPEG or PNG image), which may be implemented by transferring the compressed image file itself from the thrower to the catcher.

To support initialization and operation of link 804, each of thrower device 800 and catcher device 802 include a link stack modules 812 and 814. In some embodiments, thrower device 800 operates as a source and catcher device 802 operates as a sink, and there is corresponding software for facilitating a source/sink link configuration. For example, in one embodiment link 804 comprises a Wi-Fi Direct® (WFD) link, which includes a WFD source and a WFD sink. Optionally, an INTEL® WiDi connection or an INTEL® WiGig connection may be used.

Android Graphics Rendering

Figure 9:
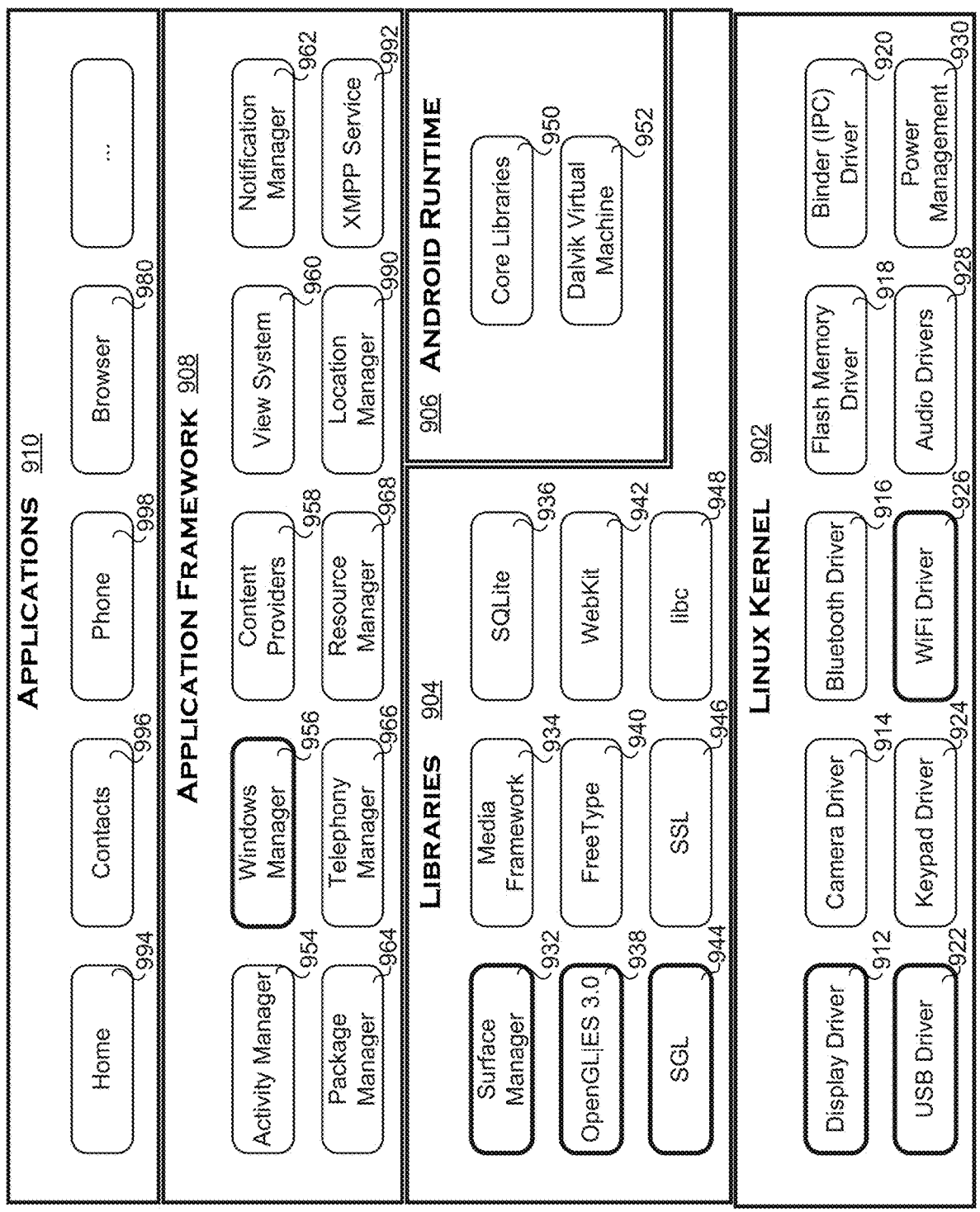
FIG. 9 is a schematic block diagram illustrating the software components as defined by the Android architecture.

FIG. 9 shows a diagram illustrating the Android software architecture 900. The Android software architecture includes Linux Kernel 902, Libraries 904, Android Runtime 906, Application Framework 908, and Applications 910.

Linux Kernel 902 occupies the lowest layer in the Android software stack, and provides a level of abstraction between the Android device hardware and the upper layers of the Android software stack. While some of Linux Kernel 902 shares code with Linux kernel components for desktops and servers, there are some components that are specifically implemented by Google for Android. A recent version of Android, Android 4.4 (aka "KitKat") is based on Linux kernel 3.4 or newer (noting the actual kernel version depends on the particular Android device and chipset). The illustrated Linux Kernel 902 components include a display driver 912, a camera driver 914, a Bluetooth driver 916, a flash memory driver 918, a binder driver 920, a USB driver 922, a keypad driver 924, a Wi-Fi driver 926, an audio drivers 928, and power management 930.

On top of Linux Kernel 902 is Libraries 904, which comprises middleware, libraries and APIs written in C/C++, and applications 910 running on Application Framework 908. Libraries 904 are compiled and preinstalled by an Android device vendor for a particular hardware abstraction, such as a specific CPU. The libraries include surface manager 932, media framework 934, SQLite database engine 936, OpenGL ES (embedded system) 938, FreeType front library 940, WebKit 942, Skia Graphics Library (SGL)944, SSL (Secure Socket Layer) library 946, and the libc library 948. Surface manager 932, also referred to as "Surface-Flinger," is a graphics compositing manager that composites graphics content for surfaces comprising off-screen bitmaps that are combined with other surfaces to create the graphics content displayed on an Android device, as discussed in further detail below. Media framework 934 includes libraries and Codecs used for various multi-media applications, such as playing and recording videos, and support many formats such as AAC, H.264 AVC, H.263, MP3, and MPEG-4. SQLite database enjoy uses for storing and accessing data, and supports various SQL database function.

The Android software architecture employs multiple components for rendering graphics including OpenGL ES 938, SGL 944, FreeType font library 940 and WebKit 942. Further details of Android graphics rendering are discussed below with reference to FIG. 8.

Android runtime 906 employs the Dalvik Virtual Machine (VM) 950 and core libraries 952. Android applications are written in Java (noting Android 4.4 also supports applications written in C/C++). Conventional Java programming employs a Java Virtual Machine (JVM) to execute Java bytecode that is generated by a Java compiler used to compile Java applications. Unlike JVMs, which are stack machines, the Dalvik VM uses a register-based architecture that requires fewer, typically more complex virtual machine instructions. Dalvik programs are written in Java using Android APIs, compiled to Java bytecode, and converted to Dalvik instructions as necessary. Core libraries 952 support similar Java functions included in Java SE (Standard Edition), but are specifically tailored to support Android.

Application Framework 908 includes high-level building blocks used for implementing Android Applications 910. These building blocks include an activity manager 954, a Windows manager 956, content providers 958, a view system 960, a notifications manager 962, a package manager 964, a telephony manager 966, a resource manager 968, a location manager 970, and an XMPP (Extensible Messaging and Presence Protocol) service 972.

Applications 910 include various application that run on an Android platform, as well as widgets, as depicted by a home application 974, a contacts application 976, a phone application 978, and a browser 980. The applications may be tailored for the particular type of Android platform, such as a tablet without mobile radio support would not have a phone application and may have additional applications designed for the larger size of a tablet's screen (as compared with a typical Android smartphone screen size).

The Android software architecture offers a variety of graphics rendering APIs for 2D and 3D content that interact with manufacturer implementations of graphics drivers. However, application developers draw graphics content to the display screen in two ways: with Canvas or OpenGL.

Figure 10:
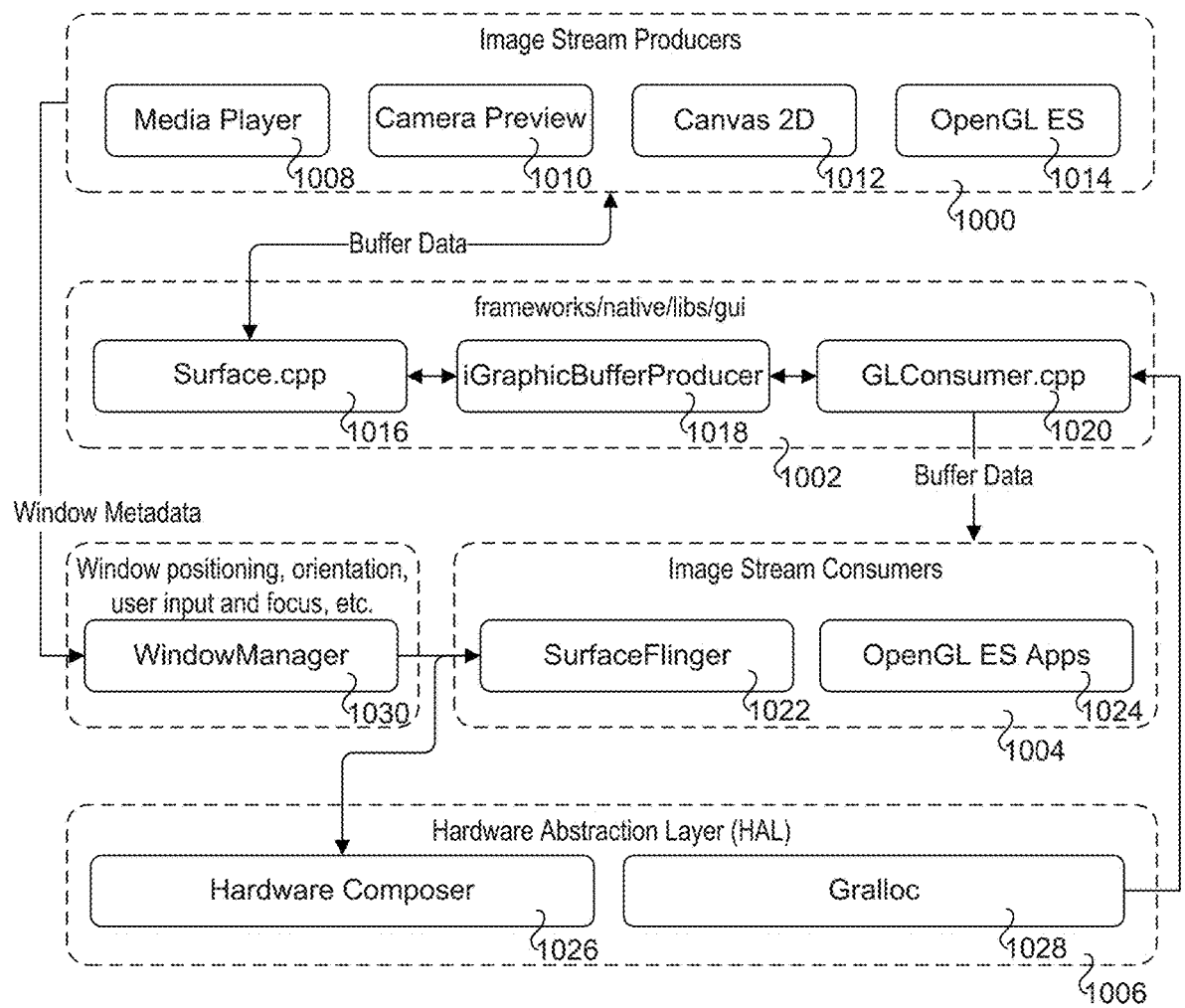
FIG. 10 is a schematic block and data flow diagram illustrates selected Android graphics components and data flows between them.

FIG. 10 illustrates selected Android graphics components. These components are grouped as image stream producers 1000, frameworks/native/libs/gui modules 1002, image stream consumers 1004, and a hardware abstraction layer (HAL) 1006. An image stream producer can be anything that produces graphic buffers for consumption. Examples include a media player 1008, camera preview application 1010, Canvas 2D 1012, and OpenGL ES 1014. The frameworks/native/libs/gui modules 1002 are C++ modules and include Surface.cpp 1016, iGraphicBufferProducer 1018, and GLConsumer.cpp 1020. The image stream consumers 1004 include SurfaceFlinger 1022 and OpenGL ES applications 1024. HAL 1006 includes a hardware composer 1026 and a Graphics memory allocator (Gralloc) 1028. The graphics components depicted in FIG. 10 also includes a WindowsManager 1030

The most common consumer of image streams is SurfaceFlinger 1022, the system service that consumes the currently visible surfaces and composites them onto the display using information provided by Window Manager 1024. SurfaceFlinger 1022 is the only service that can modify the content of the display. SurfaceFlinger 1022 uses OpenGL and Hardware Composer to compose a group of surfaces. Other OpenGL ES apps 1024 can consume image streams as well, such as the camera app consuming a camera preview 1010 image stream.

WindowManager 1030 is the Android system service that controls a window, which is a container for views. A window is always backed by a surface. This service oversees lifecycles, input and focus events, screen orientation, transitions, animations, position, transforms, z-order, and many other aspects of a window. WindowManager 1030 sends all of the window metadata to SurfaceFlinger 1022 so SurfaceFlinger can use that data to composite surfaces on the display.

Hardware composer 1026 is the hardware abstraction for the display subsystem. SurfaceFlinger 1022 can delegate certain composition work to Hardware Composer 1026 to offload work from OpenGL and the GPU. SurfaceFlinger 1022 acts as just another OpenGL ES client. So when SurfaceFlinger is actively compositing one buffer or two into a third, for instance, it is using OpenGL ES. This makes compositing lower power than having the GPU conduct all computation. Hardware Composer 1026 conducts the other half of the work. This HAL component is the central point for all Android graphics rendering. Hardware Composer 1026 supports various events, including VSYNC and hotplug for plug-and-play HDMI support.

android.graphics.Canvas is a 2D graphics API and is the most popular graphics API among developers. Canvas operations draw the stock and custom android.view.Views in Android. In Android, hardware acceleration for Canvas APIs is accomplished with a drawing library called OpenGLRenderer that translates Canvas operations to OpenGL operations so they can execute on the GPU.

Beginning in Android 4.0, hardware-accelerated Canvas is enabled by default. Consequently, a hardware GPU that supports OpenGL ES 2.0 (or later) is mandatory for Android 4.0 and later devices. Android 4.4 requires OpenGL ES 3.0 hardware support.

In addition to Canvas, the other main way that developers render graphics is by using OpenGL ES to directly render to a surface. Android provides OpenGL ES interfaces in the android.opengl package that developers can use to call into their GL implementations with the SDK (Software Development Kit) or with native APIs provided in the Android NDK (Android Native Development Kit).

Figure 11:
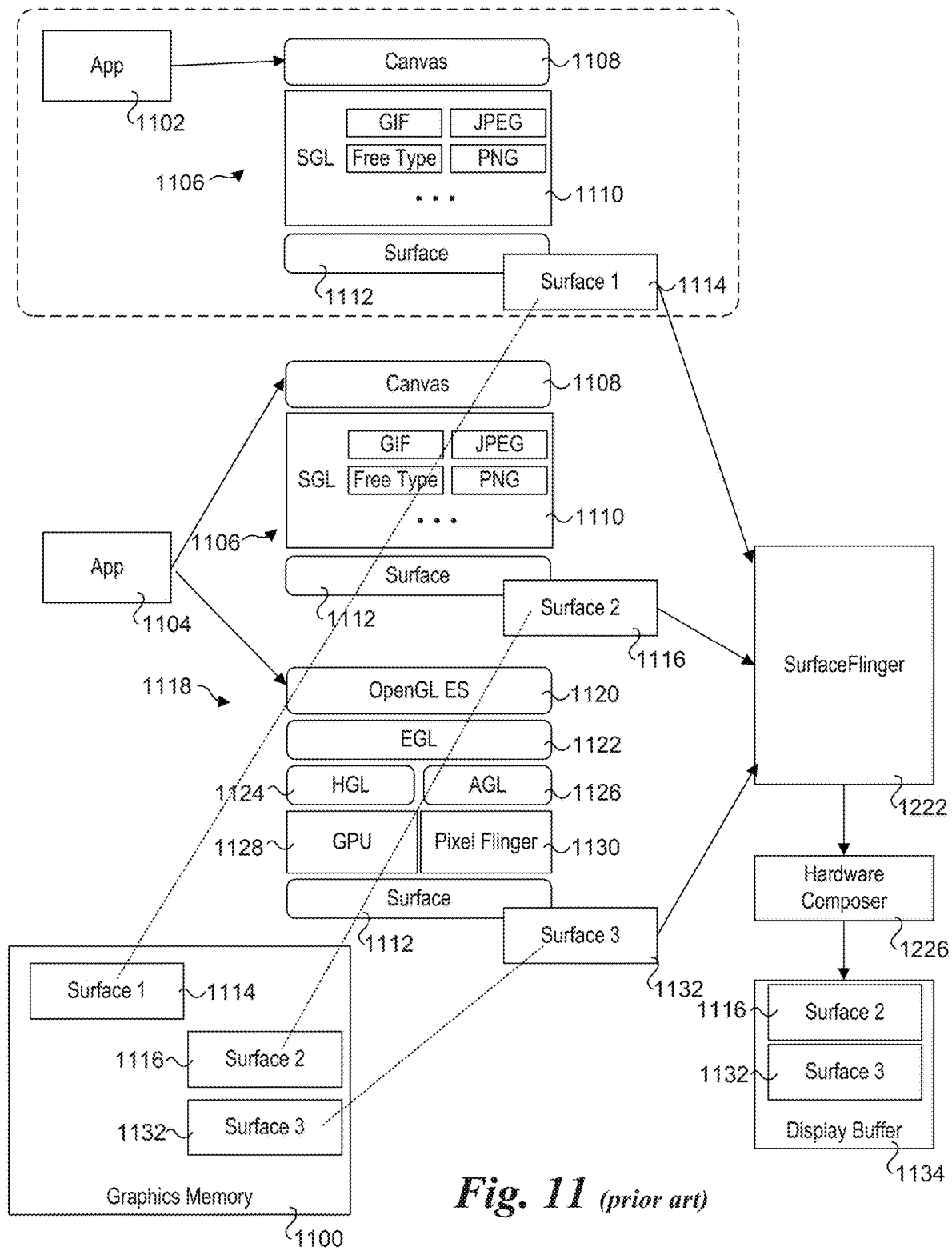
FIG. 11 is a schematic block and data flow diagram illustrating selected components of the Android graphics system and compositing of graphics content by Android's SurfaceFlinger and Hardware Composer.

FIG. 11 graphically illustrates concepts relating to surfaces and the composition of the surfaces by SurfaceFlinger 1022 and the hardware composer 1026 to create the graphical content that is displayed on an Android device. As mentioned above, application developers are provided with two means for creating graphical content: Canvas and OpenGL. Each employ an API comprising a set of graphic commands for creating graphical content. That graphical content is "rendered" to a surface, which comprises a bitmap stored in graphics memory 1100.

FIG. 11 shows graphic content being generated by two applications 1102 and 1104. Application 1102 is a photo-viewing application, and uses a Canvas graphics stack 1106. This includes a Canvas API 1108, SGL 1110, the Skia 2D graphics software library, and the Android surface class 1112. Canvas API 1106 enables users to "draw" graphics content onto virtual views (referred to as surfaces) stored as bitmaps in graphics memory 1100 via Canvas drawing commands. Skia supports rendering 2D vector graphics and image content, such as GIFs, JPEGs, and PNGs. Skia also supports Androids FreeType text rendering subsystem, as well as supporting various graphic enhancements and effects, such as antialiasing, transparency, filters, shaders, etc. Surface class 1110 includes various software components for facilitating interaction with Android surfaces. Application 1102 renders graphics content onto a surface 1114.

Application 1104 is a gaming application that uses Canvas for its user interface and uses OpenGL for its game content. It employs an instance of Canvas graphics stack 1106 to render user interface graphics content onto a surface 1116.

The OpenGL drawing commands are processed by an OpenGL graphics stack 1118, which includes an OpenGL ES API 1120, an embedded systems graphics library (EGL) 1122, a hardware OpenGL ES graphics library (HGL) 1124, an Android software OpenGL ES graphics library (AGL) 1126, a graphics processing unit (GPU) 1128, a PixelFlinger 1130, and Surface class 1110. The OpenGL drawing content is rendered onto a surface 1132.

The content of surfaces 1114, 1116, and 1132 are selectively combined using SurfaceFlinger 1022 and hardware composer 1026. In this example, application 1104 has the current focus, and thus bitmaps corresponding to surfaces 1116 and 1132 are copied into a display buffer 1134.

SurfaceFlinger's role is to accept buffers of data from multiple sources, composite them, and send them to the display. Under earlier versions of Android, this was done with software blitting to a hardware framebuffer (e.g. /dev/graphics/fb0), but that is no longer how this is done.

When an application comes to the foreground, the WindowManager service asks SurfaceFlinger for a drawing surface. SurfaceFlinger creates a "layer"—the primary component of which is a BufferQueue—for which SurfaceFlinger acts as the consumer. A Binder object for the producer side is passed through the WindowManager to the app, which can then start sending frames directly to SurfaceFlinger.

For most applications, there will be three layers on screen at any time: the "status bar" at the top of the screen, the "navigation bar" at the bottom or side, and the application's user interface and/or display content. Some applications will have more or less, e.g. the default home application has a separate layer for the wallpaper, while a full-screen game might hide the status bar. Each layer can be updated independently. The status and navigation bars are rendered by a system process, while the application layers are rendered by the application, with no coordination between the two.

Device displays refresh at a certain rate, typically 60 frames per second (fps) on smartphones and tablets. If the display contents are updated mid-refresh, "tearing" will be visible; so it's important to update the contents only between cycles. The system receives a signal from the display when it's safe to update the contents. This is referred to as the VSYNC signal.

The refresh rate may vary over time, e.g. some mobile devices will range from 58 to 62 fps depending on current conditions. For an HDMI-attached television, this could theoretically dip to 24 or 48 Hz to match a video. Because the screen can be updated only once per refresh cycle, submitting buffers for display at 200 fps would be a waste of effort as most of the frames would never be seen. Instead of taking action whenever an app submits a buffer, SurfaceFlinger wakes up when the display is ready for something new.

When the VSYNC signal arrives, SurfaceFlinger walks through its list of layers looking for new buffers. If it finds a new one, it acquires it; if not, it continues to use the previously-acquired buffer. SurfaceFlinger always wants to have something to display, so it will hang on to one buffer. If no buffers have ever been submitted on a layer, the layer is ignored.

Once SurfaceFlinger has collected all of the buffers for visible layers, it asks the Hardware Composer how composition should be performed. Hardware Composer 1026 was first introduced in Android 3.0 and has evolved steadily over the years. Its primary purpose is to determine the most efficient way to composite buffers with the available hardware. As a HAL component, its implementation is device-specific and usually implemented by the display hardware OEM.

The value of this approach is easy to recognize when you consider "overlay planes." The purpose of overlay planes is to composite multiple buffers together, but in the display hardware rather than the GPU. For example, suppose you have a typical Android phone in portrait orientation, with the status bar on top and navigation bar at the bottom, and app content everywhere else. The contents for each layer are in separate buffers (i.e., on separate surfaces). You could handle composition by rendering the app content into a scratch buffer, then rendering the status bar over it, then rendering the navigation bar on top of that, and finally passing the scratch buffer to the display hardware. Or, you could pass all three buffers to the display hardware, and tell it to read data from different buffers for different parts of the screen. The latter approach can be significantly more efficient.

As one might expect, the capabilities of different display processors vary significantly. The number of overlays, whether layers can be rotated or blended, and restrictions on positioning and overlap can be difficult to express through an API. So, the Hardware Composer 1026 works as follows.

First, SurfaceFlinger 1022 provides Hardware Composer 1026 with a full list of layers, and asks, "how do you want to handle this?" Hardware Composer 1026 responds by marking each layer as "overlay" or "OpenGL ES (GLES) composition." SurfaceFlinger 1022 takes care of any GLES composition, passing the output buffer to Hardware Composer 1026, and lets Hardware Composer 1026 handle the rest.

Figure 8A:
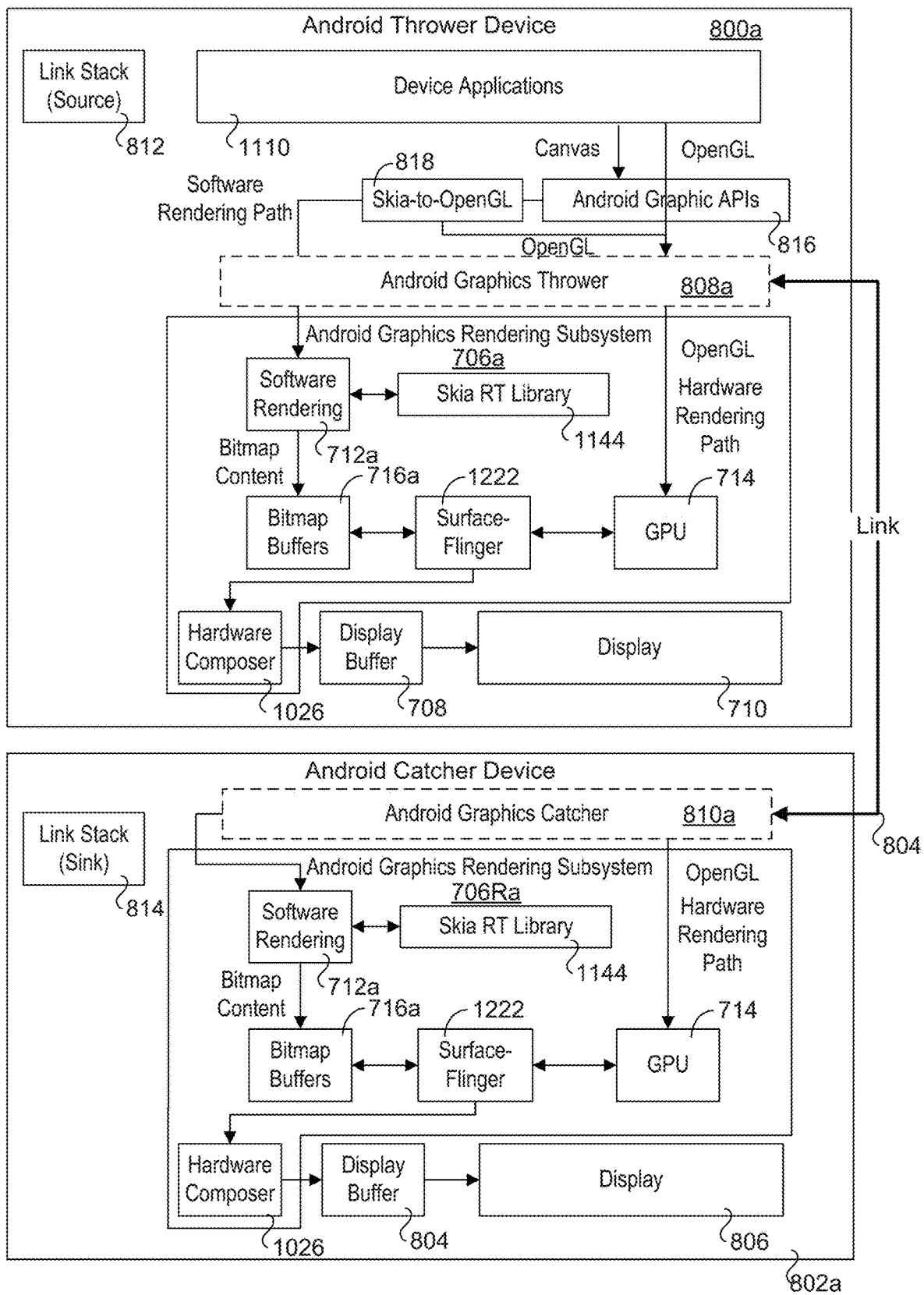
FIG. 8a is a schematic block diagram illustrating an Android graphics thrower-catcher architecture, according to one embodiment.

An exemplary Android graphics thrower-catcher architecture is shown in FIG. 8*a* including a hybrid Android thrower device 800*a* that throws Android graphics commands and content to an Android catcher device 802*a* via a link 804. Various aspects of the Android graphics thrower-catcher architecture of FIG. 8*a* are similar to those shown in FIG. 8 discussed above, including various components sharing the same reference numbers in both FIGS. 8 and 8*a*. Accordingly, the following will focus on implementation details that are particular to implementing an Android graphics thrower and catcher.

As discussed above, Android applications 910 use canvas drawing commands and OpenGL drawing commands to generate graphics content that is displayed by an Android application. The canvas and OpenGL commands are implemented through Android graphic APIs 816, which initially split the command along the hardware rendering path for OpenGL commands and the software rendering path for canvas commands. Selected canvas commands are converted from Skia to OpenGL-equivalent commands via a Skia-to-OpenGL block 818, and those OpenGL commands are forwarded via the hardware rendering path.

Android graphics rendering subsystems 806*a* and 706Ra include a software rendering block 712*a* that employs a Skia runtime library 944 to render Skia commands as associated content (e.g., image content) via the software rendering path. Further components include bitmap buffers 716*a*, SurfaceFlinger 1022, a GPU 714, and a hardware composer 1026.

FIG. 8*a* further depicts an Android graphics thrower 808*a* and an Android graphics catcher 810*a*. These components are similar to native graphics thrower 808 and native graphics catcher 810, except they are configured to throw Android graphic commands and associated content, including OpenGL commands, and Canvas and/or Skia commands and associated content.

Figure 12A:
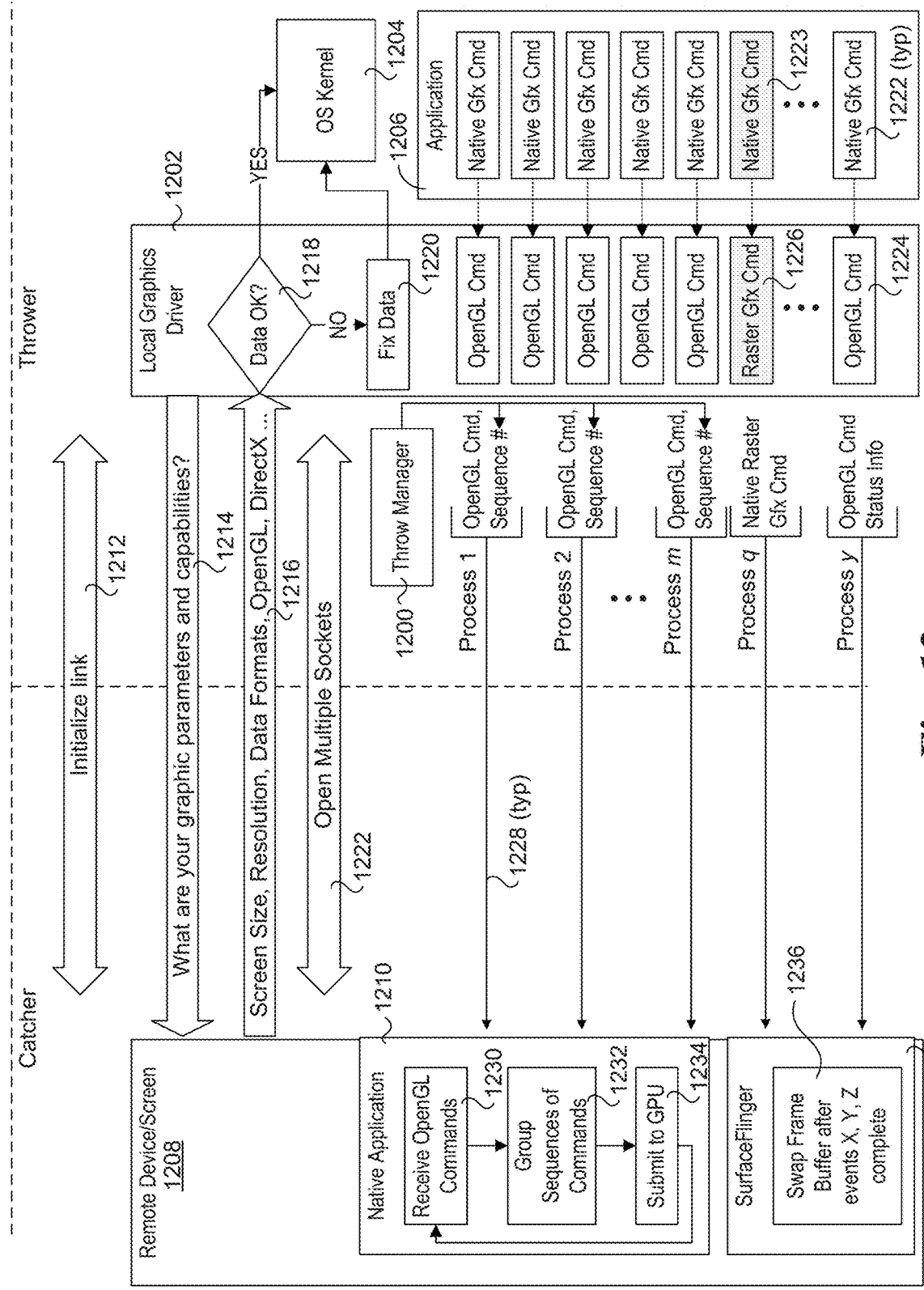
FIG. 12a is a combination schematic and message flow diagram illustrating an embodiment that throws native Android graphics commands and content to a remote Android device.

FIG. 12a illustrates an Android thrower-catcher architecture that throws OpenGL and Android Skia graphics content over multiple sockets in parallel. On the thrower side, the components include a throw manager 1200, a local graphics driver 1202, an operating system kernel 1204, and an application 1206. On the catcher side, the components include a remove device/screen 1208 including a native application 1210 and SurfaceFlinger 1022. Generally, remote device/screen 1208 is representative of any type of device that can be configured as a catcher.

In order to throw graphics, a link between the thrower and catcher must first be initialized, as depicted by initialize link communication exchange 1212, which is depicted by a double-headed arrow to indicate there is an exchange of communication between the thrower and catcher. Generally, the particular link initialization operations will be a function of the particular link physical connection and protocol being used, wherein such operations are well-known to those having skill in the communications art and outside the scope of this disclosure.

Once the link has been initialized, local graphics driver 1202 sends a message 1214 to remote device/screen 1208 asking for its graphic parameters and capabilities. For example, this might include, but is not limited to remote device/screen 1208's screen size, resolution, data formats, what types of graphics it supports, such as OpenGL and DirectX, and potentially other information relating to remote device/screen 1208's graphic parameters and capabilities, which are returned via a message 1216.

Upon receipt of message 1216, logic depicted as a decision block 1218 in local graphics driver 1202 evaluates the data and determines whether it is OK or whether it needs to be fixed. If the data is deemed OK, it is forwarded to OS kernel 1204. If not, it is fixed in a fix data block 1220 prior to being forwarded to OS kernel 1204.

As this point, multiple sockets are opened, as depicted by a message exchange 1222. The multiple sockets are then employed to transport multiple OpenGL commands and Android native raster graphics commands in parallel.

As depicted, application 1206 issues multiple Android native graphics commands 1222 and 1223 to local graphics driver 1202. Android native graphics commands 1222 may include OpenGL commands and application graphics commands that get converted to OpenGL commands by local graphics driver 1202, and native raster-based graphics commands 1223 that cannot be converted to OpenGL commands and are sent as raster graphics commands 1226 to be rendered by remote device/screen 1208 using a software rendering path.

In support real-time graphics rendering, the sending and processing of the OpenGL commands 1224 and raster graphics commands 1226 are orchestrated using a sequencing scheme in combination with status information. In one embodiment, each OpenGL command 1224 that is sent via a message 1228 to be received by native application 1210 includes a sequence number. As further illustrated by blocks within native application 1210, ongoing operations performed by the native application include receiving OpenGL commands in a block 1230, grouping sequences of OpenGL commands in a block 1232, and submitting the grouped sequences of OpenGL commands to the GPU in a block 1234.

Native raster graphics commands 1226 are sent in parallel with the OpenGL commands. These may or may not be sequenced, depending on whether multiple sockets are used for transporting native raster graphics commands. Upon receipt by native application 1210, the native raster graphics commands 1226 are handled in a similar manner to how these are rendered using a software-based rendering path on an Android host device. However, there are a couple of additional considerations.

Under a conventional approach, the Android graphics software rendering path accesses raster graphics objects in local memory, which is substantially instantaneous under today's hardware capabilities. However, the content of these same raster graphics objects is sent over the link from the thrower to the catcher, which requires some finite latency (albeit very small). In contrast, for OpenGL commands that do not contain texture data (or containing relatively small textures), the latency resulting from sending the OpenGL commands over the link is substantially unperceivable, and when combined with hardware-based rendering support for OpenGL (e.g., by a GPU), the real-time remote graphics rendering performance under the Android thrower-catcher architecture is very good, and is substantially faster than using a screen-casting approach such as Miracast.

To orchestrate the timing of the display of rendered content on the catcher, SurfaceFlinger 1022, in combination with Hardware Composer (not shown) as described above, processes OpenGL command status information, which includes VSYNC timing information, and frame buffers are swapped after events are completed, as depicted by a block 1236. For example, it is desired that each new frame buffer contain a complete set of graphics content, such as full image content and correctly ordered sequences of OpenGL command content that has been rendered by the GPU. If the graphics content of a frame buffer is incomplete, it will not be swapped to be used as the display buffer, resulting in the existing display buffer content being displayed multiple times using the display refresh rate from the remote device/screen 1208.

Figure 12B:
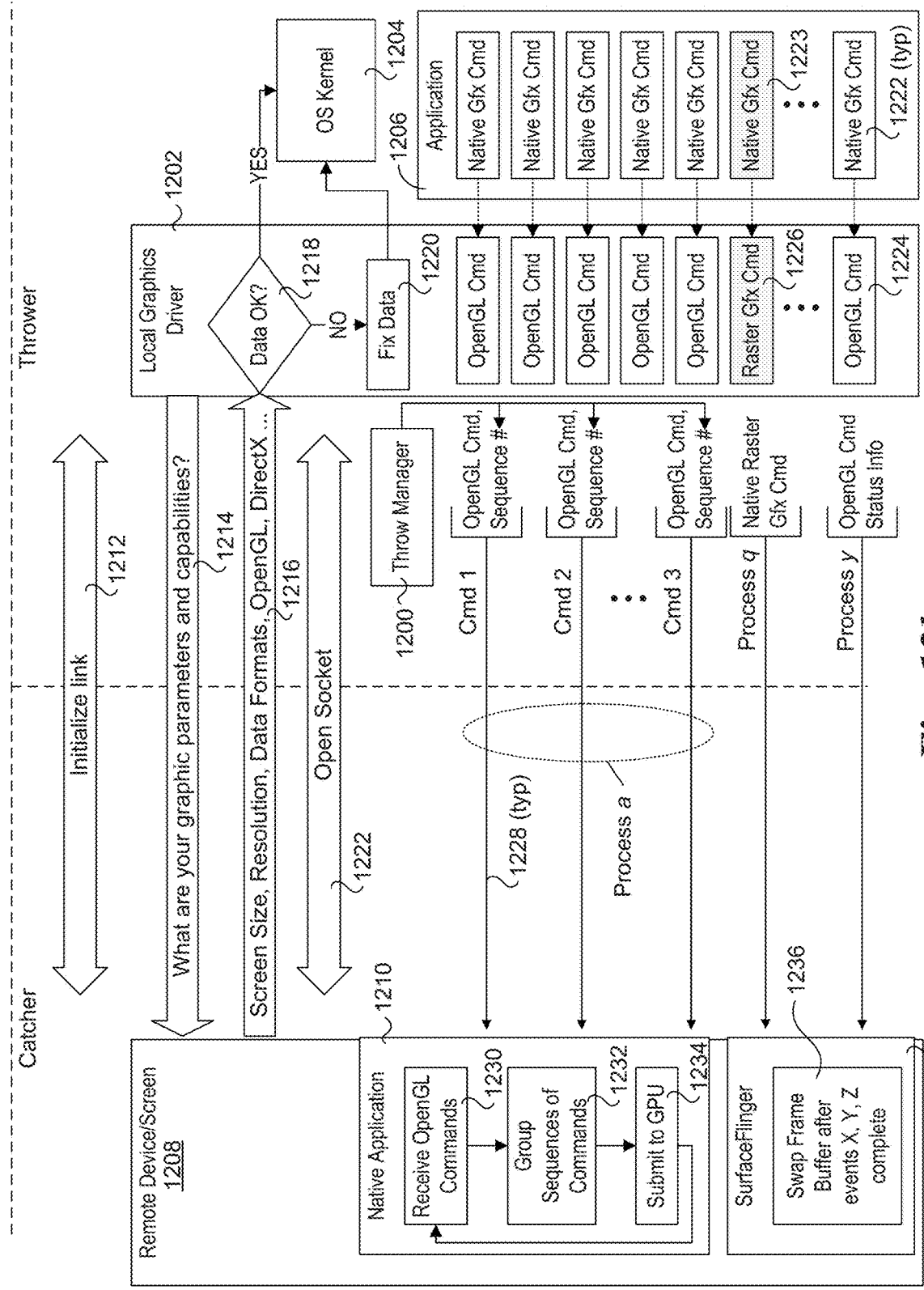
FIG. 12b is a combination schematic and message flow diagram illustrating an alternative configuration to that shown in FIG. 12a under which OpenGL graphic commands are sent using a single socket.

FIG. 12b illustrates an alternative implementation to the embodiment of FIG. 12a. Under this embodiment, a single socket is used to transport the OpenGL command sequence over the link. The native raster graphics commands and/or OpenGL command status information may be transported over the same socket as the OpenGL command sequence, or separate sockets.

Windows Graphics Architecture

In addition to throwing Android graphics content, thrower-catcher remote display schemes may be implemented that throw native Microsoft Windows graphics content. Microsoft Windows provides several C++/COM APIs for graphics, as shown in FIG. 13. At the left-hand side of the diagram is the legacy Graphics Device Interface (GDI) 1300, the original graphics interface for Windows. GDI+ 1302 was introduced in Windows XP as a successor to GDI 1300. The GDI+ library is accessed through a set of C++ classes that wrap flat C functions, as depicted by GDI+ flat API 1304. The .NET Framework also provides a managed version of GDI+ in the System.Drawing namespace.

The DirectX APIs 1306 include Direct2D 1308, DirectWrite 1310, Direct3D 1312, Direct Graphics Intrastructure (DXGI) 1314, and a software rasterizer 1316. Direct2D 1308 is an API for 2D graphics, and is the successor to both GDI and GDI+. Direct3D 1312 is employed for 3D graphics. DirectWrite 1310 is a text layout and rasterization engine. You can use either GDI 1300 or Direct2D 1308 to draw the rasterized text. DXGI 1314 performs low-level tasks, such as presenting frames for output. Most applications do not use DXGI directly. Rather, it serves as an intermediate layer between the graphics driver and Direct3D. The Windows graphics architecture also includes a graphics driver layer that includes a GDI Display Device Interface (DDI) 1318 and a Direct X (DX) DDI 1320.

While both GDI 1300 and GDI+ 1302 continue to be supported in Windows, Direct2D 1308 and DirectWrite 1310 are recommended for new programs. In some cases, a mix of technologies might be more practical. For these situations, Direct2D 1308 and DirectWrite 1310 are designed to interoperate with GDI 1300.

The modern graphics approach is to leverage graphics computations performed by the graphics processing unit (GPU), rather than the CPU. Modern GPUs are highly optimized for the types of computation used in rendering graphics. Generally, the more of this work that is moved from the CPU to the GPU, the better.

While GDI 1300 supports hardware acceleration for certain operations, many GDI operations are bound to the CPU. Direct2D 1308 is layered on top of Direct3D 1312, and takes full advantage of hardware acceleration provided by the GPU. If the GPU does not support the features needed for Direct2D 1308, then Direct2D 1308 falls back to software rendering using software rasterizer 1316. Overall, Direct2D 1308 outperforms GDI 1300 and GDI+ 1302 in most situations. Direct2D also supports vector graphics, which employ mathematical formulas to represent line art. These formulas are not dependent on screen resolution, so they can be scaled to arbitrary dimensions. Vector graphics are particularly useful when an image must be scaled to support different monitor sizes or screen resolutions.

FIG. 14 depicts the Windows Display Driver Model (WDDM) architecture 1400. The architecture is divided between User Mode components and Kernel Mode components, as shown. The User Mode components include an application 1402 (which is actually not part of the WDDM architecture, but rather provides inputs to the WDDM architecture), a Direct3D runtime module 1404, a user-mode display driver 1406, an OpenGL runtime module 1408, a Win32 GDI module 1010, a kernel-mode access dynamic link library (DLL) 1412, and an OpenGL installable client driver (ICD) 1414. The Kernel Mode components include a DirectX graphics kernel subsystem (Dxgkml.sys) 1416, a Win32K.sys module 1418, and a display miniport driver 1420. Dxgkml.sys 1416 includes a display port driver, a video memory manager, and a GPU scheduler.

Figure 15:
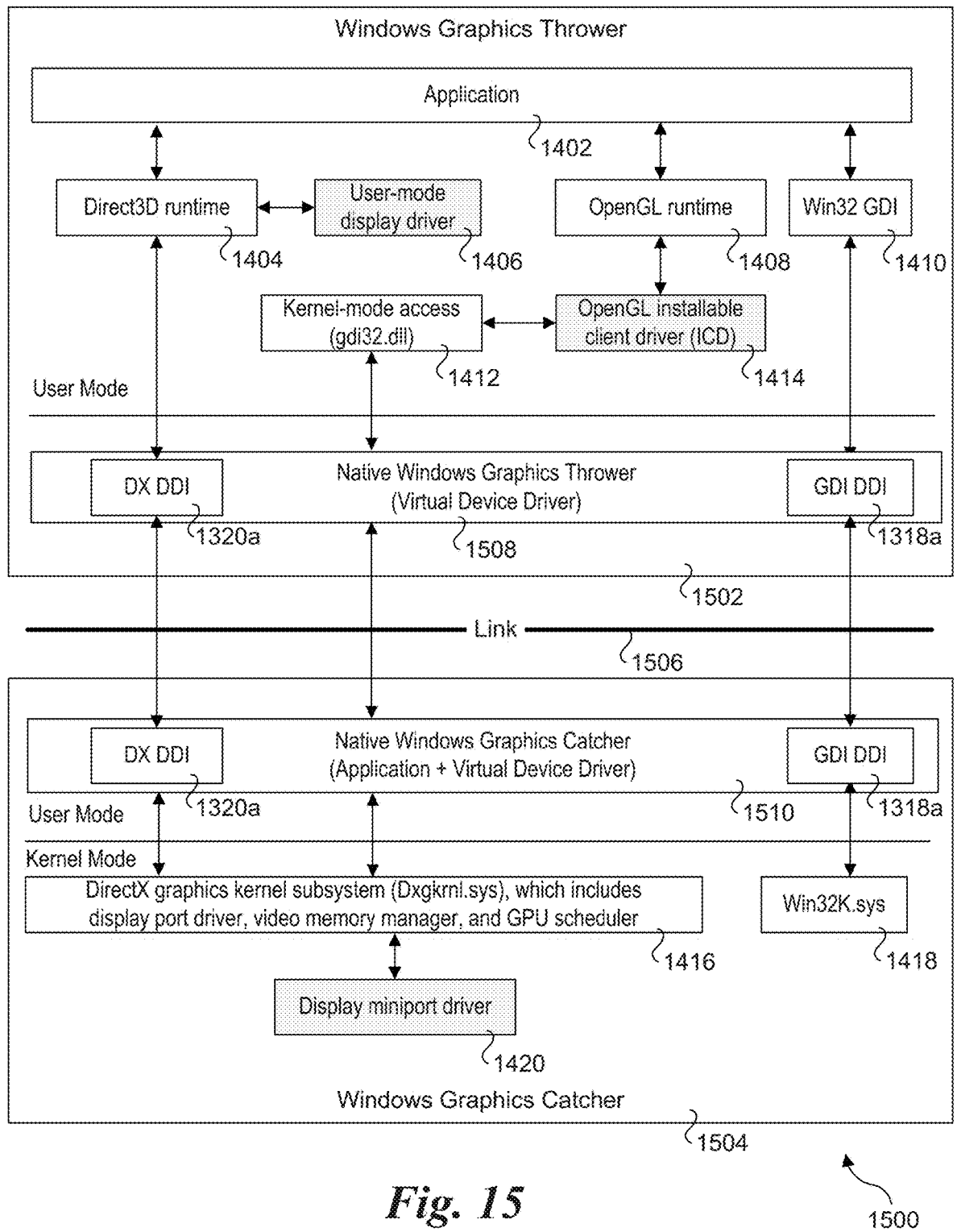
FIG. 15 is a block schematic diagram illustrating an embodiment of a Windows graphics thrower-catcher architecture under which a Windows graphic thrower throws native Windows graphics commands to a remote Windows graphics catcher.

FIG. 15 shows an embodiment of a Windows graphics catcher-thrower architecture 1500 under which a Windows graphics thrower 1502 throws native Windows graphics commands and content to a Windows graphics catcher 1504 over a link 1506. As shown in the upper portion if FIG. 15, Windows graphics thrower 1502 includes the user mode graphics components of the Windows graphics architecture should in FIG. 14. Meanwhile, under this split graphics architecture implementation, Windows catcher 1504 includes the kernel mode graphics components of FIG. 14.

To facilitate throwing of native Windows graphics content, Windows graphics thrower 1502 includes a native Windows graphics thrower 1508, while Windows graphics catcher 1504 includes a native Windows graphics catcher 1510. In the illustrated embodiment, native Windows graphics thrower 1506 is implemented as a virtual device driver that is configured to appear, from the perspective of the user mode components, to operate as a conventional Windows graphics device driver that includes GDI DDI 1318 and DX DDI 1320 of FIG. 13. However, an augmented GDI DDI 1318*a* and DX DDI 1320*a* are implemented instead, which are configured to forward the graphics content they receive to mating augmented GDI DDI 1318*b* and DX DDI 1320*b* on native Windows graphics catcher 1510. GDI DDI 1318*b* and DX DDI 1320*b* are virtual device drivers that are configured to interface to the kernel mode Windows graphics components depicted at the bottom of FIG. 15. In the illustrated embodiment, native Windows graphics catcher 1510 is implement as a Windows application that either includes software modules for implementing virtual GDI DDI 1318*b* and DX DDI 1320*b*, or interfaces with software modules that are implemented separately (such as services).

Figure 16:
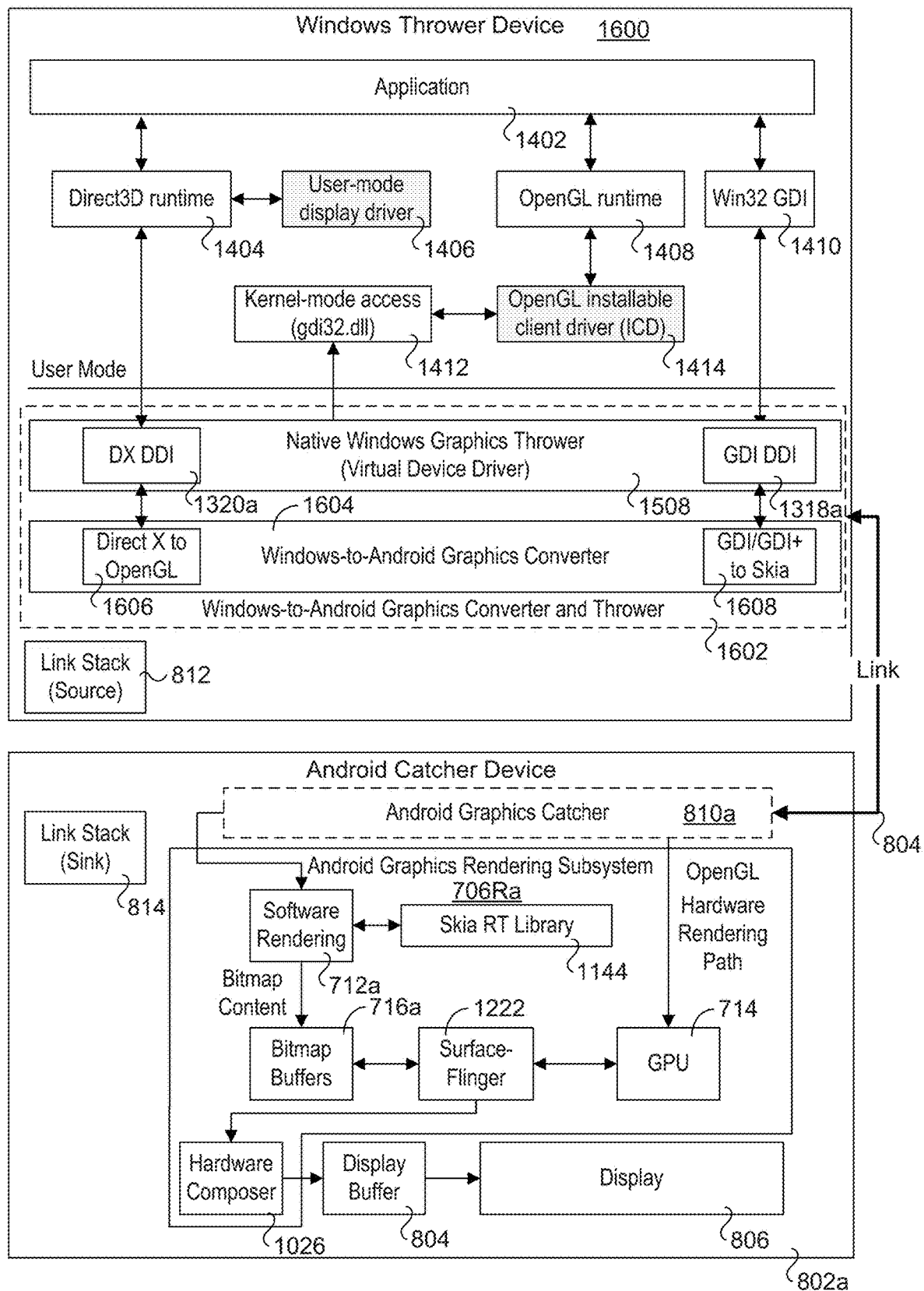
FIG. 16 is a block schematic diagram illustrating an embodiment of a Windows graphics thrower-Android graphics catcher architecture under which native Windows graphics commands and content are converted to native Android graphics commands and content on the Windows thrower device.

FIG. 16 shows another embodiment of a native graphics thrower-catcher architecture under which Windows thrower device 1600 throws Android graphics commands and content to an Android catcher device 802*a*. Under one embodiment Android catcher device 802*a* in FIGS. 8*a* and 16*a* share the same components (as applied to Android graphics catching and rendering). As illustrated, the user mode components for Windows thrower device 1600 are the conventional Windows user mode graphics components shown in FIGS. 14 and 15 as discussed above. A Windows-to-Android graphics converter and thrower 1602 is used to convert Windows graphic commands and content to corresponding Android graphics commands and content, and then throw the converted Android graphics commands and content. Windows-to-Android graphics converter and thrower 1602 includes an augmented native windows graphics thrower 1508*a*, which includes DX DDI 1320*a* and GDI DDI 1318*a*. It also includes a Windows-to-Android graphics converter 1604 including a Direct X to OpenGL converter 1606 and a GDI/GDI+ to Skia graphics converter 1608.

As its name implies, Direct X to OpenGL converter 1606 receives Direct X commands that are passed through DX DDI 1320*a* and converts those commands into corresponding OpenGL commands. One or more of various existing Direct X to OpenGL converters may be used for this purpose. For example, in one embodiment, Valve corporation's Dota 2's open source Direct3D to OpenGL translation layer may be used. The code, names "ToGL," is available from GitHub. Another open source Direct X to OpenGL converter is available from graphics chip maker ATI Techologies.

GDI/GDI+ to Skia graphic convertor receives GDI and/or GDI+ graphics commands via GDI DDI 1318 and converts them into equivalent Skia graphic commands. Generally, the GDI/GDI+ graphic commands will tend to concern raster content, such as images, although it may include other content, as well. Image content is typically based to a DDI as either a pointer to bitmap content that is already written to a bitmap buffer, or a pointer to the image content in its stored form, which may typically comprise a conventional graphics standard such as, but not limited to JPEG, PNG, GIF, etc. The image content may also be stored in a proprietary compressed format, such as a wavelet-based compressed form. Some applications, such as Google Chrome, internally employ Skia for rendering content. When these applications are deployed on Windows platforms (such as Windows 7, Windows 8.1, etc.), the Skia commands are converted to Windows drawing commands, which may include GDI/GDI+ drawing commands. Converting the other way (e.g., from GDI/GDI+) generally involves the reverse process.

Windows-to-Android graphics converter and thrower outputs OpenGL commands and Skia graphics commands (as applicable) and throws them to Android graphics catcher 810*a* on Android catcher device 802*a*. Android graphics catcher 810*a* then passes the OpenGL and Skia graphics commands to Android graphics rendering subsystem 706Ra in a similar manner to that discussed above with reference to FIG. 8*a*.

Figure 17A:
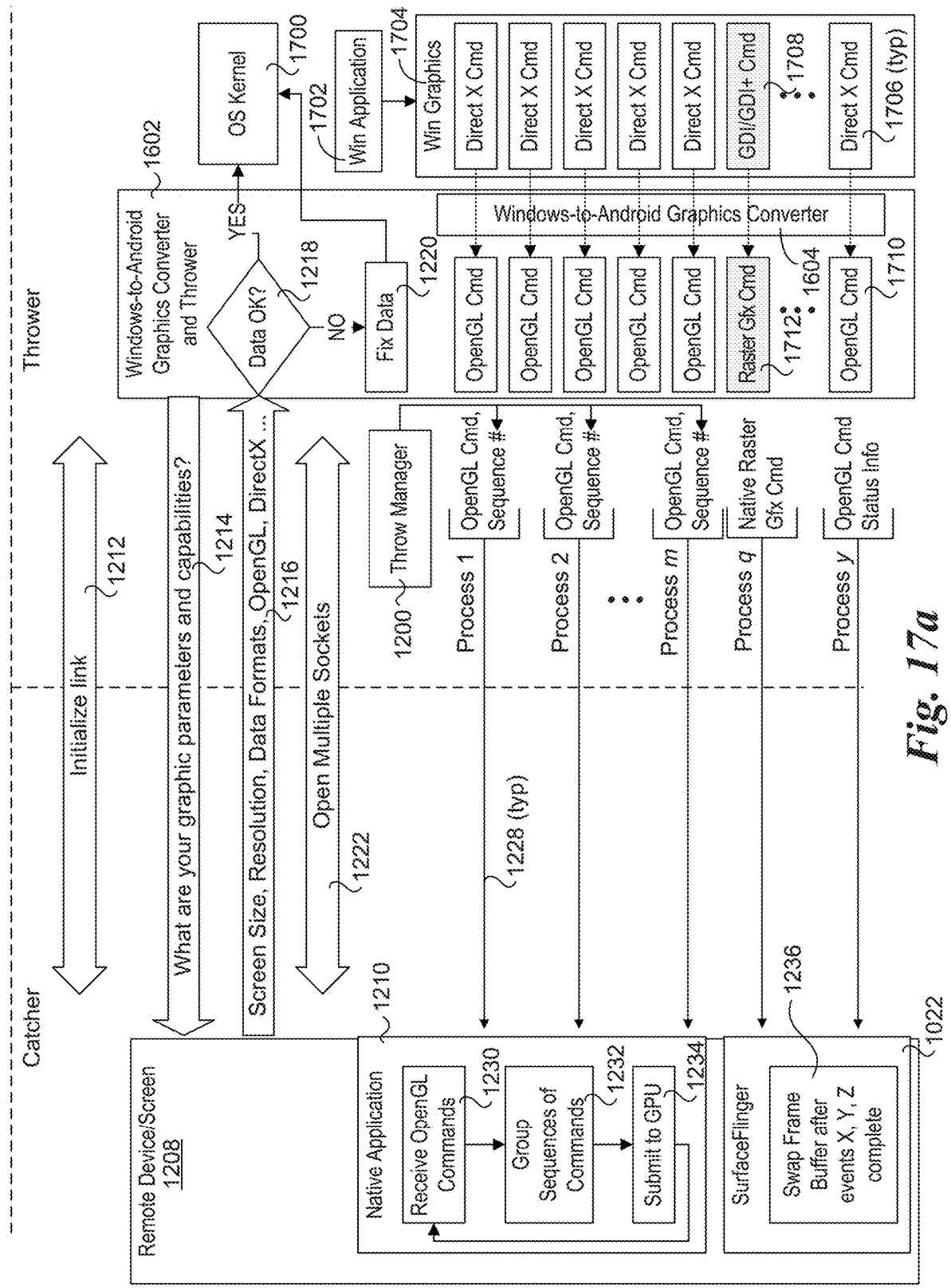
FIG. 17a is a combination schematic and message flow diagram illustrating an embodiment that throws native Android graphics commands and content from a Windows host device to a remote Android device using multiple sockets, wherein native Windows graphic commands and content are converted to Android graphics commands and content on the Windows host device.
Figure 17B:
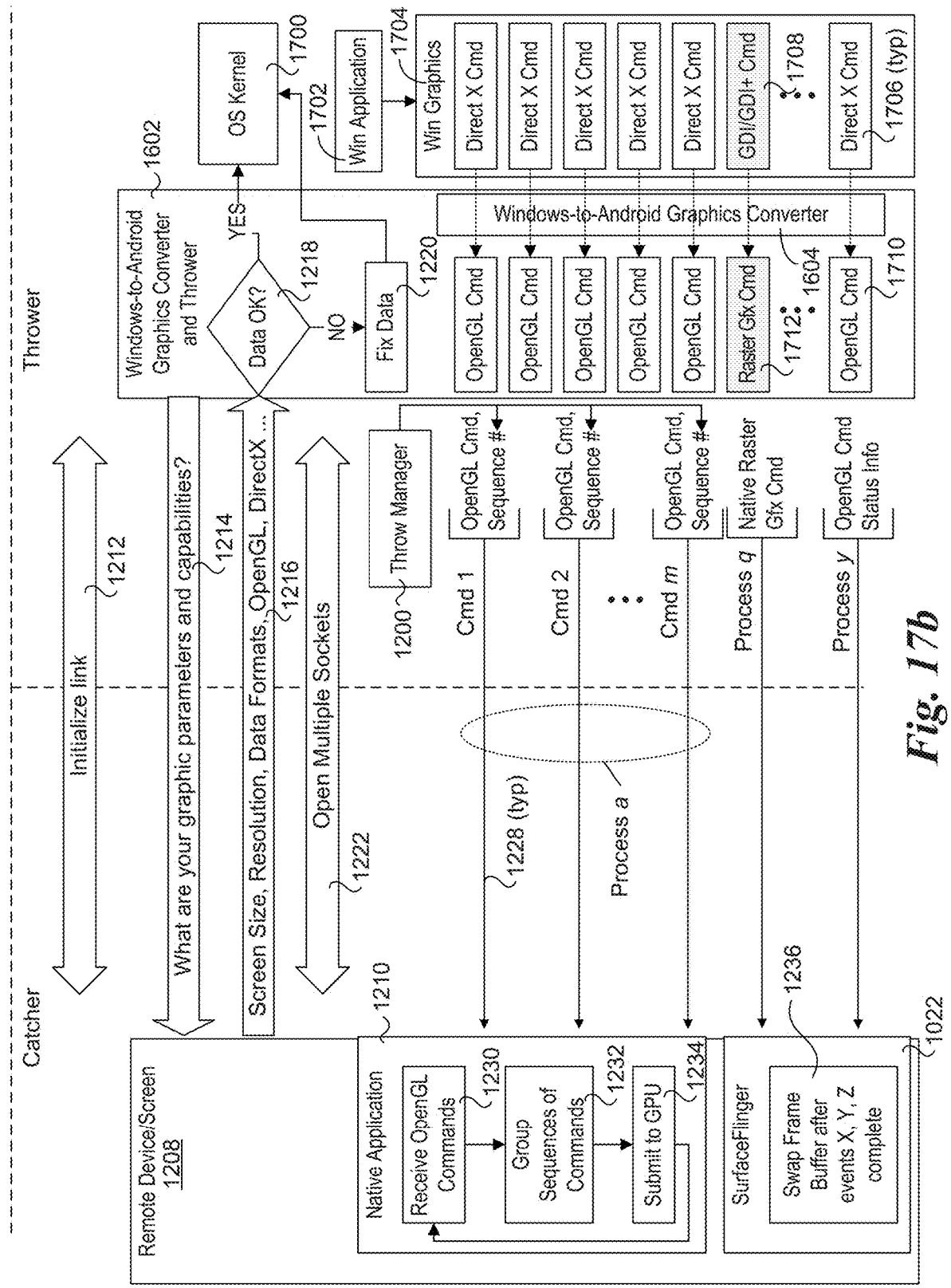
FIG. 17b is a combination schematic and message flow diagram illustrating an alternative configuration to that shown in FIG. 12a under which OpenGL graphic commands are sent using a single socket.

FIGS. 17a and 17b show alternative embodiments for setting up a link and throwing native Android graphic commands and content in accordance with the embodiment of FIG. 16. As depicted by like-numbered components in FIGS. 12a, 12b, 17a, and 17b, many of the components in FIGS. 17a and 17b are similar to those discussed above with reference to FIGS. 12a and 12b. In addition to these components, FIG. 17a shows a Windows-to-Android Graphics Converter and thrower 1602 including a Windows-to-Android graphics converter 1604, an OS kernel 1700, a Windows application 1702, and Windows graphics commands 1704 including DirectX commands 1706 and GDI/GDI+ commands 1708.

Windows-to-Android graphic converter is configured to convert Direct X commands 1706 into OpenGL commands 1710 and GDI/GDI+ commands 1708 into native Android native raster graphics commands 1712 (e.g., Skia commands) in the manner described above with reference to FIG. 16. The OpenGL commands 1710 and Android native raster graphics commands are then sent to remote device/screen 1208 in a similar manner to that described above for FIGS. 12a and 12b, wherein the embodiment of FIG. 17a uses multiple sockets to transport OpenGL commands 1710, while the embodiment of FIG. 17b uses a single socket.

Figure 18:
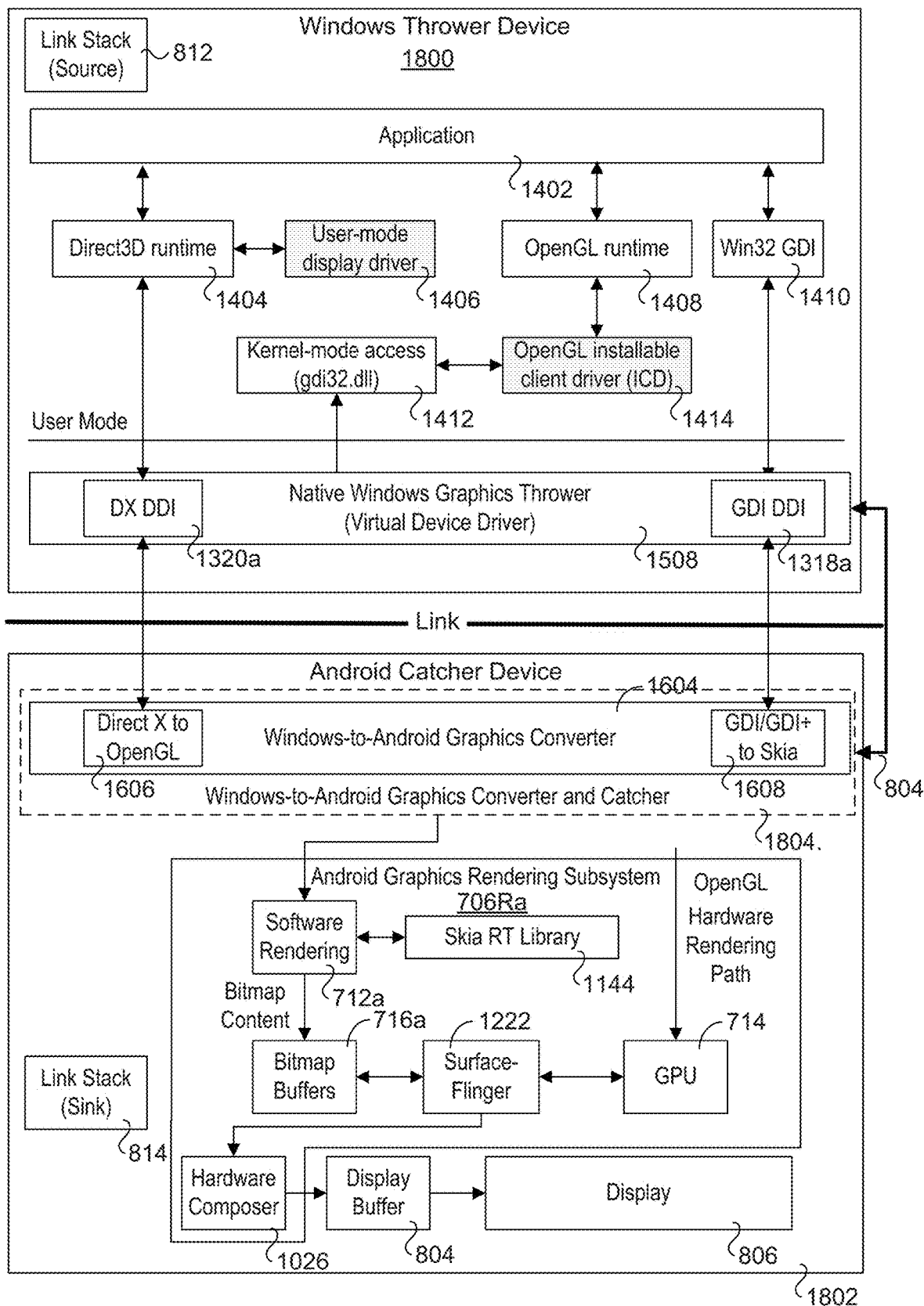
FIG. 18 is a block schematic diagram illustrating an embodiment of a Windows graphics thrower-Android graphics catcher architecture under which native Windows graphics commands and content are converted to native Android graphics commands and content on the Android catcher device.

As an alternative to having the Windows-to-Android graphics command and content conversion done on the thrower, in one embodiment these operations are performed by the catcher. An exemplary implementation of this approach is shown in FIG. 18, wherein a Windows thrower device 1800 throws DirectX and GDI/GDI+ graphics commands and content to an Android Catcher device 1802 that includes a Windows-to Android graphics converter and catcher 1804. This component includes the same Windows-to-Android graphics converter 1604 as shown in FIG. 16, except that now the Windows-to-Android graphics converter is on the catcher device rather than the thrower device.

Little Data Engine

There are various domains where sensors and devices are established or expected to become established. With Google's acquisition of Nest the home automation company, we can expect our homes eventually will be fully-automated and connected to the clouds. Health is another big domain where wearable sensor technologies are being established. Today, most of these health-focused wearables either directly connect to the cloud or rely on an associated smartphone for part of their compute and analysis and as a connectivity medium to the cloud. Automotive IVI and vehicle efficiency is another domain where more and more companies are announcing cloud connectivity and offer to monitor various critical parameters in real time (traffic, vehicle critical operating sensors) and help users with various offers and utilities. Retail and order payment is another big domain for data collection and analytics.

Although many States are working to draft standard privacy policy for cloud computation based organizations, there is still lack of awareness and implementation of these policies, (even when they exist). Sensors and cloud connectivity have major privacy, flexibility and fairness constraints. The current industry approaches have favored functionality over privacy and security.

Collecting the data from sensors and devices in a secure way is a challenging task. Today, most of the devices push their data either to some central point (such as an associated smartphone, home gateway, etc.) Using wireless connection (e.g. BLUETOOTH) or directly talk to the cloud (e.g., Google glass) using a mobile network. Much of the data transfer happens in unencrypted form. Direct cloud connectivity requires high power consumption from the device. Also, it requires every device to have one unique internet connection. On the other hand, the central point connection (gateway model) only requires one internet connection for multiple devices and can employ a low power sensor network to connect to the gateway, hence consumes less power per device. Encryption exerts power, performance and cost taxes on the sensors. [We have developed hardware encryption engines for iA, and believe a lightweight variant with a simplified key structure is required for sensor data security this is part of the little data engine proposal.]

Most of the data is stored in the cloud for two reasons: universal access and data mining. More questions have recently been asked about the privacy of the data such as: (a) who can use the data; and (b) what data can be seen by the outside community. Some of this data is very sensitive and exploitation can lead to misuse and great financial loss. An individual's health data is an example is one of the most private of data, which requires careful access control. The biggest challenge for medical industry is to mine the health data without seeing it. Some proposals for anonymous data mining have been made by both well-known and lesser-known companies and organizations. However, effectiveness of these systems still needs to be validated.

In most of these cases, not all the data must be put into the public domain in unencrypted form. For example, drivers of automobiles don't want to share their driving speed records and car maintenance records to the public domain. Many people are reluctant to share their brand preferences, recognizing this type of information is often abused by marketing companies and the like. Similarly, people may not want to share their dietary and food preferences to the public. The Little Data Engine addresses this issue in a unique manner—by local secure processing.

Data processing can be divided into two categories: First, the processing that combines the sensor data with rest of the community data and then make some interesting and sensible information out from it. For example: how one's electricity bill compares to their neighbors, who presumably are experiencing the same weather. Second, the integration of new local data with Retail, Health, Automobile, and Home previously established data.

Little data combining and integrating is one part of data processing, processing with big data is another. Big data processing can be further divided into two categories: first, local combining and processing. Second, combining with public data and processing. Depending on the user preference, one can opt for local processing on local private data and cloud or remote processing for public data. Unfortunately current systems don't provide such flexibility. All the processing is done in cloud. The Little Data Engine will enable users to opt for local processing and privacy, while providing an open innovation sandbox.

Data recommendation may be in any form, like offers, suggestion, warning etc., to make customers life more convenient. Data recommendations may be used for an individual or at a large level for a region or for community. Data recommendation can be sold to an individual or to interested buyers. The big question raised is whether individuals want to show their recommendation offers to other and let them leverage it. What sort of discretion can an end-user have on it? What sort of discretions can individuals have? Maybe it might be desired to allow some of the mining information to show to the outside community that can indirectly help individuals or groups, while it may be desired to never share other portions with the public. For example one might not want to share his below-average driving experience compared to the outside community, but at the same time want to share his above-average car maintenance record.

Current data architectures present too-many end user concerns and other constraints. Rather, an ideal data ecosystem should provide:

A highly flexible and customizable system from all the interested parties point of view.
  End users may change the privacy knob based on different data.
  User can change which cloud they want to store and where they want data processing (e.g., local or remote processing).
A highly secure and reliable system that is trustworthy.
  Preferably, all parties could trust each other based on the system design of information flow.
Equal stake holders of all the parties to avoid any one of them getting too much attraction.
  Users hold their data and may sell it to anyone regardless of whose sensors and device are installed in the personal ecosystem or having a loose binding between device and cloud.
  Based on user preference, data can be stored, mined and information can be sold to multiple buyers with no restriction from the user side.
The optimum level of utilization of the connected resource into the system to drive down the cost.
  Reduce the internet connection required and thus the power to transfer the data.
  Most preferably one device to manage all the sensors in different domains. Avoid misuse of the mined data in a direct or indirect manner.
  All the data should pass through some central device owned and maintained by the user with strict security and preferred configured privacy, flexibility options.

The Little Data Engine (LDE) is a manager for user's sensor cloud connectivity ecosystem that manages data collection, data storage, data processing and data recommendation. It is a central device that an individual owns and maintains. The Engine is fully customizable in terms of privacy and flexibility. Based on the features required and user custom configuration data storage, processing and recommendation can simultaneously done by the LDE and in the cloud, or can be completely done locally in LDE in a user preferred defined way. The LDE respects the end-user preferences and discretions. It allows the user to connect to the various cloud as a data storage, data miner or information buyers and thus drives the fair competition to ensure optimum resource utilization and cheap solution delivery to the community.

The LDE architecture is designed to give users the maximum flexibility in terms of features, management and privacy of the system. This is supported through one engine to manage all of a user's sensors and devices. The architecture also is highly flexible in terms of privacy and features, enabling users to tailor the LDE to fit their needs. The LDE also supports offline features and functionality, enabling it to be used in unconnected environments.

Figure 19:
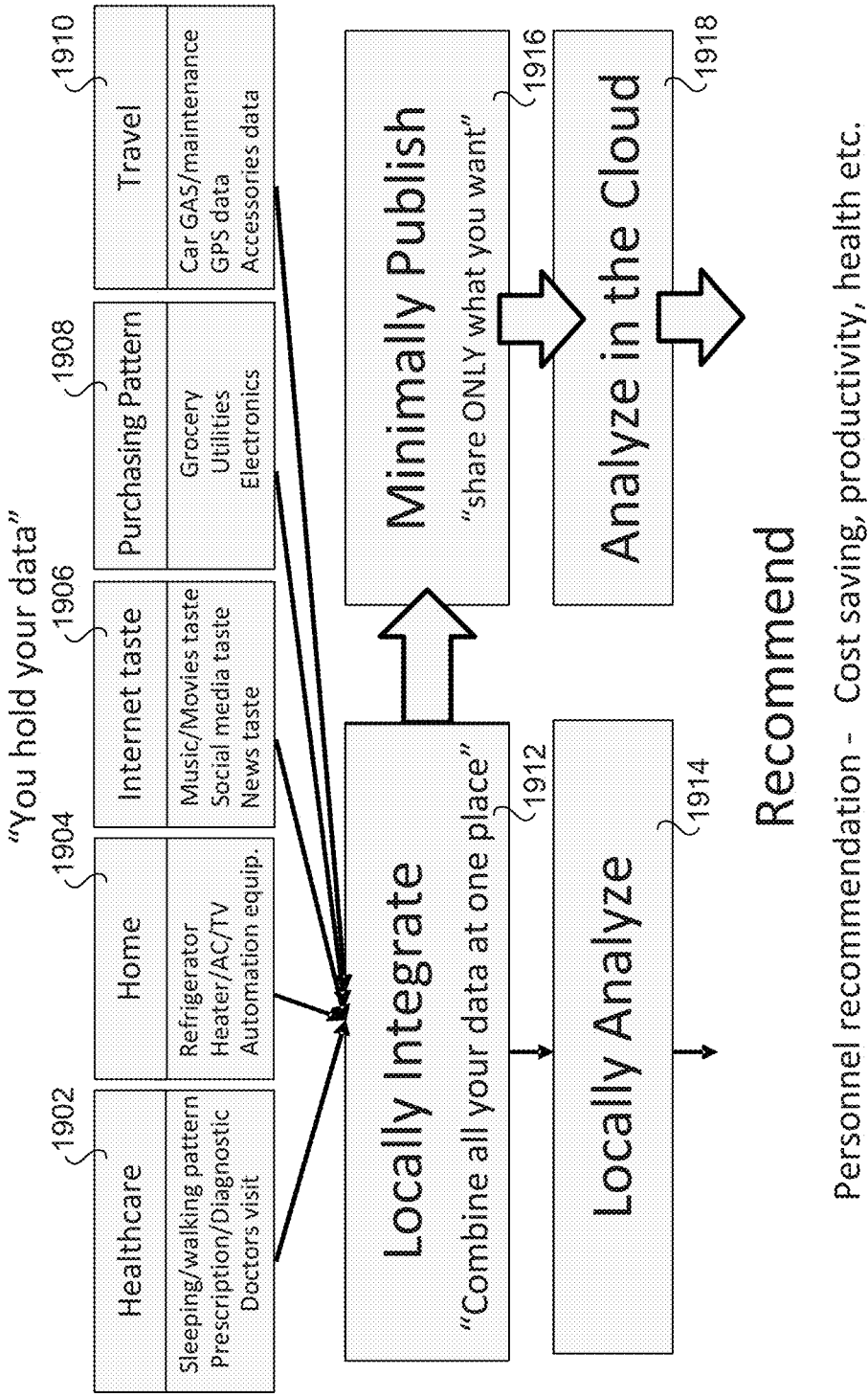
FIG. 19 is a block schematic diagram illustrating a high-level overview of selected components in a Little Data Engine (LDE) architecture, according to one embodiment.

FIG. 19 shows a high-level overview of selected components in an LDE architecture 1900, according to one embodiment. An exemplary sets of data are depicted at the top of architecture 1900, including healthcare data 1902, home data 1904, Internet taste data 1906, purchasing pattern data 1908, and travel data 1910. It will be understood that these are merely a handful of types of data that may be stored by an LDE.

As shown by a locally integrate 1912, all of the data corresponding to healthcare data 1902, home data 1904, Internet taste data 1906, purchasing pattern data 1908, and travel data 1910 and integrated in one place, e.g., on the one device. Local analysis on the data may be performed by a locally analyze block 1914, which may result in one or more personal recommendations, as described below in further detail A user may also choose to share selected data with others and/or various data services, such as cloud-hosted data services. This is supported by a block 1916 labeled "minimally publish" and a block 1918 labeled analyze in the cloud.

Figure 20:
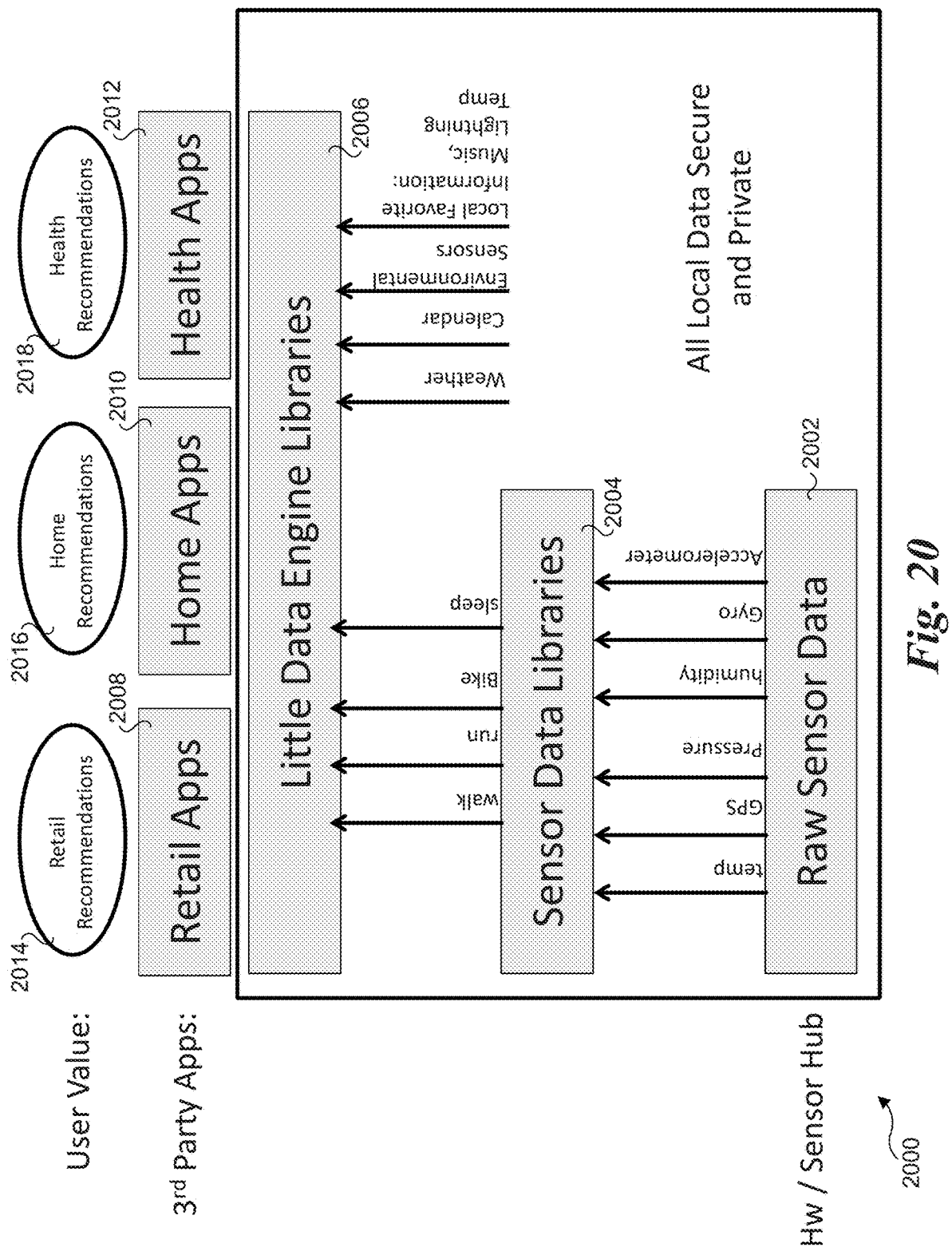
FIG. 20 is a block schematic diagram illustrating an architecture for the LDE's analytic stack relating to processing sensor data.

FIG. 20 shows an architecture 2000 for the LDE's analytic stack relating to processing sensor data. Architecture 2000 includes raw sensor data 2002, sensor data libraries 2004, LDE libraries 2006. The LDE libraries facilitate integration with third party applications including retails apps 2008, home apps 2010, and health apps 2012, each of which are shown respectively providing retail recommendations 2014, home recommendations 2016, and heath recommendations 2018.

Generally, the LDE architecture data collection from the sensors may be performed on an ongoing real-time basis and/or periodically (e.g., via polling or the like). In one embodiment, this depends upon the proximity of the LDE to the sensors. For example, a user can fetch the data from automobile sensors while in car, and from home sensors while at home. A given sensor will generally include minimum local storage for raw data or semi-processed data, depending on sensor type. In one embodiment, each sensor is preregistered with the LDE using a security authentication and authorization protocol and sensitive data is transferred to the LDE in an encrypted form.

In one embodiment, the LDE includes 1 TB or more of storage in the device itself Generally, there is no need to store the raw sensor data one the LDE; rather, just the processed data is to be stored. For example, real-time determination of calories burned throughout the day from a calorie sensor device are not stored, instead the LDE may save calories burned per day or per hour. The LDE may also act as a cache in an overall data storage architecture, including cloud-based storage. For example, data collected from sensors by the LDE is encrypted and sent to the user's preferred public cloud, and the encryption key can be stored in a security cloud, via a user's secure keychain, or other well-known techniques.

In one embodiment, the LDE includes a hardware analytic SoC engine and a well-defined API on which an app ecosystem can be built on. As shown in FIG. 19, data processing can be split into two parts, local and remote (in cloud) depending on user configuration, Internet connection, and query type. Public data processing can be done in the cloud or locally. Private data processing is always done locally. Local processing includes data integration from various sensors and performing analytics on integrated data. For example, while looking for a place to have lunch, nearby restaurants can be fetched from the public cloud while a user's dietary preference and driving speed can be fetched locally from private data and recommendations can be generating identifying which restaurants are suitable (for meeting the dietary preferences) and how much time it will take to reach them. As a mobile device, the LDE has the advantage of being able to talk to multiple domains and is able to synthesis information much better than other existing solutions.

Similar to the data processing, data recommendation can be taken from a public cloud or from the LDE or it can be a mix of both. Based on the query type, the LDE will push the processing to the cloud or locally for analysis, and take the recommendation from cloud and integrate it with local recommendation data and send it to the user.

Figure 21:
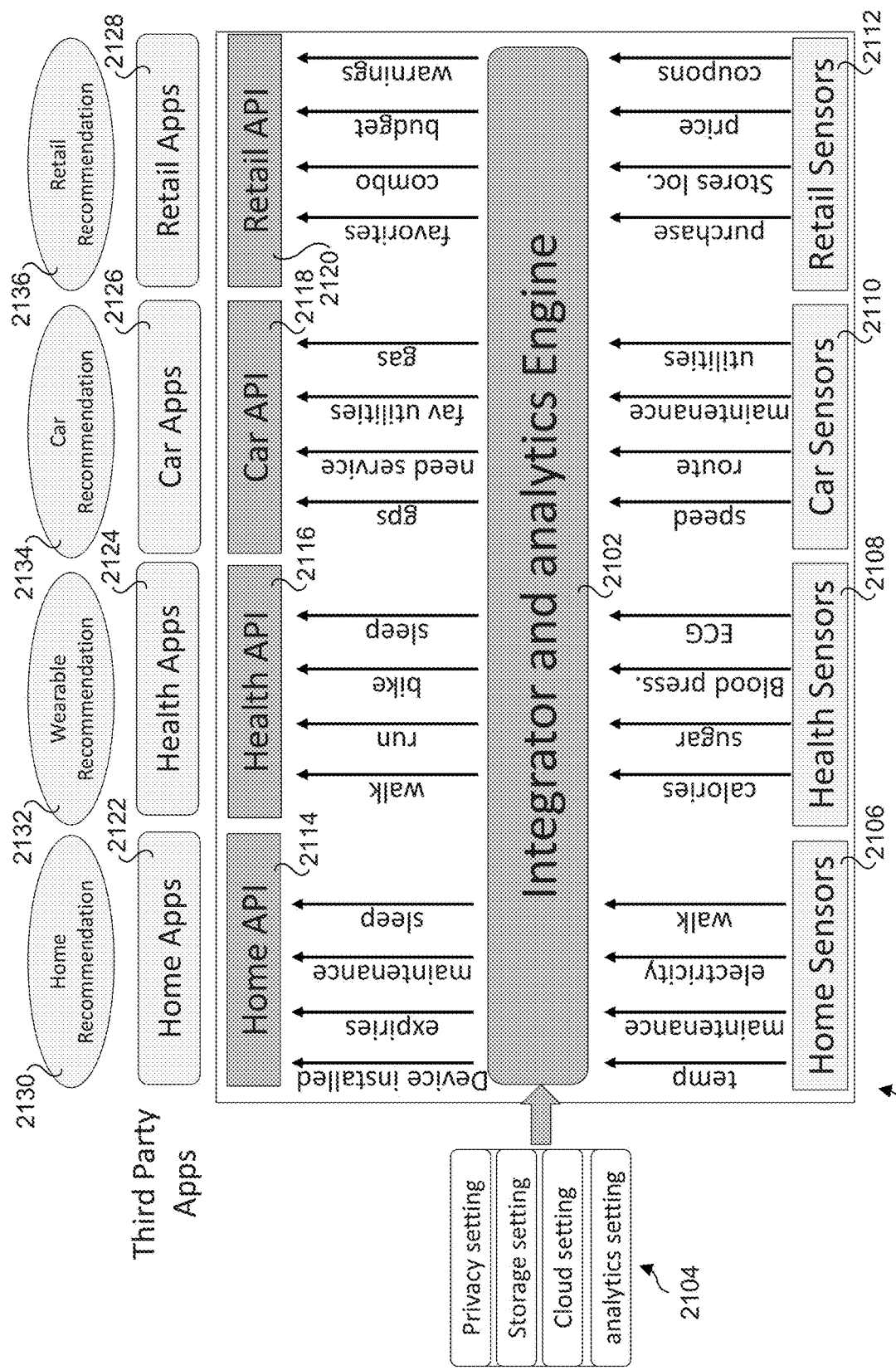
FIG. 21 is a block schematic diagram illustrating a software API for the LDE, according to one embodiment.

FIG. 21 shows a software API 2100 for the LDE, according to one embodiment. At its core, software API 2100 includes and integrator and analytics engine 2102 that receives input settings 2104, such as privacy settings, storage settings, cloud settings, and analytics settings. Integrator and analytics engine 2102 receives input from home sensors 2106, health sensors 2108, car sensors 2110 and retail sensors 2112, noting other the integrator and analytics engine may receive inputs from other types of sensors (not shown). Integrator and analytics engine 2102 provides inputs to a home API 2114, a health API 2116, a Car API 2118, and a retail API 2120. Each of these APIs provides a programming interface to a related third-party application class, which in turn provides associated recommendations. For example, the third party applications include home apps 2122, health apps 2124, car apps 2126, and retail apps 2128, each of which makes a respective recommendation depicted as home recommendation 2130, wearable recommendation 2132, car recommendation 2134, and retail recommendation 2136.

Figure 22:
FIG. 22 is a table illustrating a personal analytics usage model 2200, according to one embodiment.

FIG. 22 illustrates a personal analytics usage model 2200, according to one embodiment. Person analytics usage model 2200 is laid out as a table including a Retail column 2202, a Home column 2204, and a Health column 2206, a Sense row 2208, an Integrate row 2210, and a Recommend row 2212. The process flow traverses downward from receiving sensor data (i.e., as depicted in Sense row 2208), integrating the data (Integrate row 2210), and generating a recommendation (Recommend row 2212). By way of example, the analytics usage model for a user's health may include sensing one or more of the user's pulse, skin temperature, exercise activity (e.g., walking, biking, etc.), sleep, and dietary information. The information is integrated with inputs from Retail column 2202 and Home column 2204 and processed to produce a calendar, dining options, home environment data, and weather data. Recommendations are then provided, including recommended exercises, eating improvements, and regular activities.

Figure 23:
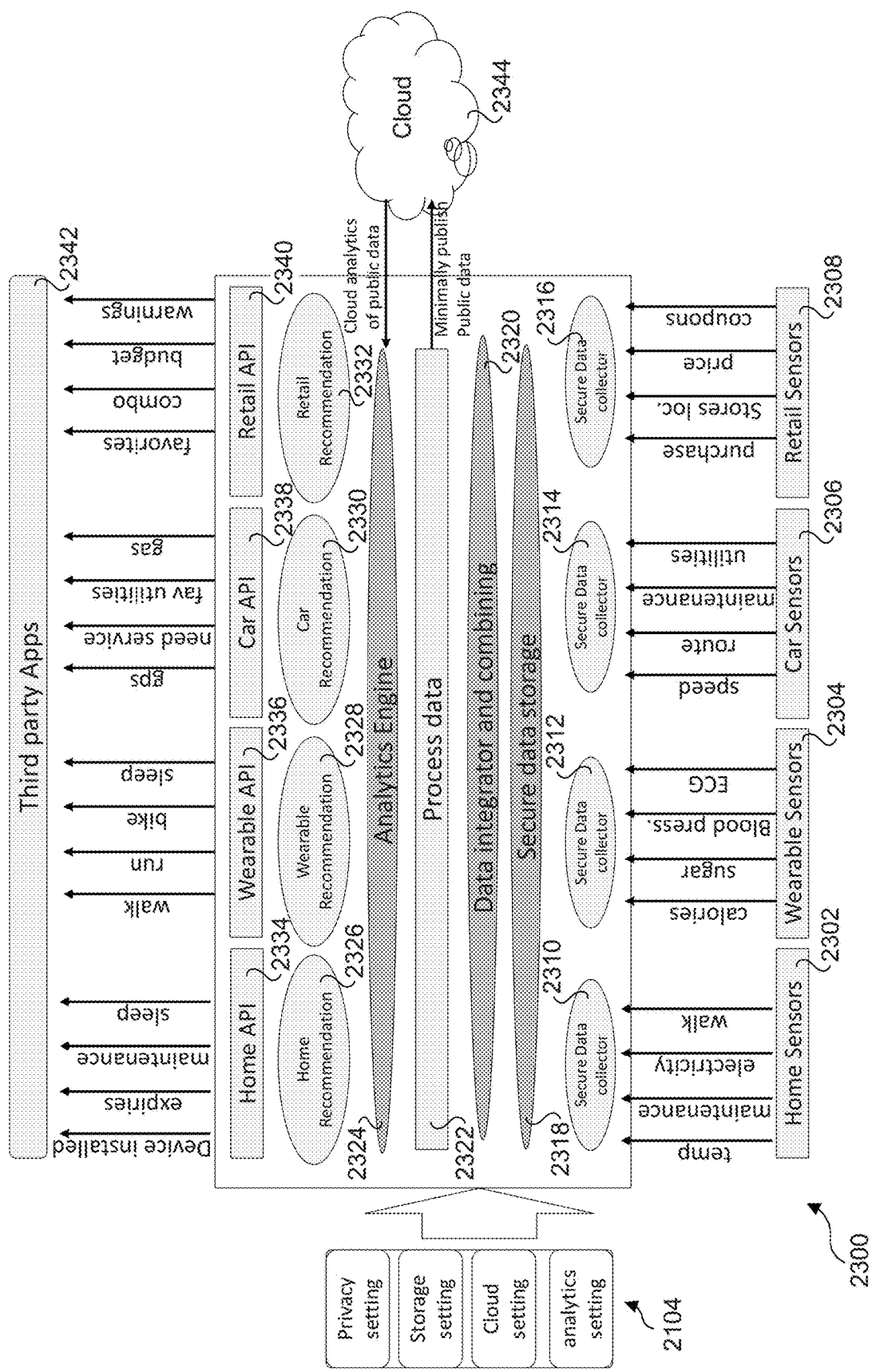
FIG. 23 is a block schematic diagram illustrating an implementation architecture that illustrates further integration of components discussed herein.

FIG. 23 shows an implementation architecture 2300 that illustrates further integration of components discussed above. Implementation architecture 2300 includes home sensors 2302, wearable sensors 2304, car sensors 2306, retail sensors 2308, secure data collectors 2310, 2312, 2314, and 2316, secure data storage 2318, data integrator and combining 2320, process data 2322, an analytics engine 2324, a home recommendation 2326, a wearable recommendation 2328, a car recommendation 2330, a retail recommendation 2332, a home API 2334, a wearable API 2336, a car API 2338, a retail API 2340, third party applications 2342, and a cloud 2344.

Process data 2322 represents data that is generated through processing various sensor inputs and other input data. As discussed above with reference to FIG. 19, a user can selectively publish whatever portion of process data 2322 to cloud 2344 the user desires. This enables cloud-based analytics of the data, which is received by analytics engine 2324. Recommendations including one or more of home recommendation 2326, wearable recommendation 2328, car recommendation 2330, and retail recommendation 2332 are generated by analytics engine 2324, either entirely locally or combined with cloud-based recommendations.

Exemplary Computing Card Packaging

Figure 24A:
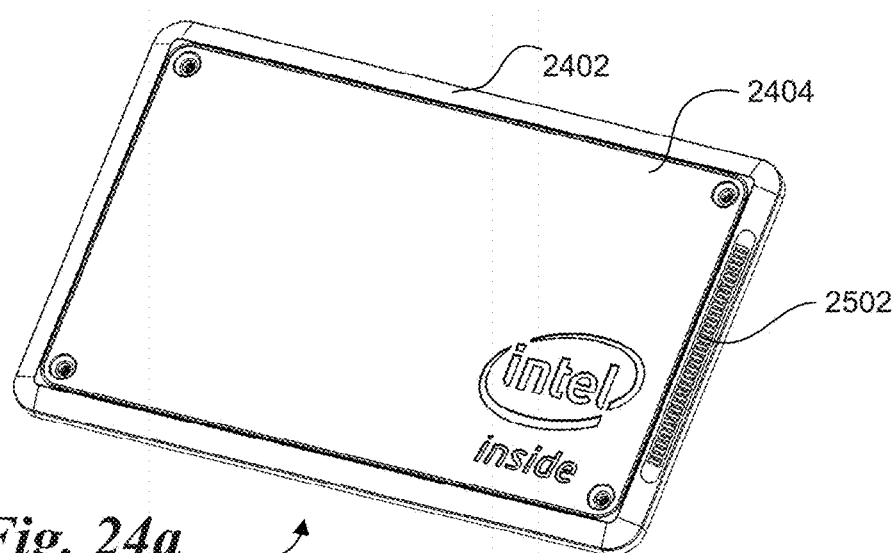
FIGS. 24a, 24b, and 24c show exemplary views of a computing card, according to one embodiment.
Figure 24B:
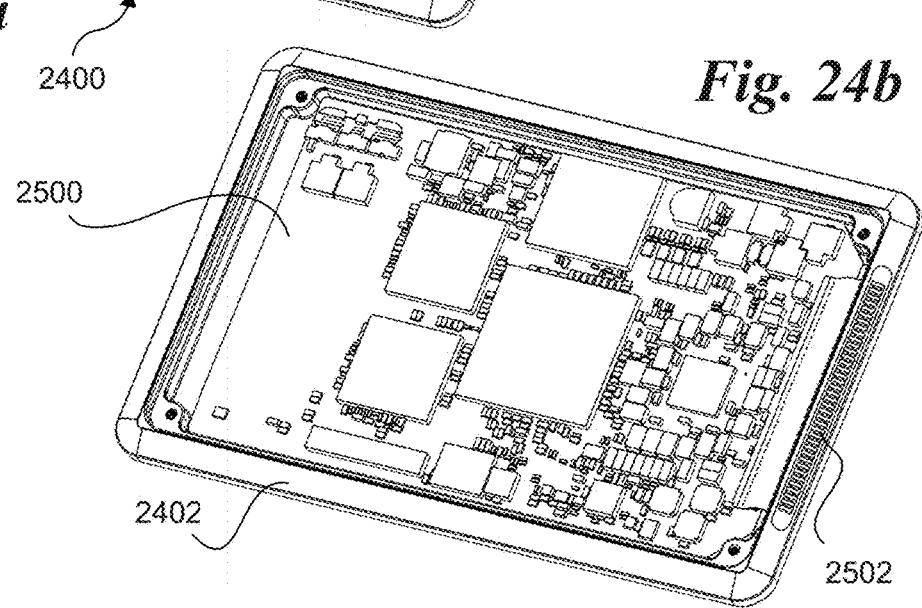
Figure 24C:
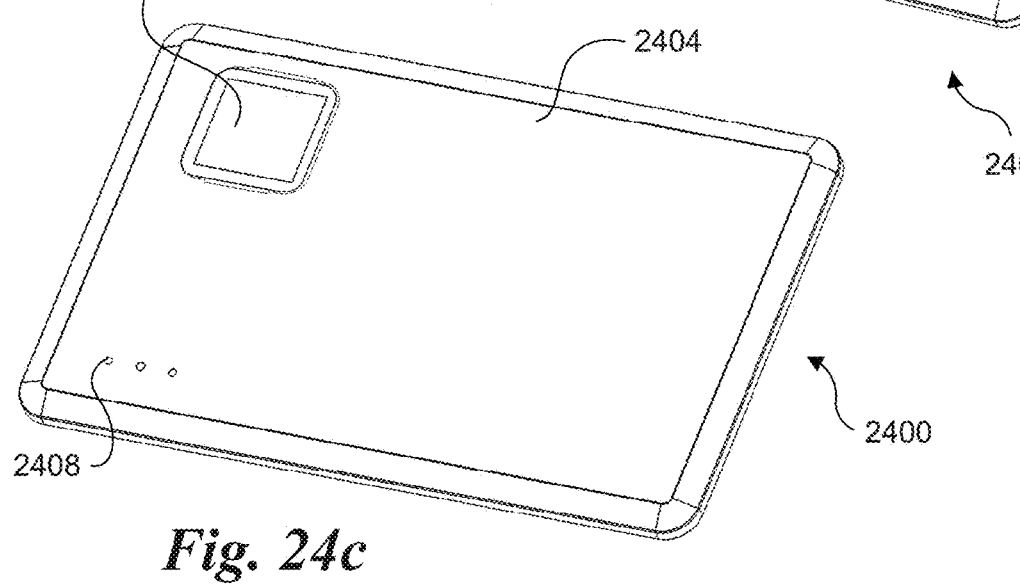
Figure 25:
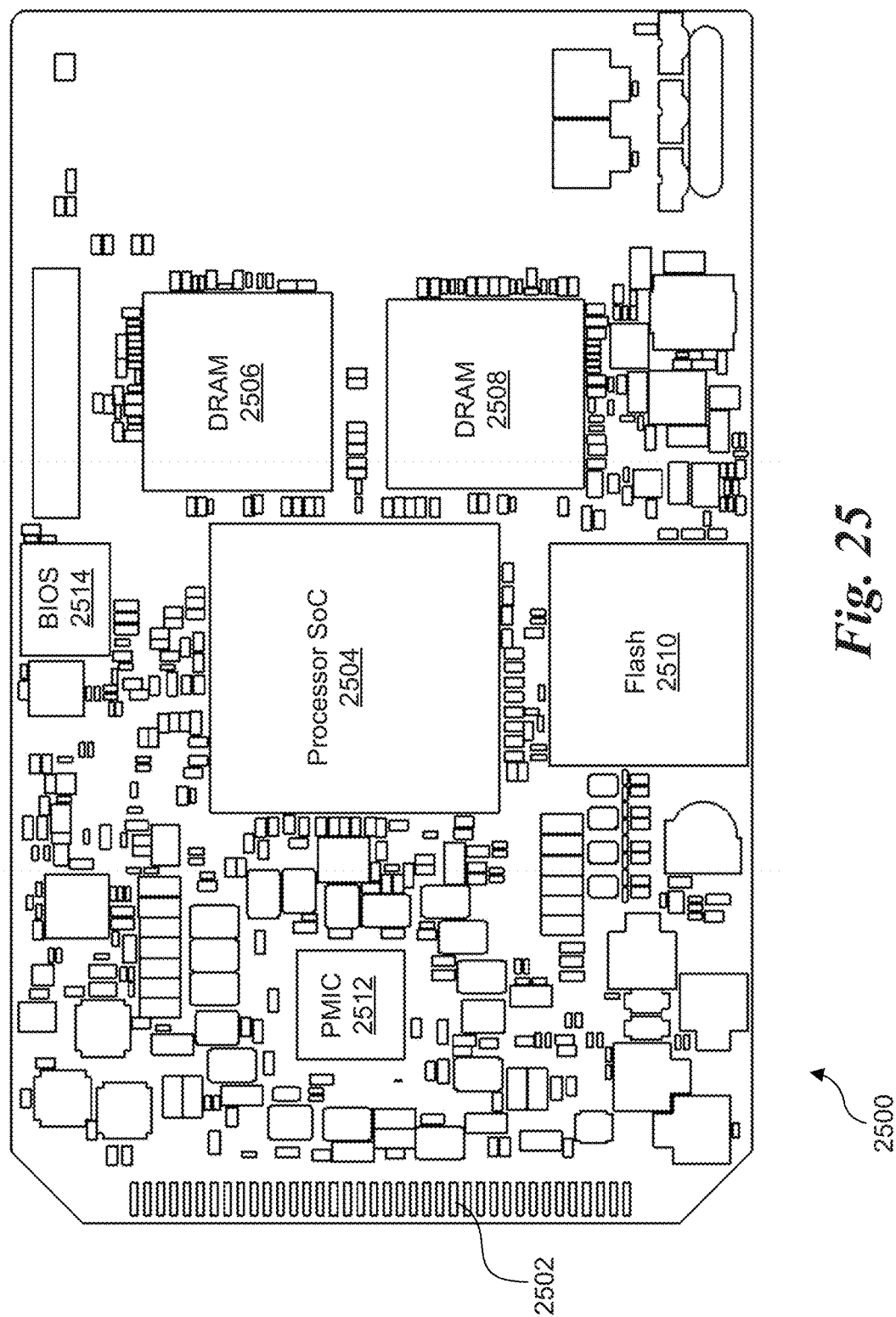
FIG. 25 shows an embodiment of a processor board that is suitable for use in the computing card of FIGS. 24a-24c.

In accordance with further aspects of the embodiments, a processor board may be disposed within a housing, such as depicted by computing card 2400 of FIGS. 24a, 24b, and 24c. The packaging for computing card 2400 includes a housing comprising a housing shell 2402 to which a cover plate 2404 is mounted. As shown in FIG. 24b, a processor board 2500 is disposed within the housing, and includes an edge connector 2502 that is externally accessible (i.e., no disposed in the housing). As shown in FIG. 24c, in one embodiment computing card 2400 includes a button 2406 and optional LEDs 2408. In one embodiment, computing card 2400 is disposed within backpack 2402, and its edge connector 2502 is coupled to a mating connector disposed within the lower portion of backpack 2402 (not shown). In an alternative configuration, a computing card may be inserted into the back of a backpack or similar device, allowing the computing card to be removed from the backpack without requiring removal of the Android phone from the backpack. Under various options, a backpack may include additional resources, such as a battery and associated battery power supply and charging circuitry. In addition, the computing card itself may include a battery FIG. 25 shows one embodiment of a processor board 2500 that is used in computing card 2400. Processor board 2500 includes an edge connector 2502 that is use to provide an I/O signal and voltage interface with other components. Processor board 2500 further includes a processor SoC 2504, a pair of DRAM chips 2506 and 2508, non-volatile storage comprising a flash chip 2510, a Power Management Integrated Circuit (PMIC) chip 2512, and a BIOS chip 2514. In addition, a processor board would include various other components and circuit elements that are well-known to those having skill in the art, and thus are not separately identified.

Figure 26:
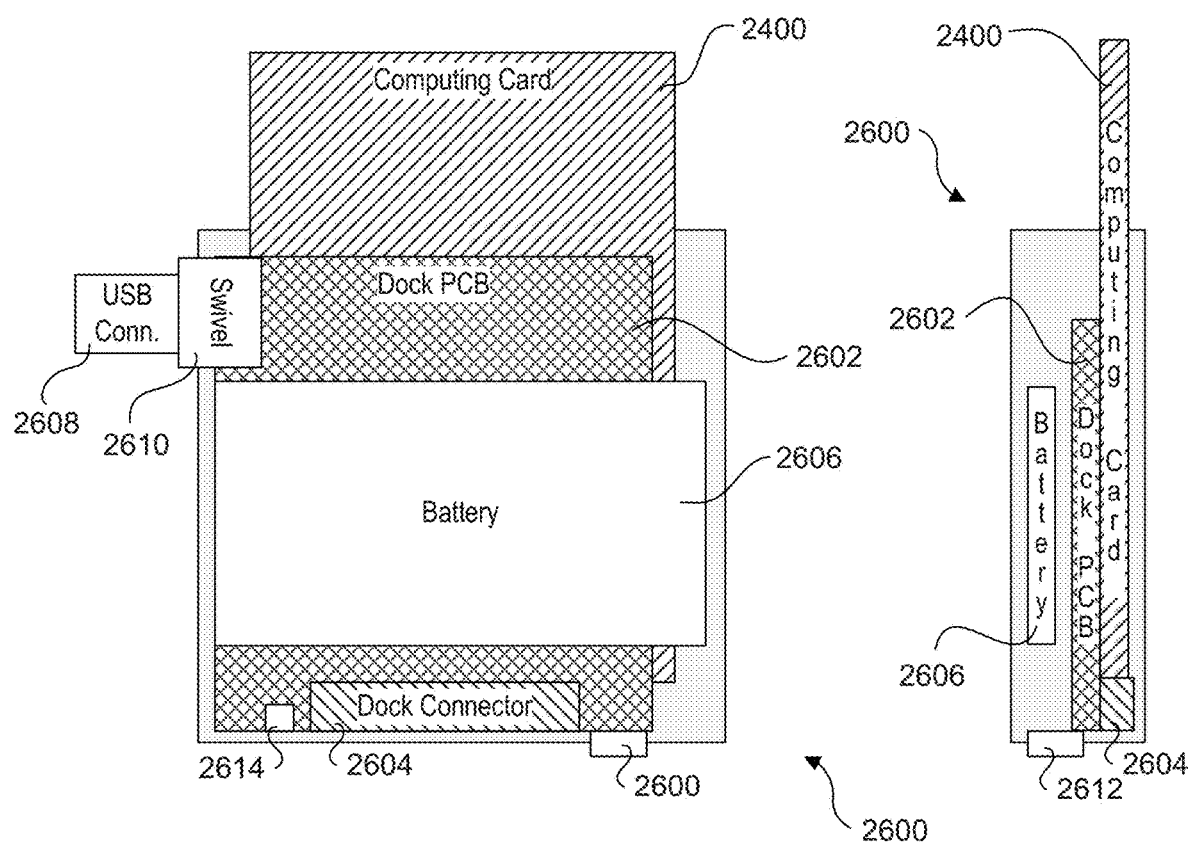
FIG. 26 illustrates the mechanical packaging of one embodiment of a computing card dock.

FIG. 26 depicts an embodiment of a dock 2600 in which a computing card 2400 can be installed to enable the computing card to be provided with power (for computing cards that do not have built-in batteries) and to communicate with a host computer via a USB link. Dock 2600 includes a dock PCB 2602, a dock connector 2604, a battery 2606, a USB connector 2608 coupled to dock PCB 2602 via a swivel 2610, a button 2612, and an LED 2614. Dock 2600 is configured such that when computing card 2400 is installed in a slotted opening at the top of the dock, its edge connector 2502 mates with dock connector 2604.

Figure 27:
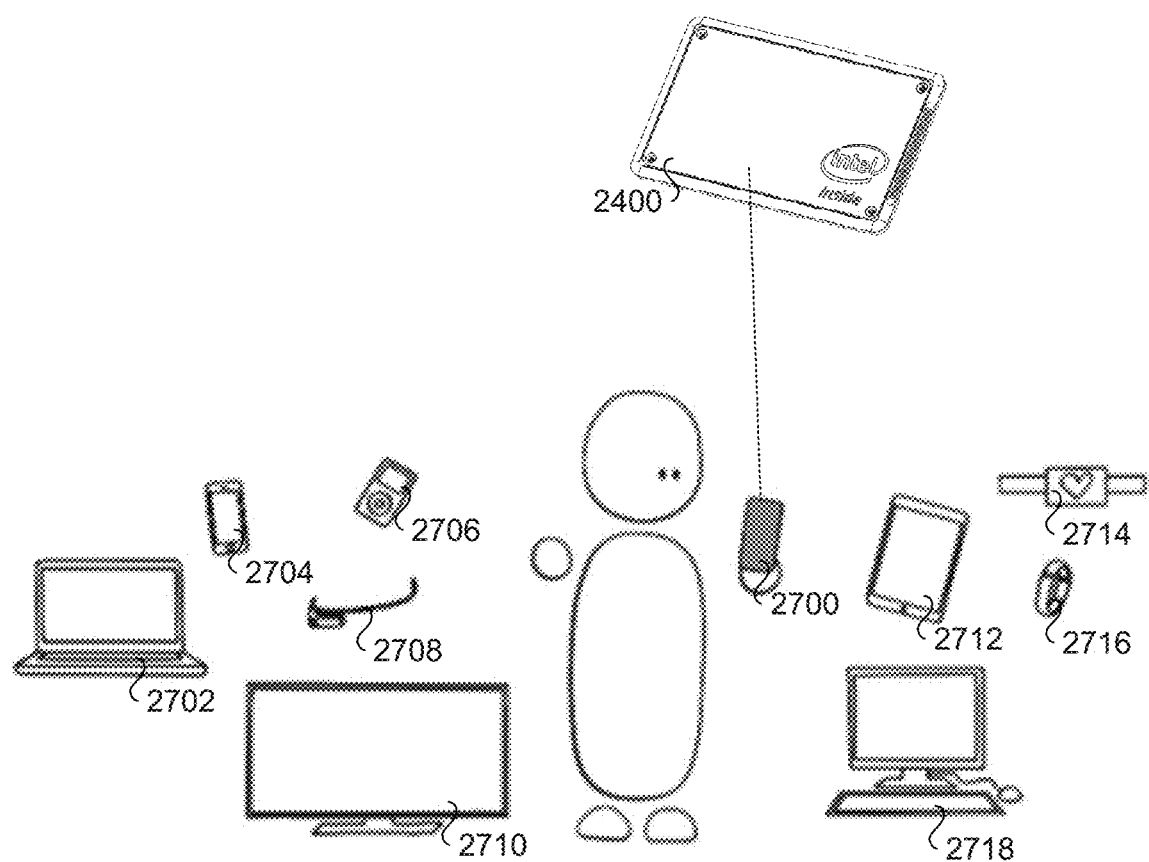
FIG. 27 is a diagram illustrating a computing card that is configured to access multiple devices.

A computing card may serve as a single device that provides access to data and application on a wide range of devices. An example of this is illustrated in FIG. 27, wherein a One device 2700 computing card 2400 is configured to implement a One device 2700 that is enabled to access data and applications from each of a laptop computer 2702, a smartphone 2704, an music player 2706, computer glasses 2708, a smart TV 2710, a tablet 2712, a heart-rate monitor 2714, a smartwatch 2716, and a desktop computer 2718. As described above, selected data and computations may be made private, effecting a data "sandbox" around such data.

Figure 28A:
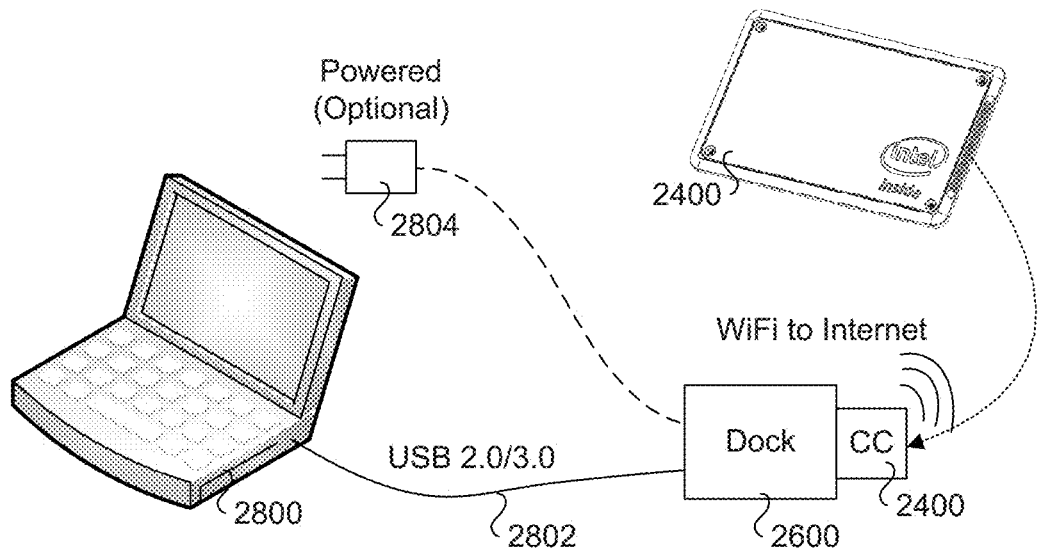
FIGS. 28a and 28b show two examples of a computing card being connected to a display device via a wired connection.
Figure 28B:
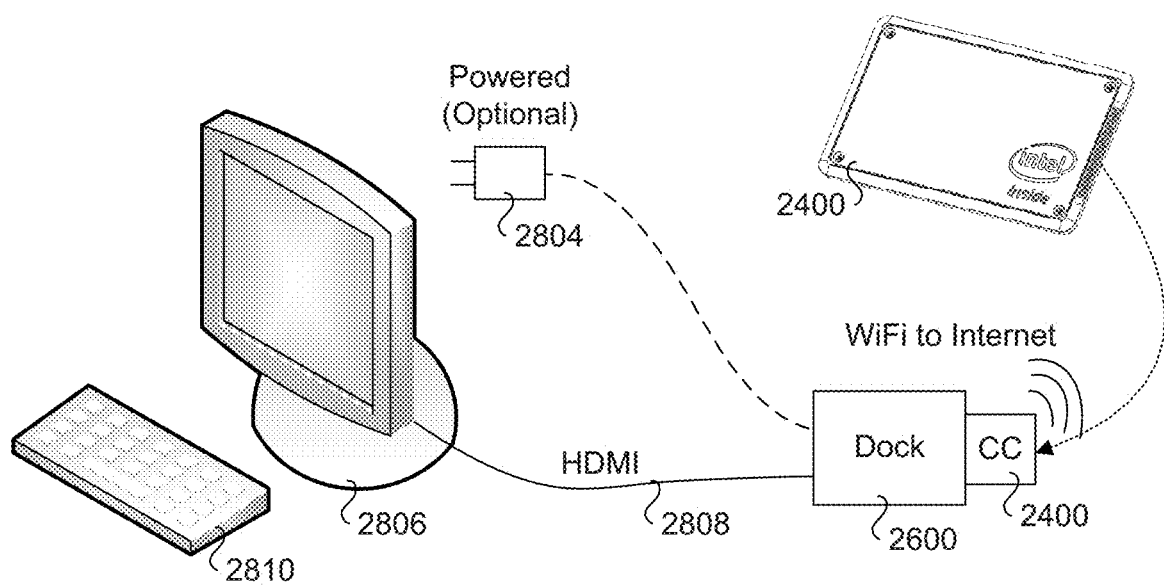

Generally, a computing card may be configured to communicate with any of the foregoing devices via a wired link or a wireless link. By way of example, two types of wired connections are illustrated in FIGS. 28a and 28b. In FIG. 28a, a computing card 2400 is installed in a dock 2600 that is connected to a laptop computer 2800 via a USB 2.0 or 3.0 cable 2802. Dock 2600 may be powered by laptop computer 2800 via USB power, or an optional power adaptor 2804 may be provided. In FIG. 28b, a computing card 2400 is installed in a dock 2600 that is connected to a monitor or TV 2806 via an HDMI cable 2808. The monitor or TV 2806 may receive user input via various types of devices, such as a wireless keyboard 2810. Generally, dock 2600 may be powered by a built-in battery or an optional power adaptor 2804 may be provided.

Figure 29A:
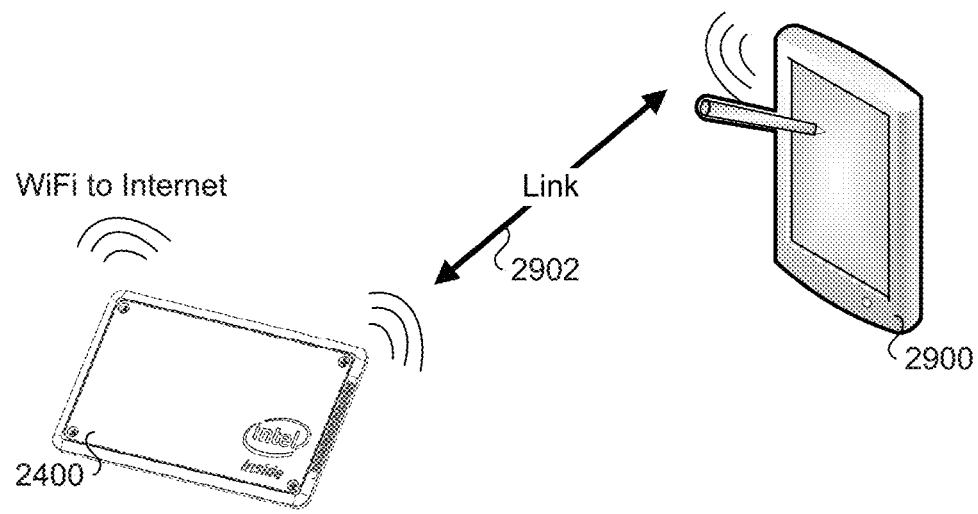
FIGS. 29a and 29b show two examples of a computing card being connected to a display device via a wireless connection.
Figure 29B:
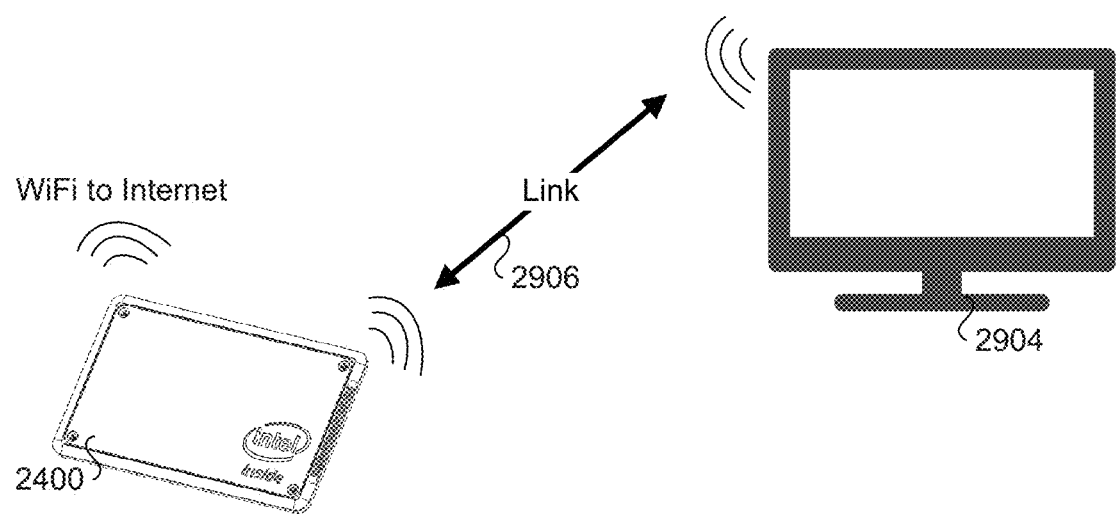

FIGS. 29a and 29b depict two examples of wireless connections between a computing card and a display device. In FIG. 29a, a computing card 2400 is linked with a tablet 2900 via a wireless link 2902. In FIG. 29b, a computing card 2400 is linked with a smart TV 2904 via a wireless link 2906. Generally, wireless links may be implemented using existing or future protocols, including but not limited to Wi-Fi (any version of IEEE 802.11) and BLUETOOTH (any version). In some embodiments, a Wi-Fi Direct (WFD) link may be used, such as a peer-to-peer WFD link. In other embodiments, an INTEL® WiDi or WiGig connection may be used.

Figure 30:
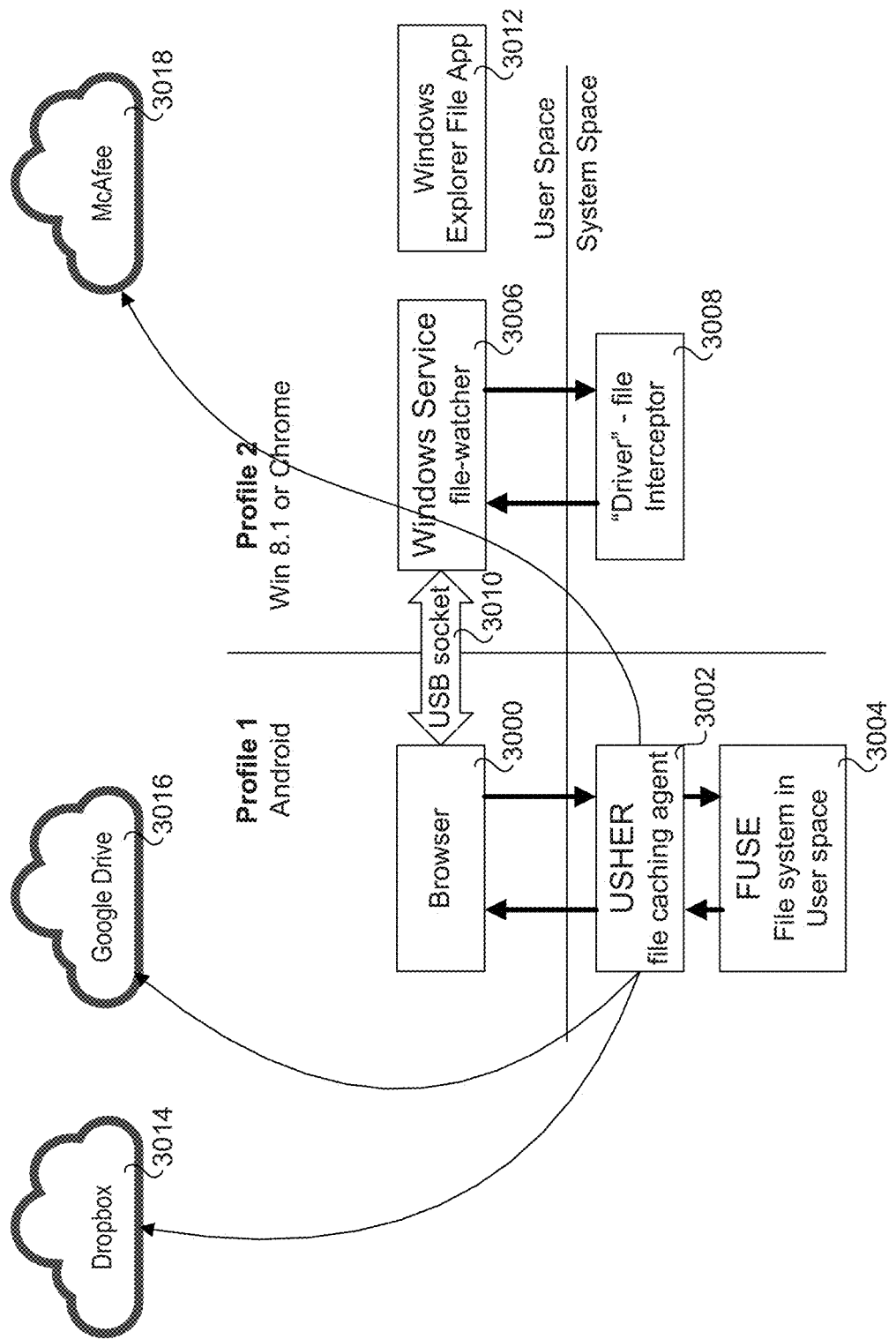
FIG. 30 is a schematic diagram illustrating a data access architecture that supports data access for multiple profiles, according to one embodiment.

In accordance with further aspects of some embodiment, a unified data storage and access scheme is provided that enables a user of a computing card to access data from a variety of sources and then present that data in unified folders or containers. FIG. 30 shows one implementation scheme to facilitate this objective. As illustrated, FIG. 30 shows a first profile comprising an Android profile and a second profile comprising a Windows 8.1 or Chrome profile. The Android profile components include a file browser 3000 in user space that communicates with a file caching agent 3002, which interfaces with a file system in user space (FUSE) 3004. The Windows 8.1 or Chrome profile includes a file-watcher Windows service 3006 in user space that interacts with a file interceptor driver 3008 in system space and communicates with file browser 300 via USB socket 3010. A Windows explorer file application 3012 is also depicted in user space.

The file caching agent 3002 is configured to cache files that are stored in cloud-based storage, such as depicted by a Dropbox cloud 3014 and a Google Drive cloud 3016. In one embodiment, encryption services are provided by McAfee, as depicted by a McAfee cloud 3018. Under this scheme, cloud-hosted data is encrypted using encryption keys obtained from McAfee cloud 3018 using a secure authentication scheme under which only someone with proper credentials may access this data. At the same time, file caching agent 3002 may back-up the computing card data (including data retrieved from other devices), enabling the user to restore the data for a computing card should the computing card be lost or broken.

Figure 31:
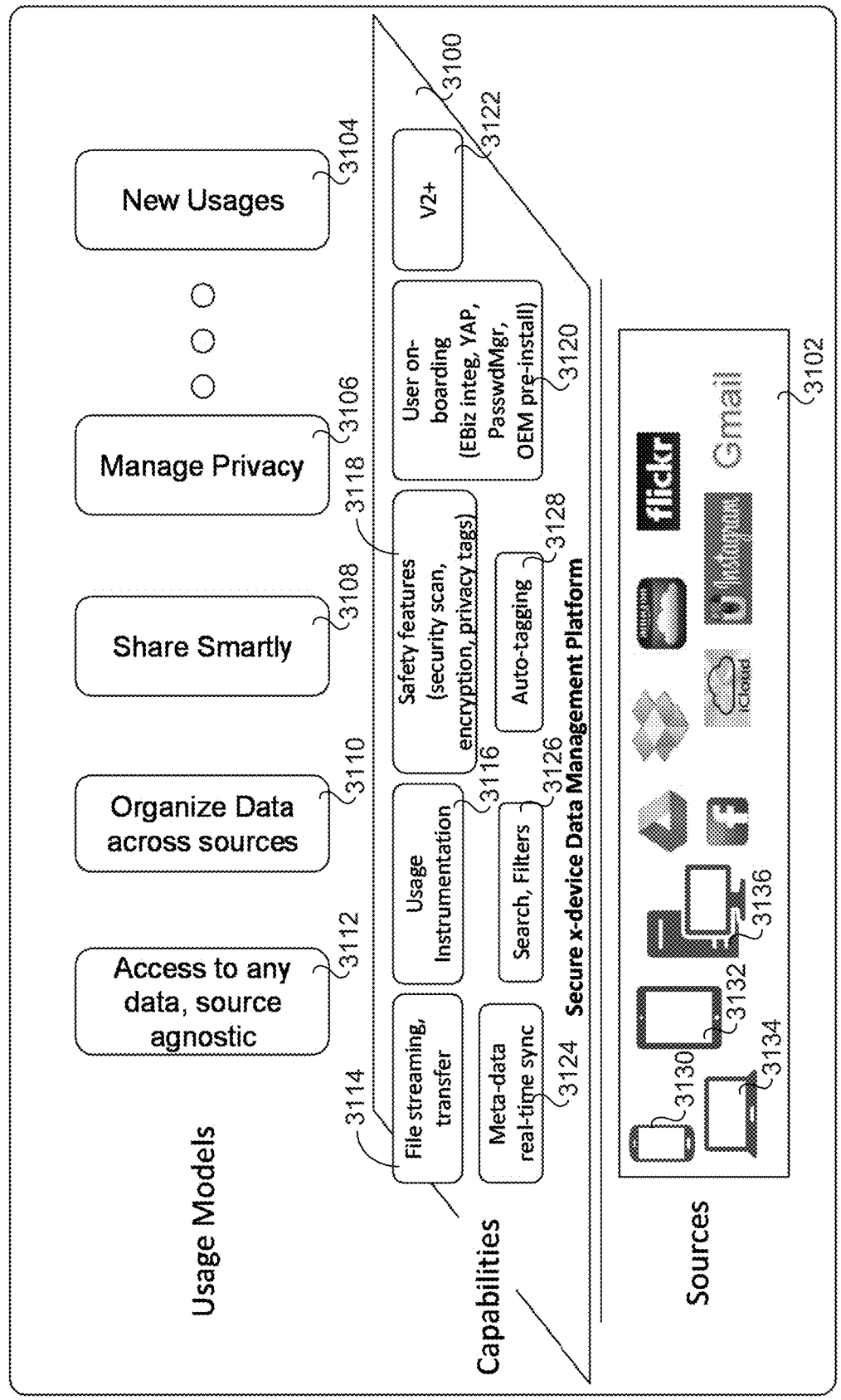
FIG. 31 is a schematic diagram illustrating a data management architecture including a secure device-independent data management platform that facilitates access to a multitude of data sources and supports multiple usage models.

FIG. 31 shows a data management architecture including a secure device-independent data management platform 3100 that facilitates access to a multitude of data sources 3102 and supports multiple usage models including new usages 3104, privacy management 3106, smart sharing 3108, data organization across sources 3110 and source-agnostic data access 3112. Secure device-independent data management platform 3100 supports various functions including file streaming 3114, usage instrumentation 3116, safety features 3118, user on-boarding 3120, V2+ meta-data real-time search 3124, searches and filters 3126 and auto-tagging 3128.

Secure device-independent data management platform 3100 is configured to enable users to quickly find their data regardless of location and securely access, manage, and share on any device, such as but not limited to smartphones 3130, tablets 3132, laptops 3134, desktop computers 3136, cloud services, and other smart devices. For example, a user's data on cloud services such as Facebook, Dropbox, Amazon, flickr, iCloud, Instagram, and Gmail may be securely accessed and presented in a unified manner (such as integrating e-mail from multiple accounts into a single view).

Figure 32:
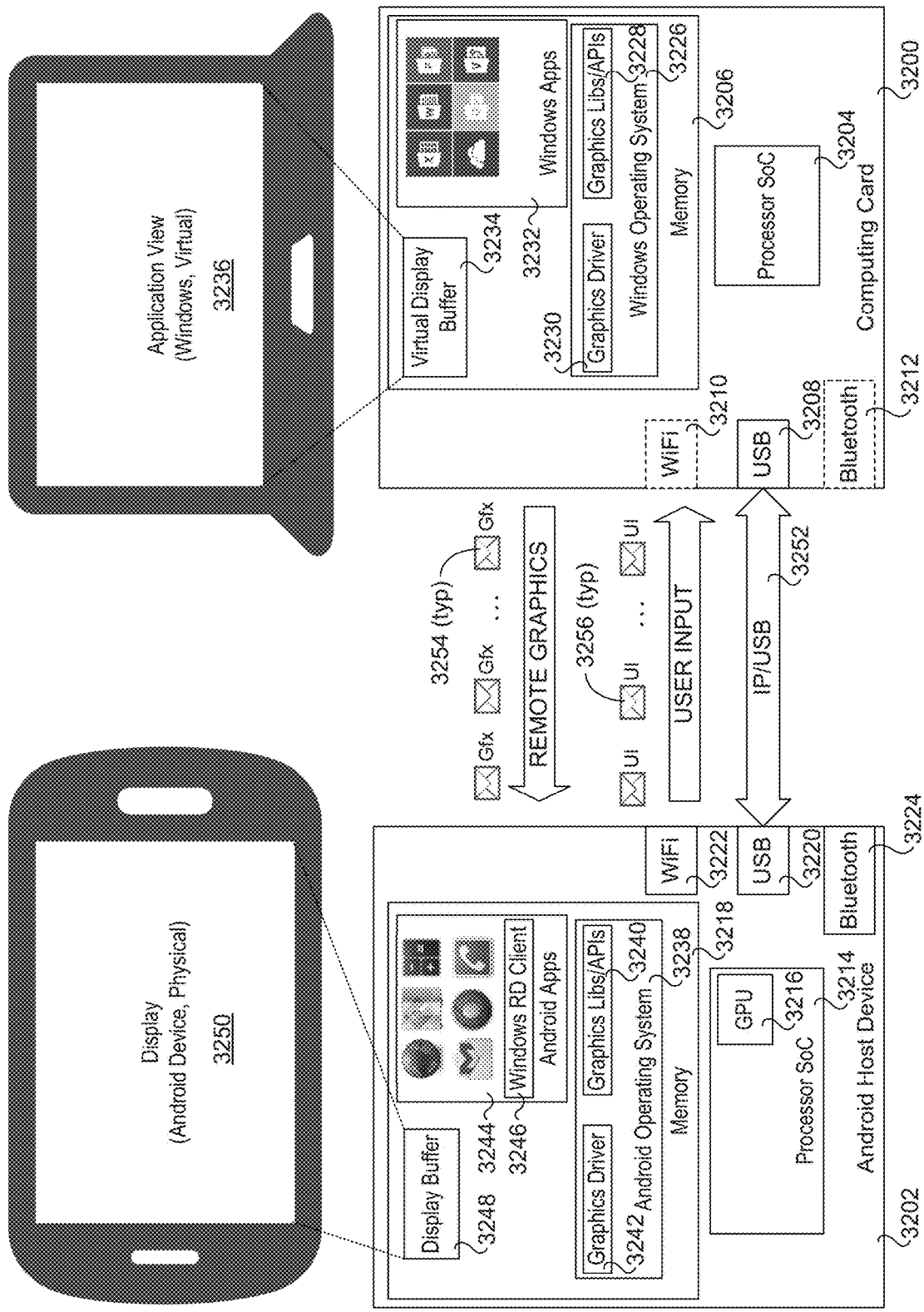
FIG. 32 is a schematic diagram illustrating an embodiment of an architecture for an integrated Android and Windows device that is capable of running both Android and Windows applications.
Figure 33:
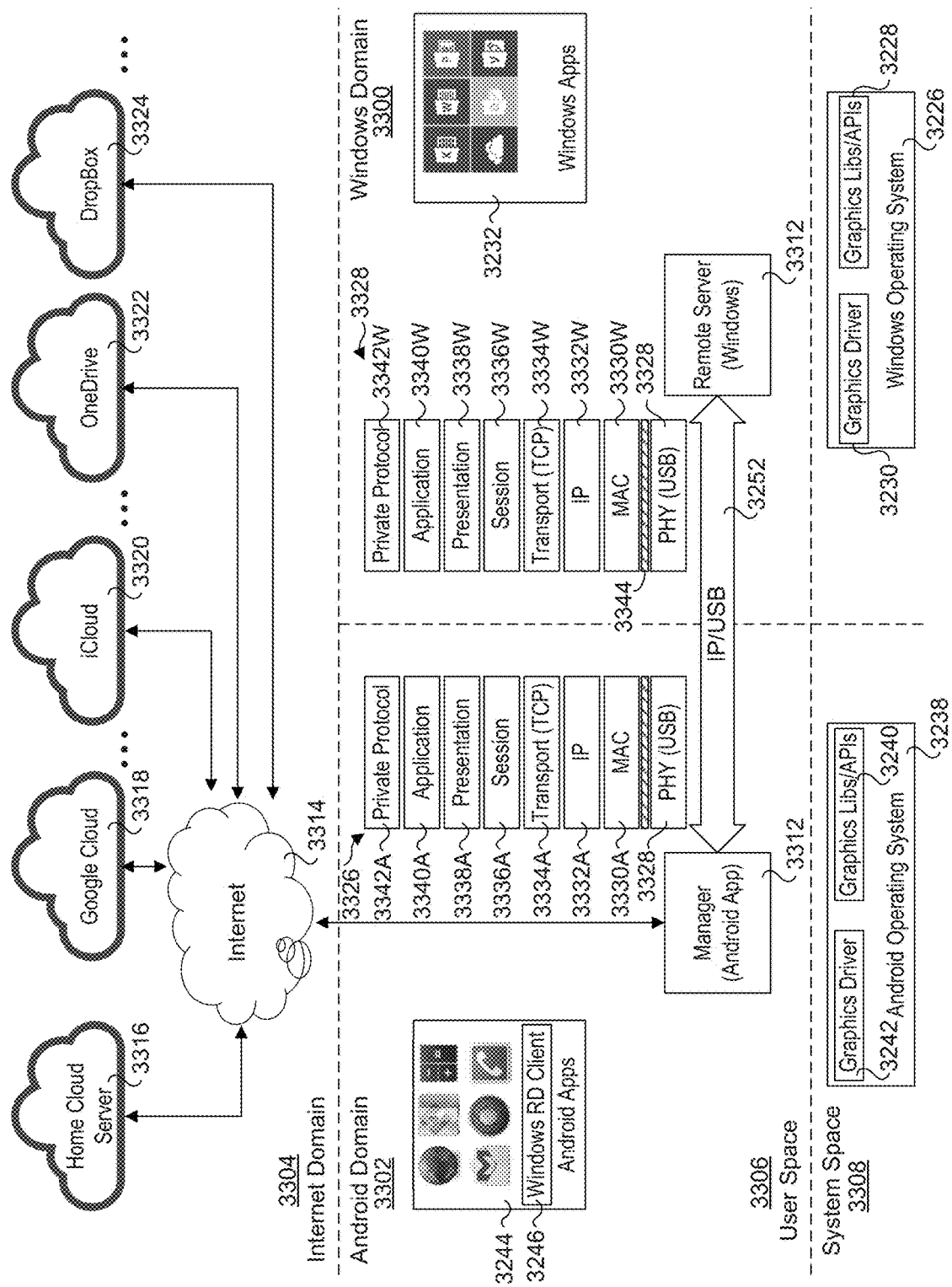
FIG. 33 is a schematic diagram of a software architecture that is implemented to facilitate use scenarios employing a computing card running a Windows OS and an Android host device.

FIGS. 32 and 33 shows an exemplary implementation of a computing card 100 and an Android host device 3202. Computing card 3200 includes a processor SoC 3204 to which memory 3206 and a USB interface 3208 are operatively coupled. Depending on it intended implementation(s), computing card 3200 may include zero or more wireless communication (WCOMM) interfaces, such as depicted by a Wi-Fi (IEEE 802.11) interface 3210 and a BLUETOOTH® interface 3212.

Android host device 3202 is generally representative of various types of devices that use an Android operating system. Such devices include, but are not limited to, mobile phones, tablets, netbooks (e.g., Chromebooks), and wearable devices such as Google Glass and Android watches. For illustrative purposes Android host device is depicted as including a processor SoC 3214 including a GPU 3216 that is operatively coupled to memory 3218, a USB interface 3220, a Wi-Fi interface 3222, and a BLUETOOTH® interface 3224. An Android host device may further include other wireless communication interfaces, such as a mobile radio communication system (e.g., an LTE mobile radio communication system). Although GPU 3216 is depicted as part of processor SoC 3214, in some implementations the GPU and processor SoC may comprise separate components.

Generally, the various I/O interfaces, such a wireless communication interfaces, shown in some of the Figures herein may be depicted as being separate components. As will be discussed in further detail below, these I/O interfaces may be implemented in a processor SoC, in which case the separately-shown I/O interfaces represent a port, a connector, or antenna.

In the embodiment illustrated of FIG. 32, computing card is configured to implement a Microsoft Windows operating system. The Windows operating system may generally include any current or future Windows operating systems, such as Windows 8.1 or (to be released in 2015) Windows 10. Moreover, the Microsoft Windows operating systems are full operating system originally designed for use on desktop computers, laptop computers, selected tables, and the like.

In further detail, selected components of a Windows operating system 3226 are depicted as being loaded into memory 3206, including graphics libraries and APIs (Application Program Interfaces) 3228 and a graphics driver 3230. Also depicted in memory 3206 are icons for multiple Windows applications 3232 and a virtual display buffer 3234 that is used to layout and render a virtual Windows GUI (graphical user interface) 3236. Windows applications 3232 run in "user" space, while the term "kernel" may be used herein in the context of operating system components that are conventionally considered to be implemented in an operating system kernel, noting that under some architecture views, drivers and libraries may be considered to be in separate operating system layers that are outside of the OS kernel, or may be implemented in user space.

Android host device 3202 runs an Android operating system 3238 that is depicted as being loaded into memory 3218 and including graphics libraries and APIs 3240 and a graphics driver 3242. Multiple Android applications 3244 including a Windows Remote Desktop (RD) client 3246 are also depicted as loaded in memory 3218, as well as a display buffer 3248 which is used to store pixel bitmap content that is displayed on a physical display 3250 of Android host device 3202.

Under one use scenario, computing card 3200 is coupled in communication with Android host device 3202 via one of a USB cable, a USB dock, or a USB plug-in (e.g., computing card 3200 has a male USB interface connector similar to a USB flash drive), thereby forming a physical USB link. In one embodiment, the USB link is implemented as an IP over USB (IP/USB) link 3252.

In one embodiment, a user is enabled to view and interact with Windows applications 3232 that are running on computing card 3200, while being displayed on Android host device 3202's display 3250. This is facilitated by "throwing" graphics content remotely from computing card 3200 to Android host device 3202 via IP/USB link 3252, as depicted by a stream of graphics (Gfx) packets 3254. User inputs provided to Android host device 3202 (e.g., via touchscreen inputs) are converted to Windows inputs and provide to Windows operating system 3226, as depicted by a stream of user input (UI) packets 3256.

FIG. 33 depicts selected aspects of a software architecture that is implemented to facilitate use scenarios employing a computing card running a Windows OS and an Android host device. The software architecture includes a Windows domain 3300, an Android domain 3302, and an Internet domain 3304. Each of the Windows domain 3300 and Android domain 3302 are further divided into a user space 3306 and a system space 3308.

Windows domain 3300 includes a remote server 3310 that communicates with a manager 3312 in Android domain 3302. In the embodiment illustrated in FIG. 33, communication between remote server 3310 and manager 3312 is facilitated via IP/USB link 3252. Alternatively, remote server 3310 and manager 3312 may communicate using one of the various wireless communication links described and illustrated herein.

In addition to communicating with remote server 3310, manager 3312 is also depicted as being able to access various Internet resources via connections facilitated by Internet 3314. The exemplary Internet resources are depicted in FIG. 33 as clouds and include a home cloud server 3316, Google Cloud Service 3318, Apple iCloud services 3320, Microsoft OneDrive services, and DropBox services 3324. Under various usages, manager 3312 may be used to access Internet resources for applications and services running in Android domain 3302, or may operate as a gateway for enabling applications and services running in Windows domain 3300 to access Internet domain 3304.

For simplicity and convenience, IP/USB link 3252 is shown as a direct link between remote server 3310 and manager 3312. However, as described and illustrated herein, an IP/USB communications link may be a logical link comprising one or more physical USB links.

In one embodiment, implementation of an IP communication link over one or more physical USB links is facilitated through existing networking software stacks in combination with built-in USB hardware interfaces. This is depicted in FIG. 33 as network stacks 3326 and 3328. Layer 1 comprises a USB Physical layer (PHY) 3328, which is configured as a conventional USB connection using well-known standardized techniques. Generally, USB PHY 3328 may corresponding to any existing and future USB link, such as a USB2.0 or USB3.0 link. The software-based networking layers in Android domain 3302 include a Media Access Channel (MAC) layer 3330A, an IP layer 3332A, a transport layer 3334A, a session layer 3336A, a presentation layer 3338A, and application layer 3340A and a private protocol layer 3342A. The software-based networking layers in Windows domain 3300 include a MAC layer 3330W, an IP layer 3332W, a transport layer 3334W, a session layer 3336W, a presentation layer 3338W, and application layer 3340W and a private protocol layer 3342W.

In one embodiment, the MAC, IP, transport, session, presentation, and application layers employ existing networking software components provided by an Android and Windows operating systems, and are implemented using well-known techniques. For example, in the context of Internet access, the IP layer employs IPv4 or IPv6 addresses, the transport layer implements one or more of the TCP and UDP protocols, the session layer is used for IP sockets, the presentation layer is used for encryption, and the application layer is used for HTTP (the Hypertext Transport Protocol). In one embodiment, the MAC layer is implemented as an Ethernet MAC layer, and from the layers above the MAC layer, the PHY layer appears to be an Ethernet link. In one embodiment, this is facilitated via USB PHY 3328. Under an optional configuration, a "shim" 3344 is implemented between USB PHY 3328 and the MAC layer software components, wherein the shim exposes an Ethernet PHY interface to the MAC layer. As a result, the existing Android and Windows networking software components may be implemented with either no modification or with minimal changes.

Private protocol layers 3342A and 3342W are used to provide additional functionality, such as security measures and application functionality. Aspects of the private protocol may be considered as being implemented at one or more of the session, presentation, application layer or user/application layer.

Figure 35:
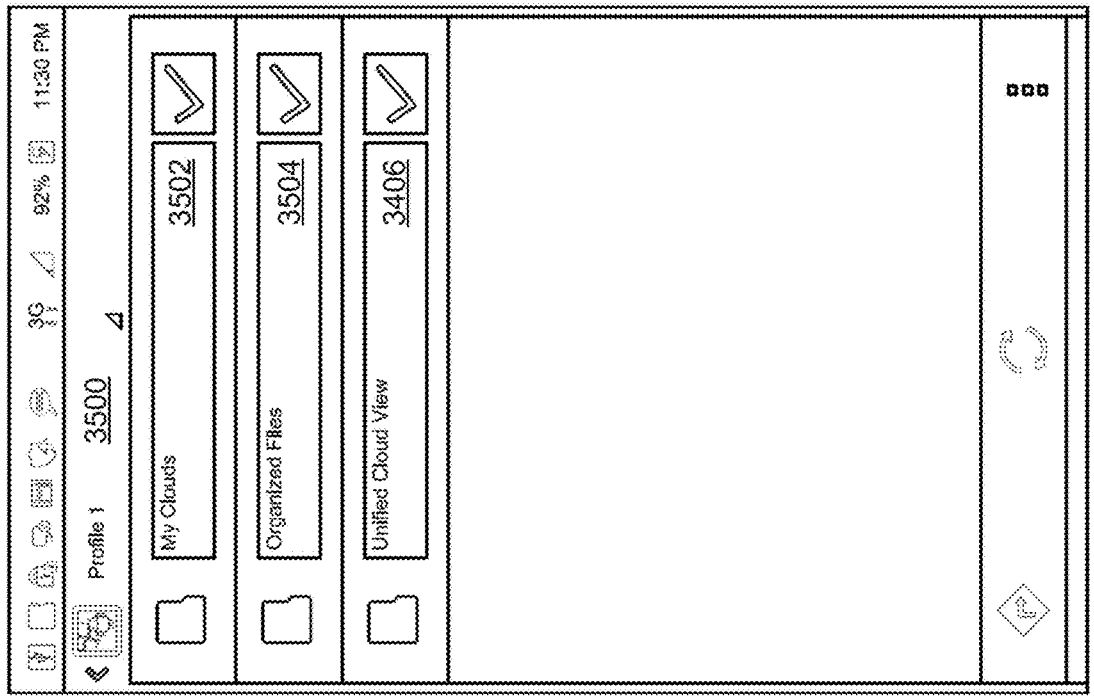
FIG. 35 depicts an exemplary unified interface depicting unified folders that are displayed in accordance with a selected user profile.
Figure 34:
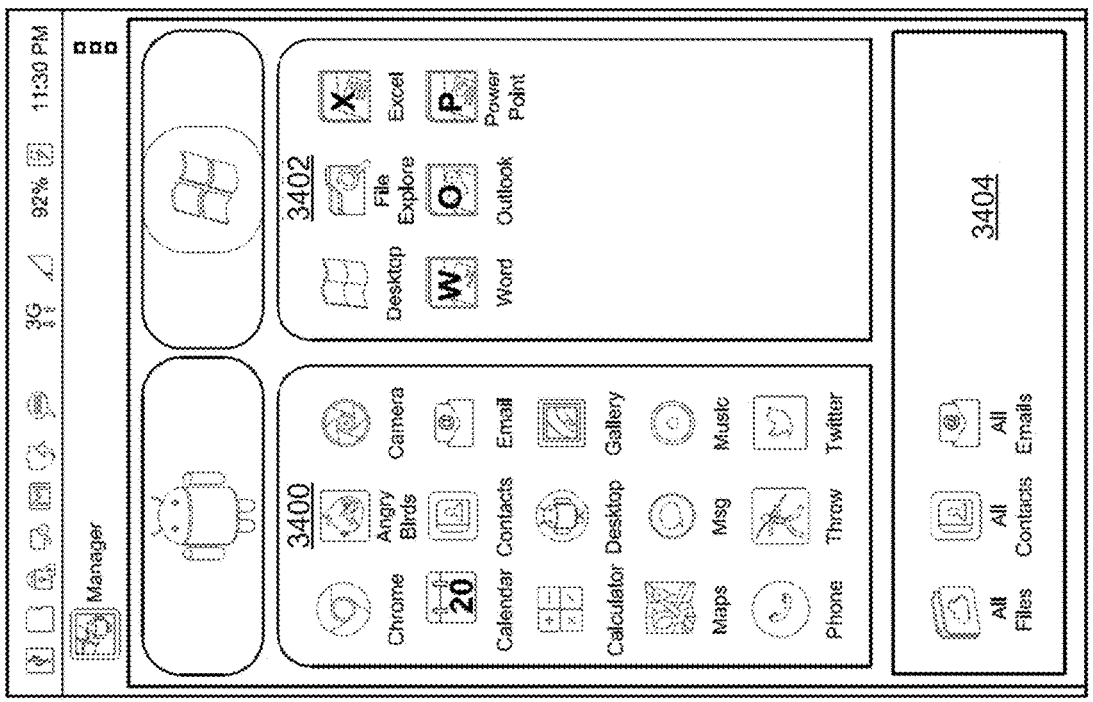
FIG. 34 depict a portrait display of a unified interface with multiple panels including a first panel having Android applications, a second panel having Windows application, and a third panel showing combined file, contact, and email folders.

In accordance with further aspects of some embodiments, a unified interface is provided that simultaneously enables access to both Android and Windows applications. Examples of the unified interface are shown in FIGS. 34 and 35. As illustrated, the unified interface in FIG. 34 includes a panel 3400 of Android applications, and a panel 3402 of Windows applications. In addition, a third panel 3404 contains icons for accessing aggregations of files across both operating systems, including all files, all contacts, and all e-mail.

As shown in FIG. 35, a user may choose to access data corresponding to a profile 3500 and be presented with folders that are organized in accordance with the selected profile. In this example, for Profile 1 the folders include the user's clouds 3502, organized files 3504, and a unified cloud view 3505 under which files and/or content of a particular type (e.g., email, contact, calendars, etc.) are aggregated in unified folders.

Dual Computing Card Apparatus

Figure 36A:
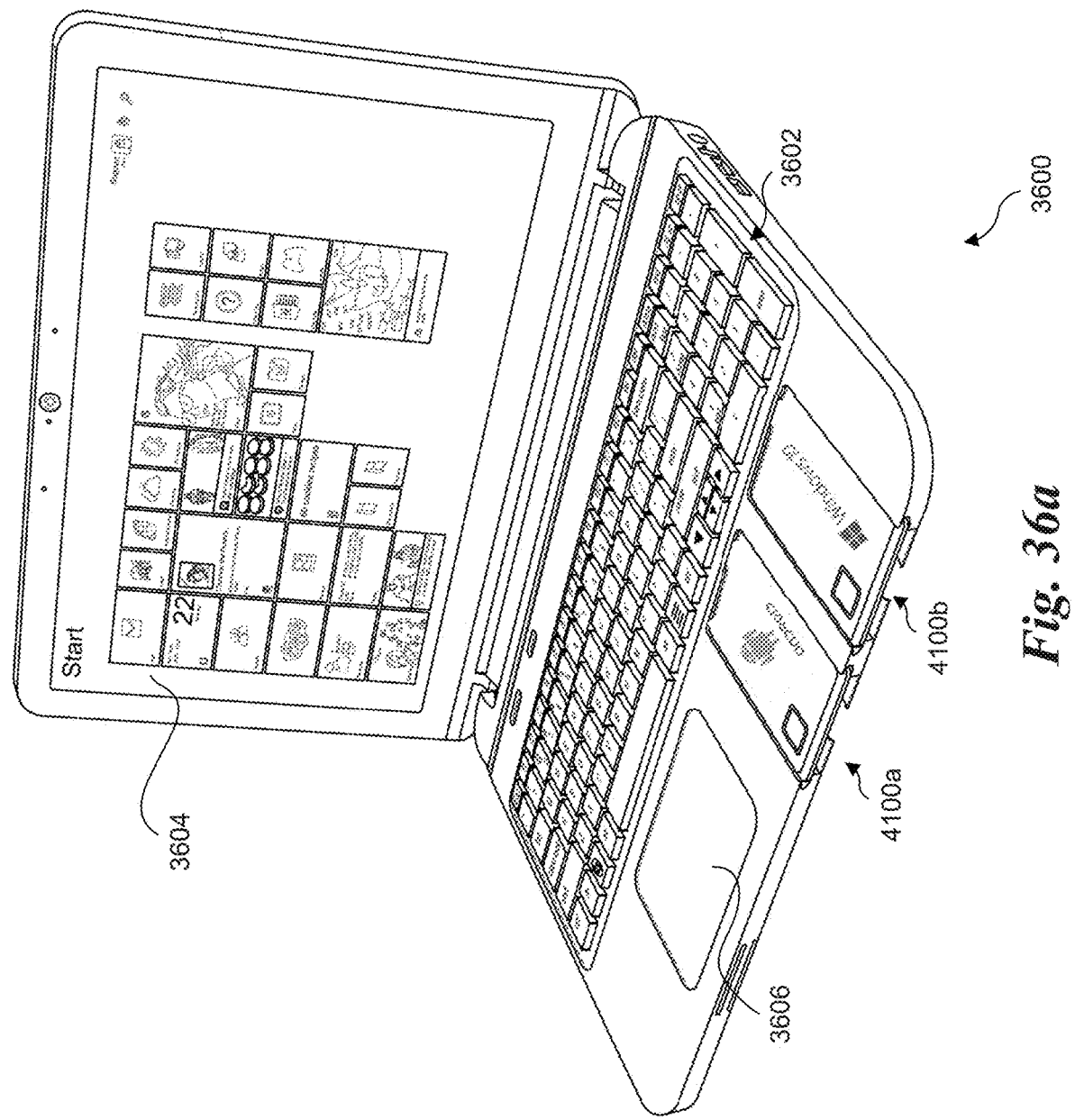
FIGS. 36a and 36b are isometric perspective drawings of a dual-slot clamshell host apparatus, according to one embodiment.
Figure 36B:
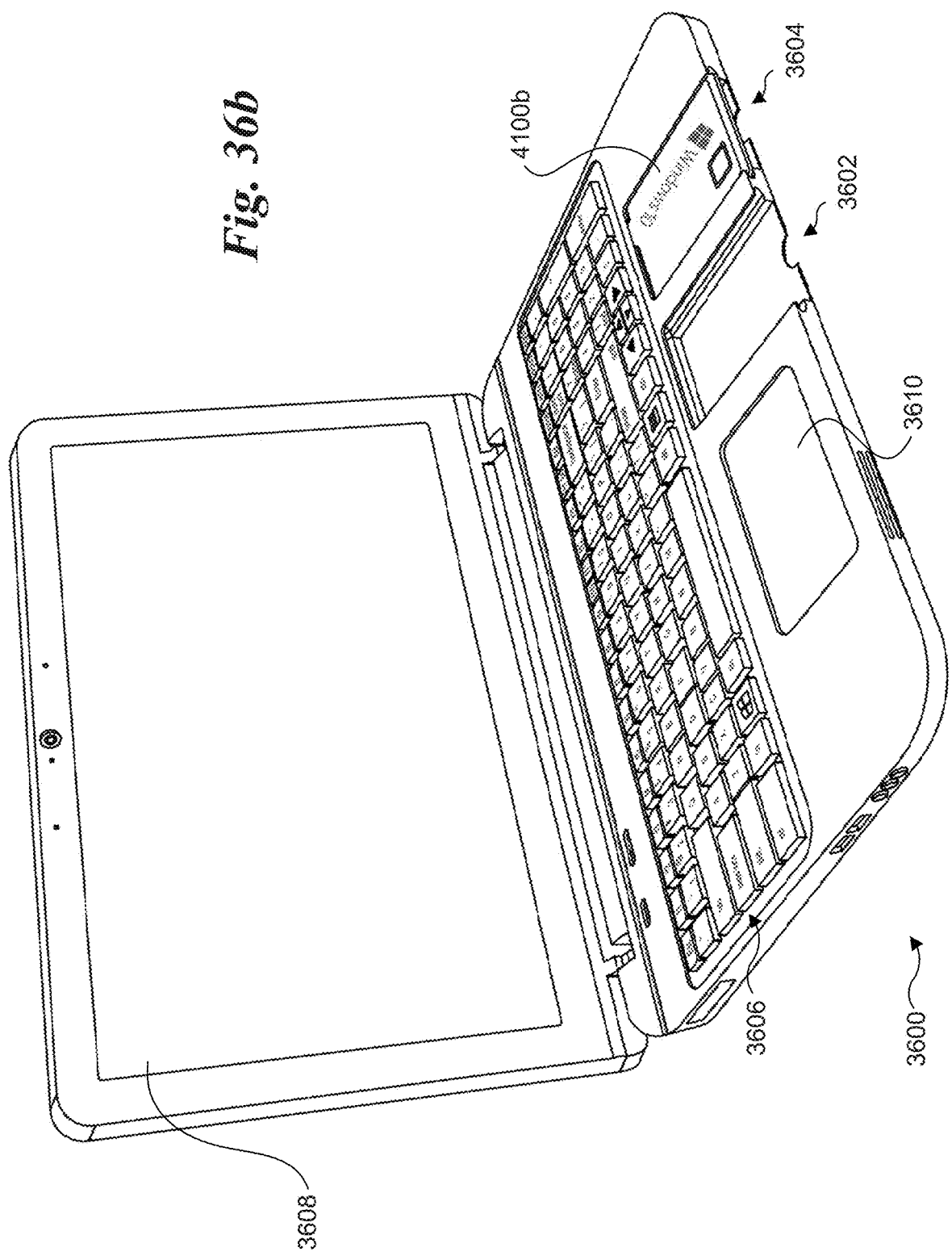

In addition to employing a single computing card, apparatus may be implemented using multiple computing cards. An example of a dual computing card "clamshell" apparatus 3600, such as a laptop, notebook, or Chromebook computer is shown in FIGS. 36a and 36b. Dual card apparatus 3600 includes a pair of slots in which respective computing cards 4100a and 4100b are installed is slots 3602 and 3604. Dual card apparatus 3600 further includes conventional components found in typical laptops, notebooks, and Chromebook, such as a keyboard 36062, a display screen 3808 and a touchpad 3610, as well as various types of ports.

Generally, a dual computing card apparatus may be a "dumb" host device that includes reduced circuitry (when compared to a conventional apparatus of similar type) to support various communication interfaces with the computing cards and to support I/O communication with the keyboard, display, touchpad, and applicable ports, including both communication ports (e.g., USB, Thunderbolt) and external display ports (such as DisplayPort and HDMI ports).

In addition to dual-slot host apparatus and devices, a computing card host apparatus may be configured to use a single computing card. For example, FIG. 36c shows a single computing card host apparatus 3600a having a similar configuration to dual card apparatus 3600. Single computing card host apparatus 3600a operates in a similar manner to dual computing card apparatus 3600 when a single card is installed in one of the apparatus' two slots.

Figure 37:
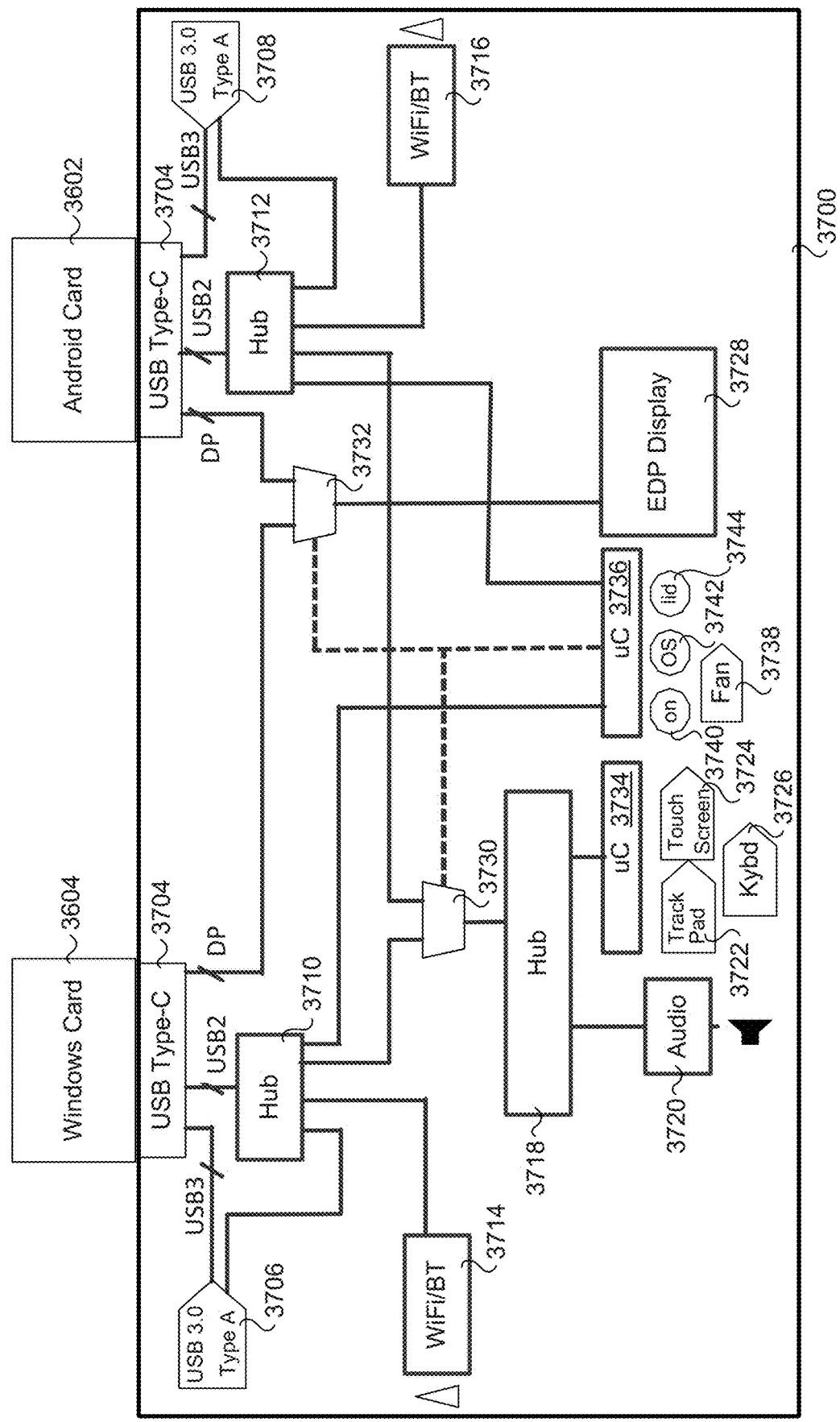
FIG. 37 is a schematic block diagram of a first embodiment of a processor board that may be implemented in a dual-slot host apparatus.
Figure 38:
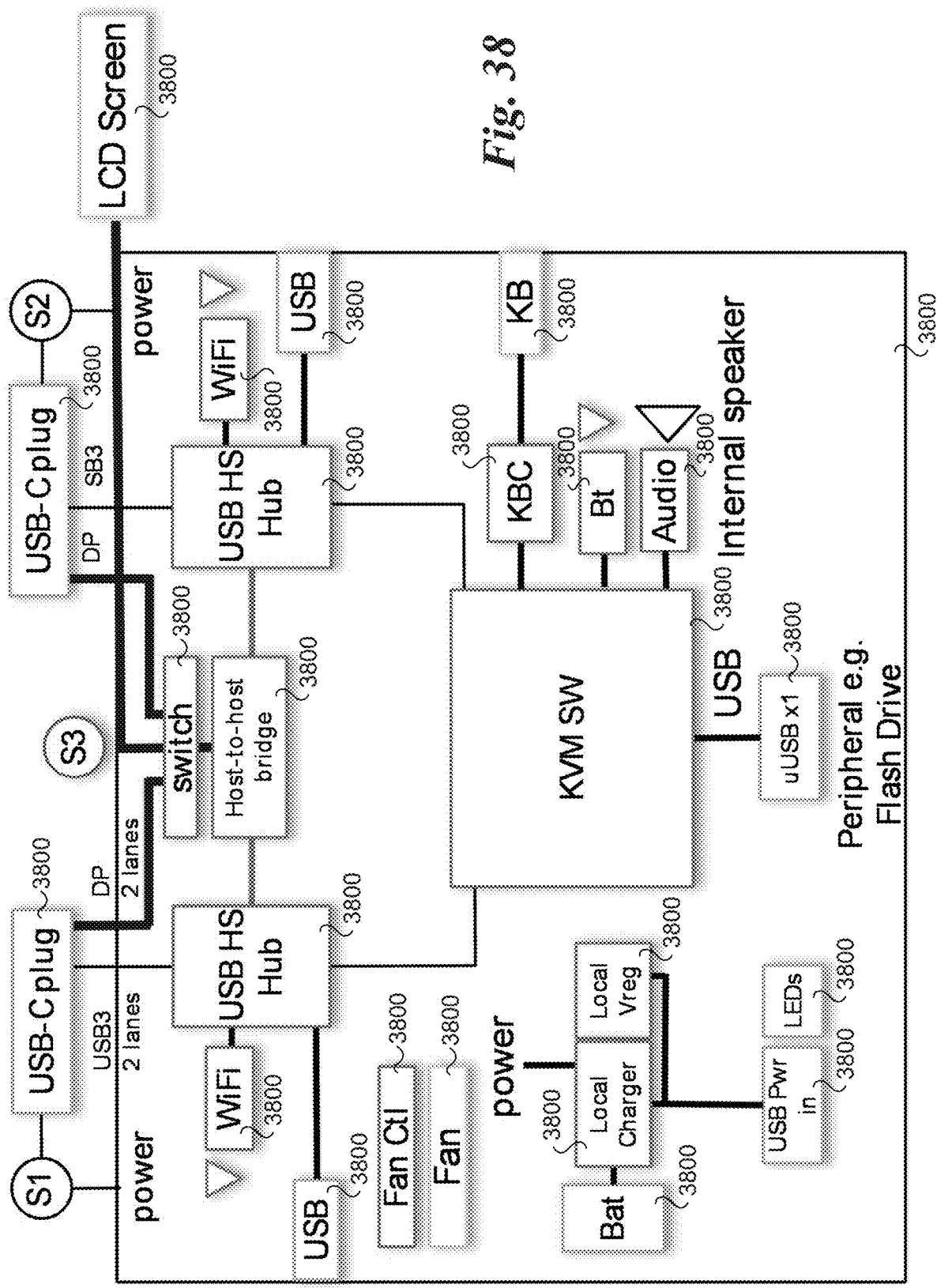
FIG. 38 is a schematic block diagram of a second embodiment of a processor board that may be implemented in a dual-slot host apparatus.

Block diagrams of respective embodiments of processor boards 3700 and 3800 that may be installed in a dual computing card apparatus are shown in FIGS. 37 and 38. Processor board 3700 includes a pair of USB Type-C ports 3702 and 3704 that are configured to couple to mating USB Type-C connectors on a computing card, such as depicted by a Windows computing card 3604 and an Android computing card 3602. However, it is noted that the same type of computing card can be installed in the computing card slots. Each of USB Type-C ports 3702 and 3704 is coupled to a similar set of components, as depicted by USB 3.0 Type A interfaces 3706 and 3708, hubs 3710 and 3712, and WiFi/Bluetooth chips 3714 and 3716.

Processor board 3700 also includes components that may be switchable connected to a USB Type-C ports 3702 and 3704, including a hub 3718, audio 3730, a track pad interface 3722, a touch screen interface 3724, and a keyboard interface 3726, and EDP Display 3728. Processor board 3700 further includes multiplexers 3730 and 3732, micro controllers (uCs) 3734 and 3736, a fan 3738, an on-off switch 3740, and operating system (OS) switch 3742, and a lid switch 3744.

During operation, if a single computing card is inserted into one of the dual slots, processor board's logic will detect that it is inserted and the computing card will be communicatively coupled to audio 3720, track pad interface 3722, touch screen interface 3724, keyboard interface 3726, and EDP Display 3728, as well as the WiFi/Bluetooth chip 3714 or 3716 corresponding to the slot the computing card is installed in.

If the computing card is installed in a slot of a host device for the first time, the computing card will communicate with the microcontroller 3734 or 3736 to obtain configuration identifiers and parameters, such as a trackpad interface identifier, a touchscreen identifier, a keyboard identified, and a display identifier. Under a Windows operating system, the configuration identifiers are used to determine what drivers to user for the various peripheral devices and components on the apparatus into which the computing card is installed. This works in a similar manner to how Windows operates when installed and booted for a conventional computer system, such as a laptop, notebook, or desktop computer.

In one embodiment the computing card stores host device configuration information for one or more device and apparatus it has been installed in using data structures such as an array or table. A host device identifier is used to identify where in the array or table the configuration information is stored, and enables a computing card that has been previously installed in a host device and is in a sleep state to wake from the sleep state and configure its drivers in a manner that enables the computing card to continue operating without having to be rebooted. Upon completing use of a computing card with a first host device, the computing card can be put into a sleep (or hibernate) state, be removed from the first host device, be installed in a second host device having a different configuration, and resume operating where it was left off when put into the sleep or hibernate state on the first host device. This experience provides flexibility that isn't available with conventional computing devices, since transferring OS operating states between computing devices is either impossible or would take a significant amount of time and would requiring linking the devices in communication.

If two computing cards are installed in a dual-slot host device, the device is configured to recognize each computing card, including its operating system type, and enable each computing card to be selected as the "active" computing card. For example, suppose you have a first computing card running Windows 10 and a second computing card running a version of Android. By using OS switch 3742, the user of the device can switch between the two computing cards to make the computing card running the operating system the user desires to currently use as the active card. The logic and switching circuitry on processor board 3700, including the multiplexers 3730 and 3732, hubs 3710, 3712, and 3718, and additional circuitry and logic (not shown) is used to configure the host device to use the computing card that is selected to be the active card.

Users may also switch between the two computing cards in a dual-slot host device without shutting down the host device. The user first will put the currently active computing card into a sleep state, and then select the other computing card to become the active computing card, waking that computing card from its sleep state and continuing its operation.

Processor board 3800 includes a pair of USB Type-C plugs (i.e., plug-in ports or connectors) 3802 and 3804, switches S1, S2, and S3, a switch 3806, USB high-speed hubs 3808 and 3810, WiFi chips 3812 and 3814, a host-to-host bridge 3816, USB ports 3818 and 3820, a fan controller 3822 and fan 3824, a battery 3826 coupled to a local charger 3828 and local voltage regulator 3830, a USB power input 3832 and LEDs 3834. Processor board 3800 further includes a USB keyboard, video, and mouse (KVM) switch 3836, a keyboard controller (KBC) 3838 coupled to a keyboard (KB) 3840, a Bluetooth chip 3842 an audio chip 3844, and micro USB port 3846. Processor board 3800 is also connected to an LCD screen 3848.

When a single computing card is installed in one of the dual slots and coupled to one of USB plug 3802 or 3804 and the user activates the S1 or S2 power switch (as applicable), the system detects the presence of the computing card and there is an interchange of configuration information that is used to both configured the host device and configure the appropriate drivers for the OS running on the computing card. Configuration of the host device includes configuring KVM switch 3836 to communicate with the appropriate USB plug that computing card is coupled to. Switching logic in additional components on processor board 3800 is also used to configure the host device to interact with the computing card over its USB-C interface.

Processor board 3800 is also configured to provide power to both computing card slots to recharge the battery in the computing card when it is installed in one of the host device's slots. (For simplicity, the circuitry coupling the power sub-section of processor board 3800 to USB-C plugs 3802 and 3804 is not shown.)

When two computing cards are installed in respective slots in a dual-slot host device, the user is enabled to switch between which computing card is the active card through use of the S3 switch. For example, activation of the S3 switch will toggle the active computing card between from one card to the other. In one embodiment, a similar switch may occur be either removing an active computing card or activating the power switch for the computing card slot. For instance, suppose a first computing card 1 is in slot '1' and coupled to USB-C plug 3802, while a second non-active computing card 2 is in slot '2' and coupled to USB-C plug 3804. Upon either removal of computing card 1 from slot '1' or turning power switch S1 off, the active computing card will switch to computing card 2. In conjunction with switching to a new active computing card, the switching circuitry in processor board 3800 will reconfigure the connection paths between the various peripheral and I/O devices, such as the keyboard, touchpad, touchscreen, video screen or display, USB ports, etc. and the signal lines coupled to the USB-C plug for the new active slot.

Figure 39:
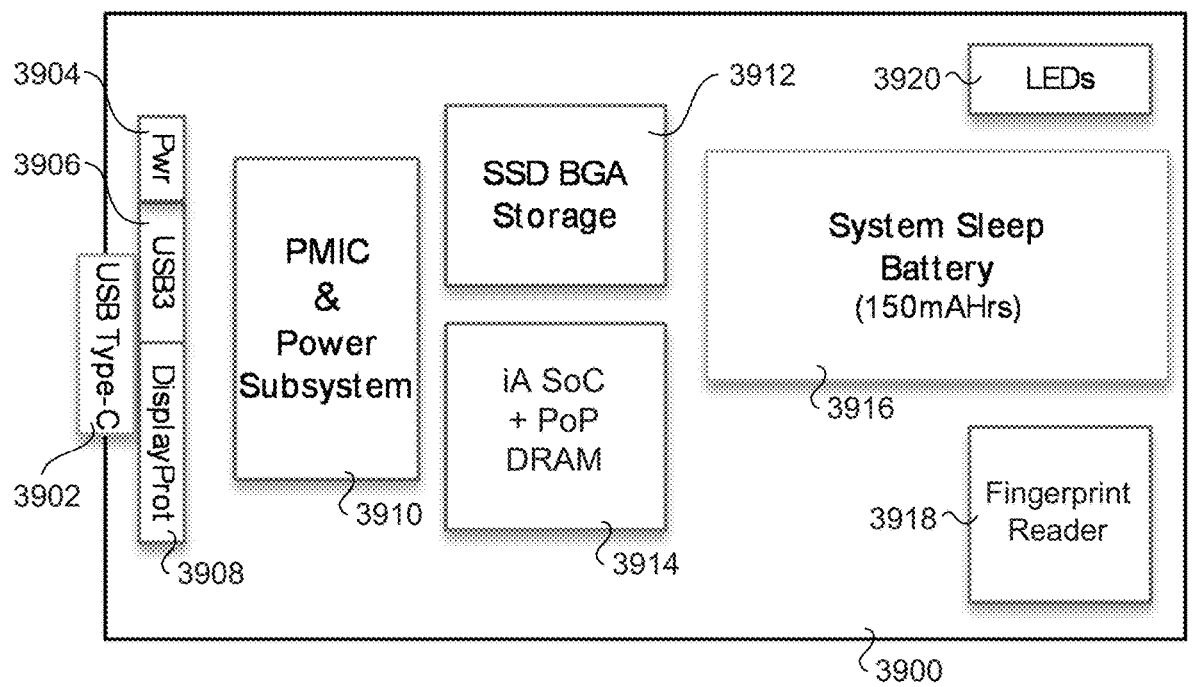
FIG. 39 is a schematic block diagram of one embodiment of a computing card employing a USB Type-C connector.

FIG. 39 shows one embodiment of a computing card 3900 that employs a USB Type-C connector 3902 as a single unified interface. Computing card 3900 further includes an internal power interface 3904, a USB 3 interface 3906, and a DisplayPort interface 3908, a power management integrated circuit (PMIC) and power subsystem 3910, a solid-state drive ball grid array (SSD BGA) storage device 3912, an Intel® architecture (IA) SoC 3914 with dynamic random access memory (DRAM) coupled to the SoC using packet-on-package (PoP) packaging, a system sleep battery 3916, a fingerprint reader 3918, and LEDs 3920.

In addition to the components shown in FIG. 39, a computing card employing a USB Type-C connector may include other circuitry, such as illustrated in other computing card embodiments herein including computing card 100 of FIG. 1. However, rather than employing a dock connector with multiple connectors, a single USB Type-C connector is used.

Figure 40:
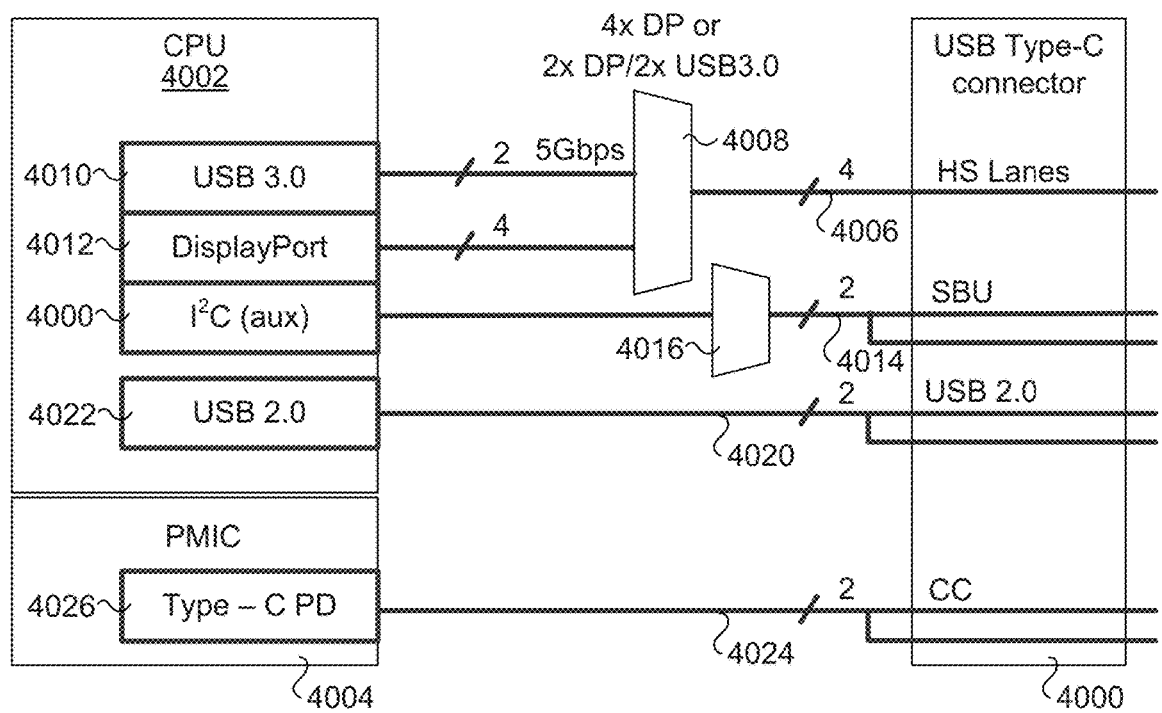
FIG. 40 is a schematic diagram illustration interface circuitry between a USB Type-C connector and a CPU and a PMIC, according to one embodiment.

FIG. 40 shows one embodiment of interface circuitry between a USB Type-C connector 4000, a CPU 4002, and a PMIC 4004. The four high-speed USB Type-C lanes 4006 are multiplexed via a multiplexer 4008, with two lines on the left-side of multiplexer 4008 coupled to a USB 3.0 interface 4010, while four lines are coupled to a DisplayPort interface 4012. The two Sideband Use (SBU) signals 4014 are coupled to a multiplexer 4016 which is used to selectively enable an I²C auxiliary interface 4018 to communicate with devices coupled to USB connector 4000. The two USB 2.0 signals 4020 are coupled to a USB 2.0 interface 4022. Meanwhile, the two control channel (CC) signals 4024 are coupled to a Type-C PD interface 4026 on PMIC 4004.

Figure 41A:
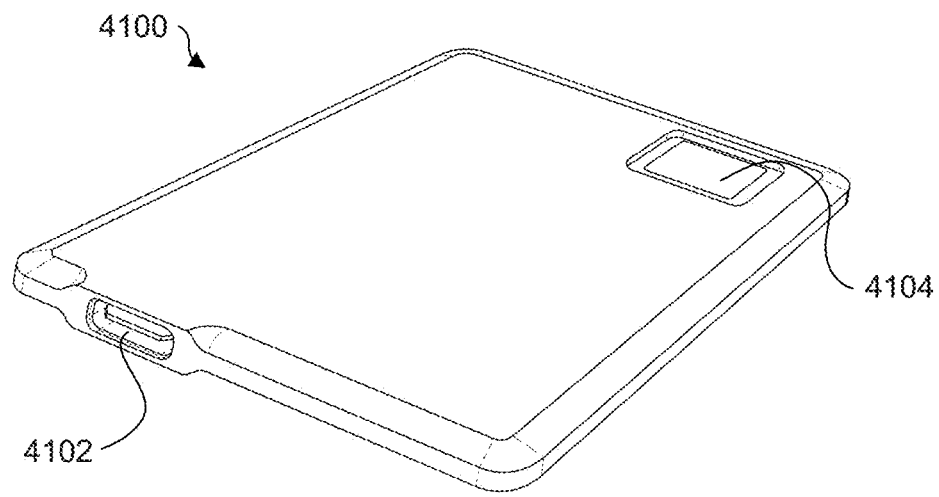
FIGS. 41a and 41b are perspective views of a computing card that includes a USB Type-C connector and a fingerprint reader, according to one embodiment.
Figure 41B:
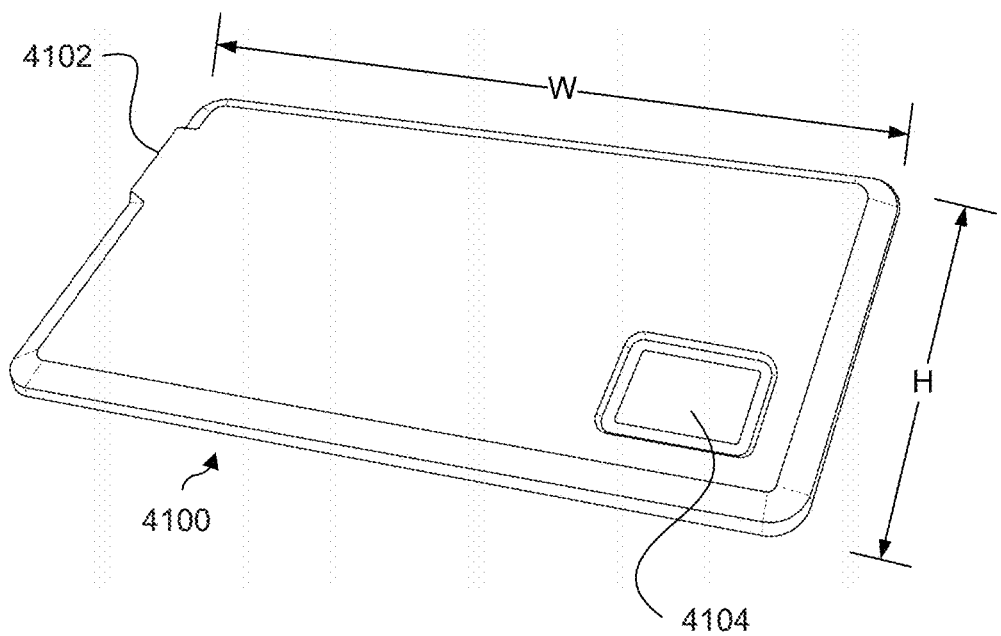

FIGS. 41a and 41b show perspective views of a computing card 4100 that includes a USB Type-C connector 4102 and a fingerprint reader 4104. Computing card 4100 further includes a circuit board including the circuitry and components of computing card 3900. In one embodiment the height (H) and width (W) of the computing card is approximately the same dimensions as a standard credit card, while the thickness is approximately four credit cards.

Figure 42:
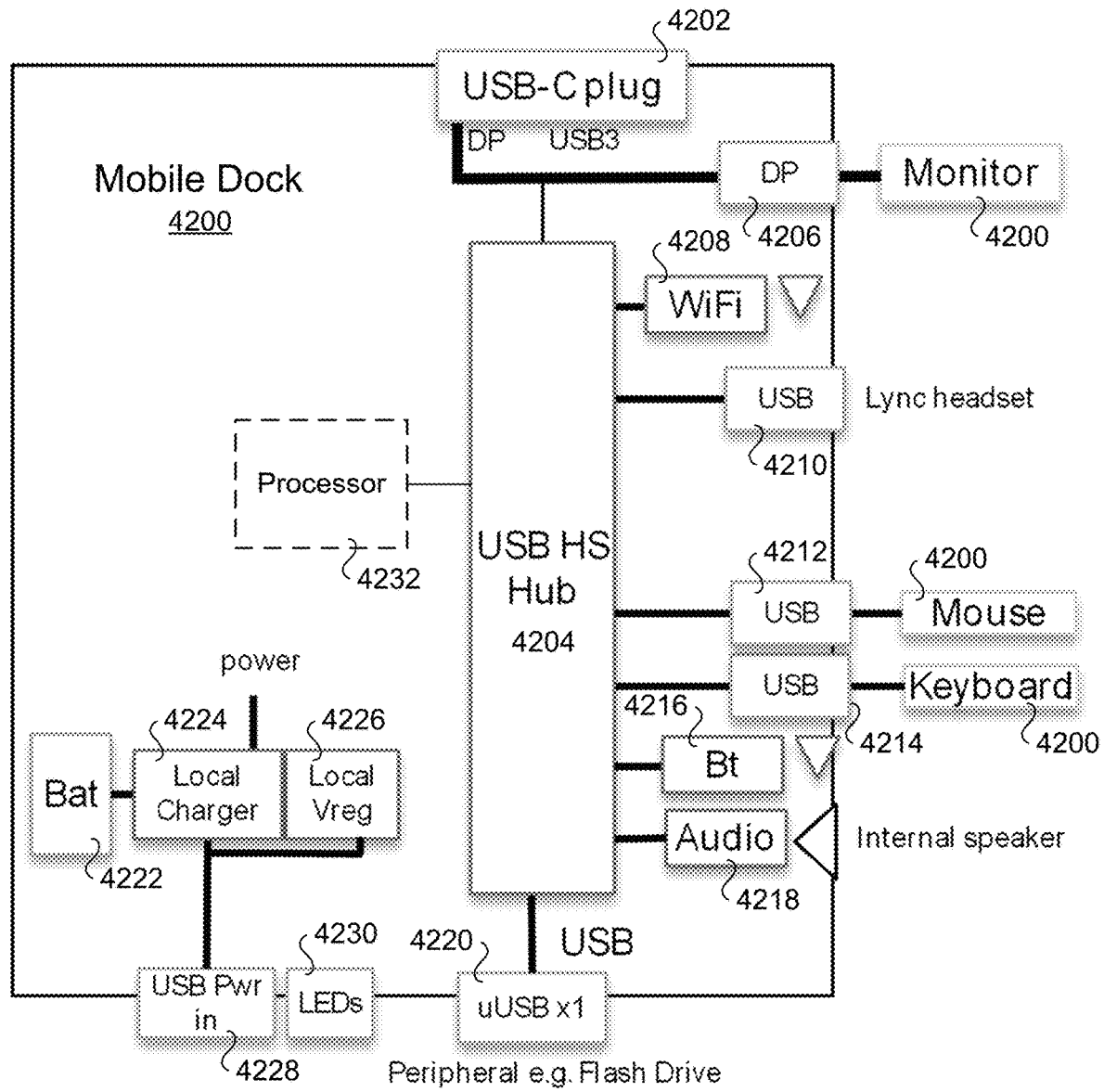
FIG. 42 is a schematic diagram of components and circuitry in one embodiment of a mobile dock.

FIG. 42 shows an embodiment of a mobile dock 4200 configured to interface with a computing card employing a USB Type-C interface. Mobile dock 4200 includes a USB-C plug 4202 that is communicatively coupled to a high-speed USB hub 4204 and a DisplayPort (DP) interface 4206 (e.g., using circuitry similar to that shown in FIG. 40). High-speed USB hub 4204 is coupled to a WiFi chip 4208, USB ports 4210, 4212, and 4214, a Bluetooth chip 4216, and audio chip 4218, and microUSB port 4220. Mobile dock 4200 further includes power system components and interfaces, including a battery 4222, a local charger 4224, a local voltage regulator 4226, a USB port 4228, and LEDs 4230.

Generally, in addition to the components shown in FIG. 42, a mobile dock will include embedded logic and circuitry for supporting various functions, including configuration functions. In one embodiment, a "smart" mobile dock 4200 includes a processor that runs embedded firmware or software (not shown) that enables the mobile dock to handle aspects of peripheral configuration and interfacing with a computing card in a manner that offloads much of the configuration tasks, as described below in further detail.

Figure 43:
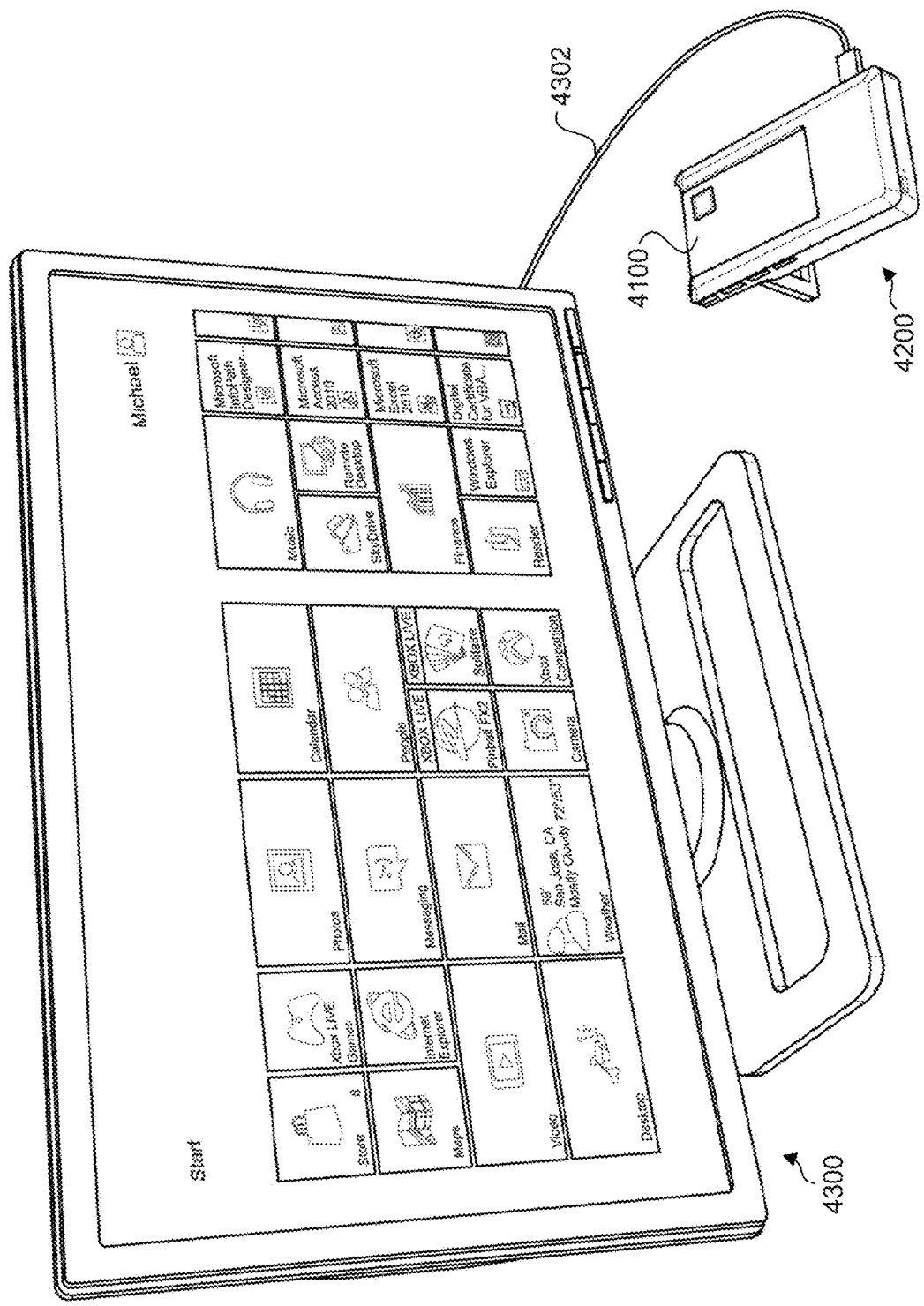
FIG. 43 is a diagram illustrating a computing card installed in a mobile dock that is coupled to a video monitor.

FIG. 43 shows an exemplary use case for a computing card under which a computing card 4100 is inserted into a slot in a dock 4200 that is connected to a monitor 4300 via a DisplayPort cable 4302. Under the use case, mobile dock 4200 would also be communicatively coupled to a keyboard and pointing device, such as a mouse (both not shown). For example, the keyboard and/or mouse could be Bluetooth enabled devices that are linked in communication with mobile dock 4200 over Bluetooth. Optionally, one or both of the keyboard and mouse may employ a wired connection, such as used by a USB keyboard or mouse.

The embodiment of FIG. 43 operates in a similar manner to a desktop computer having a keyboard and mouse and being coupled to a monitor, or a laptop or notebook computer coupled to an external display. In the illustrated example, computing card 4100 runs a full desktop version of an operating system (such as Windows 10 or a version of Linux), and includes drivers for use with various peripheral devices, such as monitors, keyboards, and pointing devices.

Figure 44:
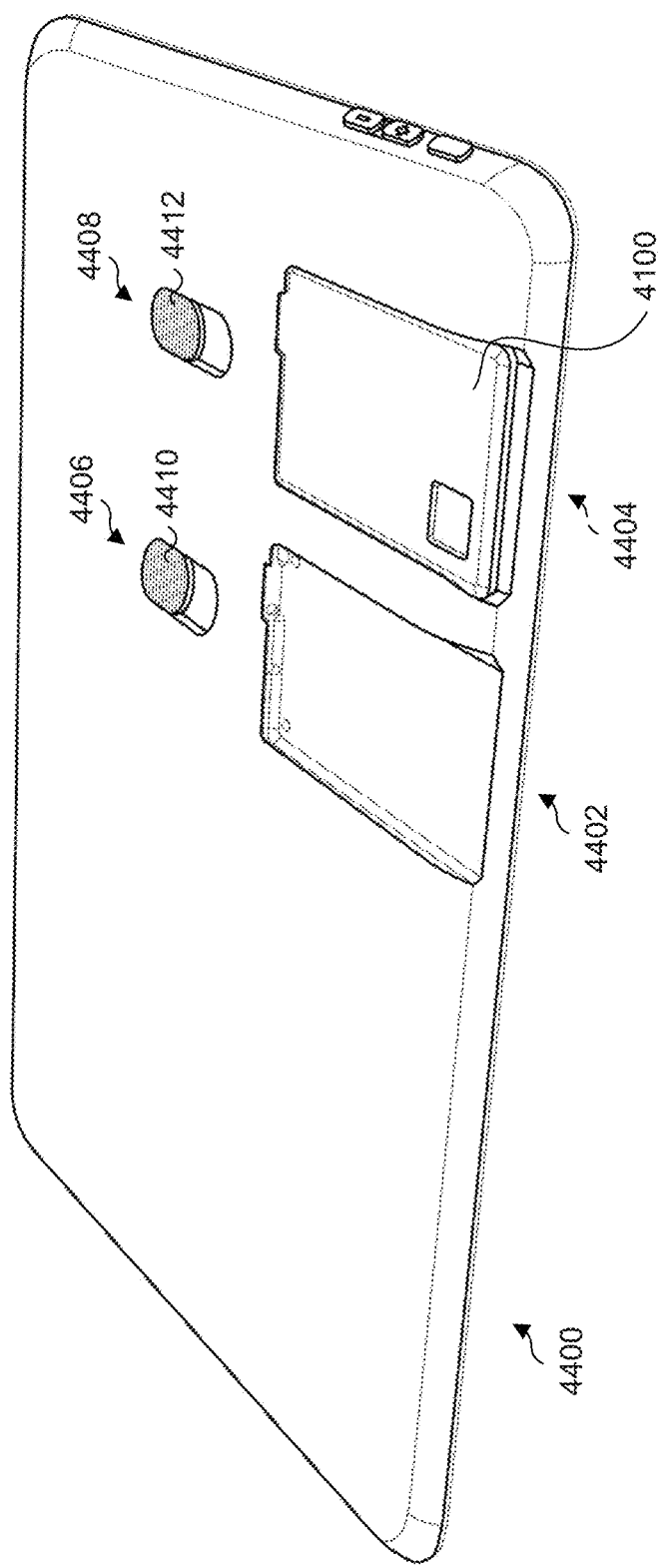
FIG. 44 shows an isometric view of the underside of one embodiment of a dual-slot tablet.

Another form factor for a host device is a tablet. Generally, a host tablet may include one or more slots configured to interface with one or more respective computing cards. For example, FIG. 44 shows the underside of a dual-slot tablet 4400 having a pair of slots 4402 and 4404 configured to receive a computing card 4100. An ejection mechanism 4406 and 4408 is provided for each of slots 4402 and 4404, whereby sliding one of ejectors 4408 and 4410 will cause a computing card in a corresponding slot 4402 or 4404 to be ejected.

In one embodiment, a computing card includes logic to automatically go into a sleep state upon being removed from a slot or dock. For example, in one embodiment the computing card goes into a deepest sleep state called s0i3 (corresponding to a state under which the least amount of power is consumed) when it is removed from the slot or from a dock. As an option, a computing card can also be put into a sleep state, including the s0i3 state, via a power switch for the slot the computing card is installed in. The computing card will also automatically "wake" from the s0i3 sleep state when inserted into a computing card slot in a host device.

Figure 45:
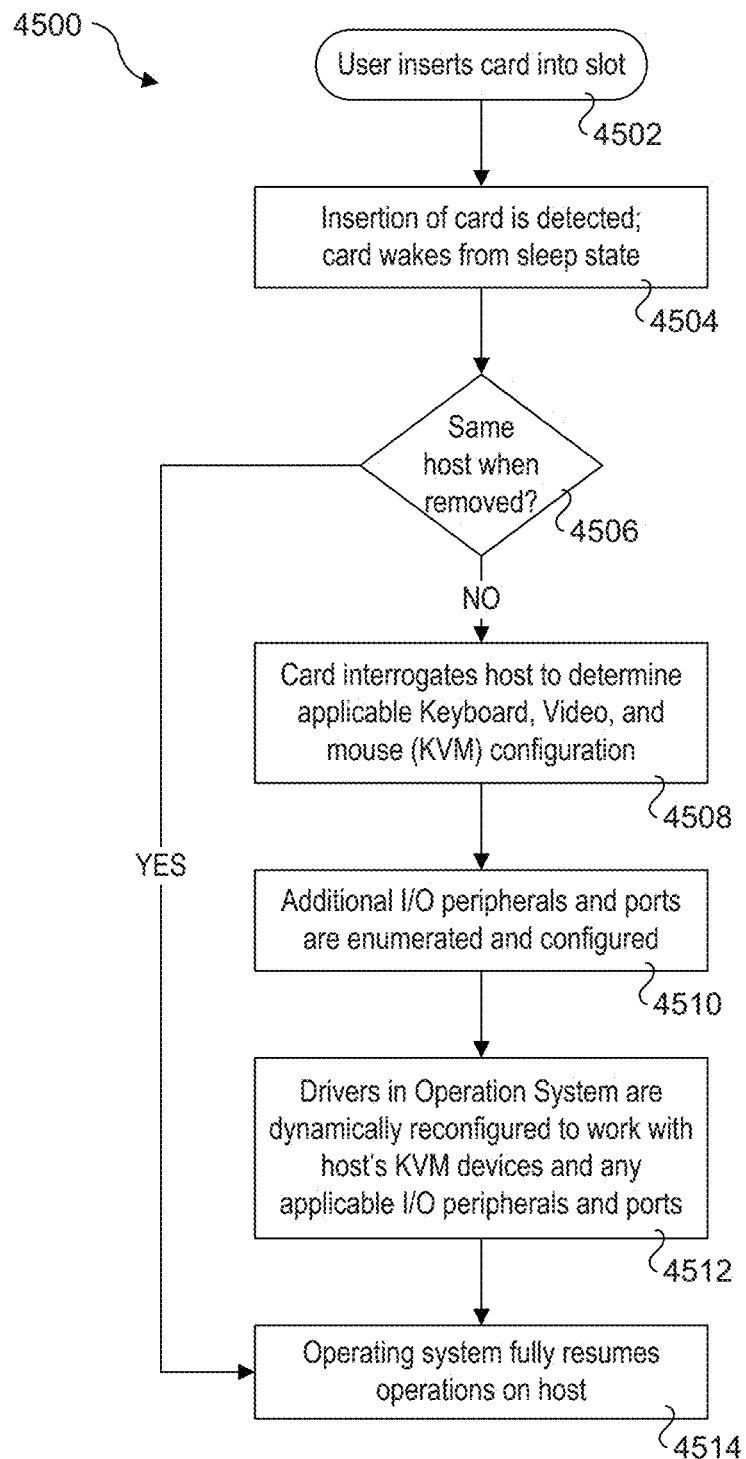
FIG. 45 is a flowchart illustrating operations and logic performed in response to a computing card that is currently in a sleep state being inserted into a computing card slot in a host apparatus or device.

FIG. 45 shows a flowchart 4500 that includes operations and logic performed in response to a computing card that is currently in a sleep state being inserted into a computing card slot in a host apparatus or device. The process begins in start block 4502 in which a user inserts the computing card into the slot. In a block 4504 the insertion of the card is detected by both the host and the card itself, and the card wakes from its sleep state and sets up communication with its host.

In a block 4506 a determination is made to whether the host apparatus or device is the same host from which the computing card was last removed. If it is the same host, there is no need to reconfigure any drivers, enabling the logic to proceed to a block 4514 in which the operating system of the computing card fully resumes operations on the host.

In one embodiment, the computing card and host are configured to support dynamic reconfiguration in a manner that enables the computing card to resume operations one a different host (than it was last used with) without requiring the computing card to be rebooted. Accordingly, if the host apparatus or device is different than the last host used with the computing card, the answer to decision block 4506 will be no, and the logic will proceed to a block 4508 in which the card will interrogate the host to determine applicable keyboard, video, and mouse (KVM) configuration. (It is noted that the 'M' is used by practice, but actually corresponds to the applicable pointing device, whether in fact that device is actually a mouse or some other input device, such as a trackpad.) Depending on the configuration of the host apparatus or device, some of this operation may be offloaded to the host device, with the host device figuring out what its KVM configuration is and providing corresponding configuration information to the computing card. For example, since a dual- or single-slot apparatus such as a laptop, notebook, Chromebook, or tablet will include a built-in display and one or more pointing devices (e.g., a clamshell apparatus may have both a touchpad and touchscreen, while a tablet will have a touchscreen), the KVM configuration information can be pre-generated in advance.

In the case of a mobile dock, various types of monitors having different resolutions and capabilities and different types of keyboards and input devices may be used. As a result, the KVM configuration information will generally be dynamically determined when the computing card is inserted into the slot in the mobile dock. In some embodiments, some of this task can be offloaded onto the mobile dock. For example, the mobile dock may be configured to be communicatively coupled with one or more KVM devices on its own (i.e., independent of whether a computing card is installed in the mobile dock. This may include both KVM devices connected via one or both of wired and wireless means (such as via a USB cable, Bluetooth, or other wireless link).

In addition to KVM devices, a host device may have one or more I/O peripherals and or ports that may be accessed by a computing card. Accordingly, in a block 4510 additional I/O peripherals and ports, as applicable, are enumerated and configured. Next, in a block 4512, applicable operating system drivers, including the KVM drivers and any applicable I/O peripherals and port drivers are dynamically reconfigured. This type of dynamic driver information is supported by various operating systems, including Windows 10 and some Linux OS's. In some embodiments, plug-n-play type devices and corresponding drivers may be used. For instance, it is common to have plug-n-play monitors, keyboards, and input devices. Once the appropriate drivers have been configured the logic proceeds to block 4514, where in the operating system resumes operations on the host apparatus or device.

In one embodiment, a computing card may keep KVM and other optional I/O peripheral and port configuration information for a mobile dock. For example, it is envisioned that a mobile dock might be used as a home dock that is normally connected to a monitor and has wired or wireless connections to keyboard and/or pointing devices (recognizing that many of today's monitors have touchscreens that may also be used for pointing device functionality). A mobile dock may also have a sleep state and/or or other operational modes that maintain wireless links in sleep or idle states when corresponding input devices have not been used for a while. In response to activation of such an input device (such as moving a mouse or entering a key or spacebar on the keyboard), the wireless link to the input device will awake and return to its normal operating state. In one embodiment, a mobile dock announces the plug-n-play capabilities of peripheral devices coupled to its ports and/or configuration information relating to currently free ports.

Under some embodiments, host apparatus and devices may be configured to have a universally unique identifier (UUID) that is used to identifier the host to a computing card. The computing card may maintain a lookup table or the like that links host UUIDs to configuration information for those hosts. Under this approach, when a computing card is installed in a host the UUID of the host is communicated to the computing card to help facilitate configuration of appropriate drivers for the host.

In addition to supporting switching between different operating systems, a dual-slot host device may be configured to support compute card cloning and migration. Under cloning, data on the card to be cloned is copied to a destination clone card. Generally, cloning will employ the same compute cards. Under a migration, the applications and data for a current computing card is migrated to a new computing card. Typically, the current and new computing cards will either be different (e.g., card to migrate to has faster hardware) and/or the new computing card has a newer version of the operating system.

Figure 46:
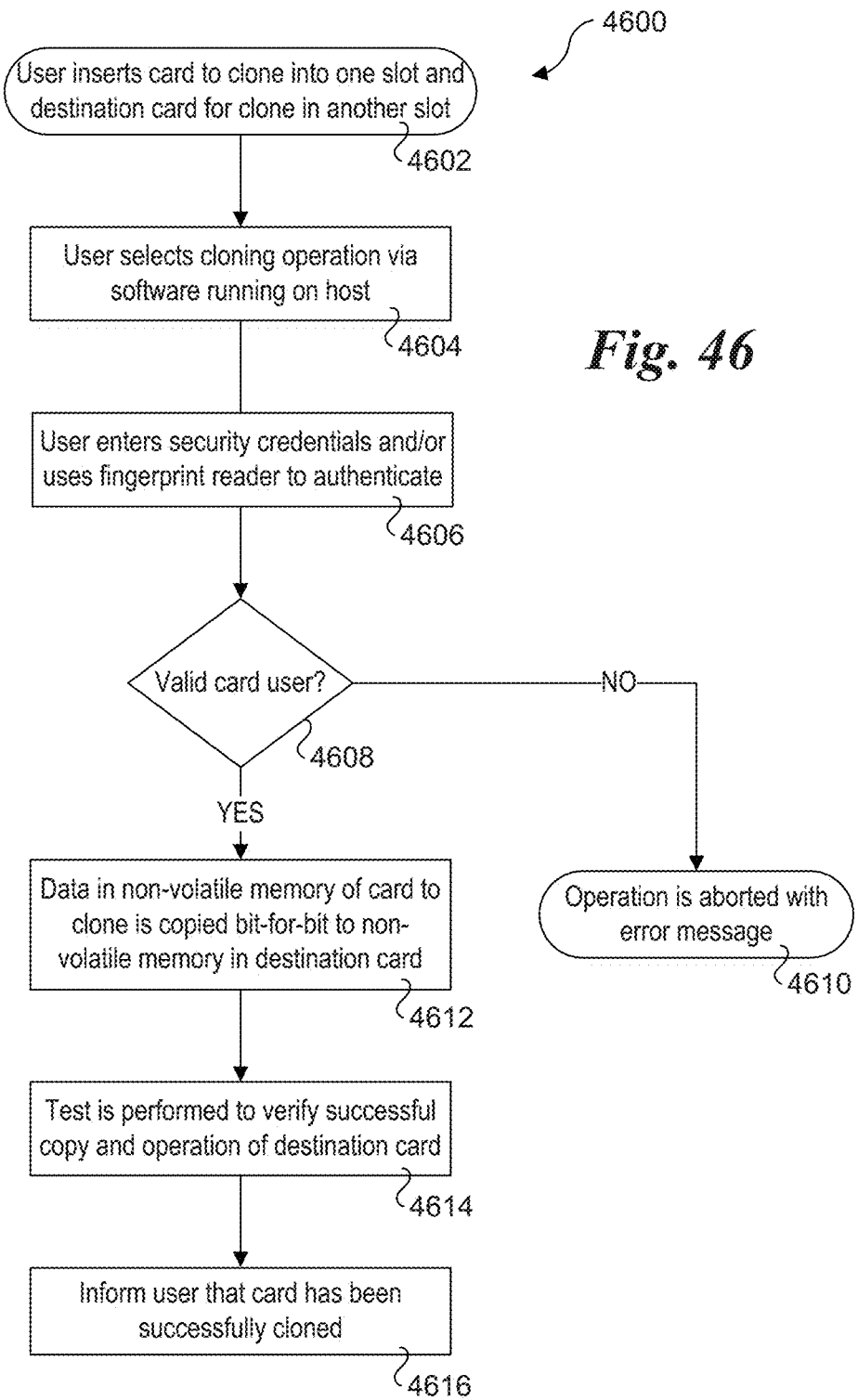
FIG. 46 is a flowchart illustrating operations and logic performed by one embodiment of a cloning process.

On embodiment of operations and logic performed to facilitate cloning of a compute card is shown in a flowchart 4600 of FIG. 46. The process begins in a start block 4602 in which the user has inserted the card to be cloned into one slot and the destination card that is to become the clone in the other slot. In a block 4604, the user selects a cloning operation via software running on the host. Under different approaches, the software used for the cloning operation may be loaded from the card to be cloned, or the host may have some built-in software that enables the host to perform certain operations, such as cloning, without executing software on one of the computing cards.

In a block 4606, the user enters security credentials and/or uses the fingerprint reader to authenticate the user as a valid user of the card. If the authentication fails, as determined in a decision block 4608, the operation is aborted and the user is shown an error message such as "user is unauthorized to perform cloning." If the user authentication is successful, the answer to decision block 4608 will be YES and the logic will proceed to a block 4612 in which data in non-volatile memory of the card is copied to corresponding non-volatile memory on the destination clone card using a bit-for-bit copy. Optionally, a block-wise copy scheme may be employed.

Once the copying of data has been completed, one or more tests are performed in a block 4614 to verify the data was correctly copied and operation of the destination clone card is correct. For example, a bit-wise or block-wise data comparison could be performed between the two cards. Also, various test may be run on the destination card to test its health and operation. Once the test(s) is/are successfully completed the user is informed the card has been successfully cloned in a block 4616.

Generally, a migration to a new computing card with the same operating system will involve similar operations to those show in flowchart 4600. In some instance, a bit-for-bit copy may not apply to at least a portion of the data to be copied to the destination clone card. For example, a new computing card may include more non-volatile memory or may employ a memory organization that is different than the card being cloned.

Figure 47:
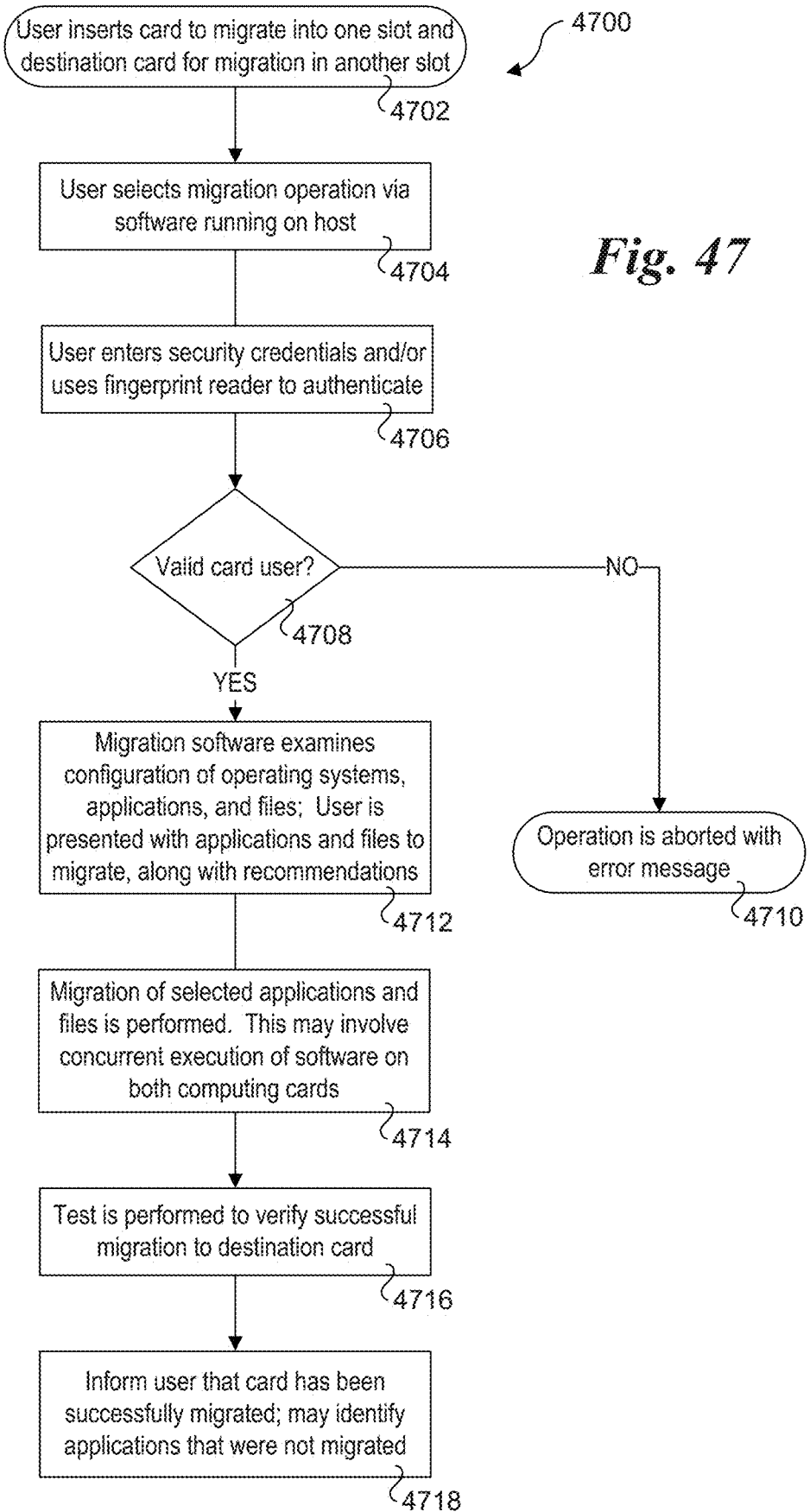
FIG. 47 is a flowchart illustrating operations and logic performed by one embodiment of a migration process.

Operations and logic for implementing one embodiment of a migration operation to a new operating system are shown in a flowchart 4700 of FIG. 47. The process begins in a start block 4702 in which the user has inserted the card to be migrated into one slot and the destination migration card to migrate to in the other slot. In a block 4704, the user selects a migration operation via software running on the host. Under one embodiment, migration is facilitated via software that is accessed from both the card being migrated and the destination card. Accordingly, in some embodiments a dual-slot host apparatus or device is configured to enable concurrent execution of software running on both computing cards. Generally, since only one computing card at a time is (natively) accessing the KVM devices for the host, an API if employed to enable the user to access software running on the computing card that isn't nominally "active," noting that during a migration both computing cards are operating in their own respective active modes.

In a block 4706, the user enters security credentials and/or uses the fingerprint reader to authenticate the user as a valid user of the card. If the authentication fails, as determined in a decision block 4708, the operation is aborted and the user is shown an error message such as "user is unauthorized to perform migration." If the user authentication is successful, the answer to decision block 4708 will be YES and the logic will proceed to a block 4712.

In block 4712, the migration software examines the configuration of operating systems, applications, and files on the source and destination computing cards. The user is the presented with applications and files to migrate, along with recommendations. For example, in one embodiment the migration includes migration of applications, which includes both migration of the executable code and data for the application as well as generation of new registry information on the destination migration card. In one embodiment an approach similar to that used by PC Mover® is employed. Under PC Mover®, there is migration code on both the source (migrated from) computer and the destination (migrated to) computer. Prior to running the migration, code is executed on the source computer to enumerate the applications installed on the source computer and to prepare the source computer for migration. During this process, the migration code is informed of the destination operating system, and a determination is made to which applications have been verified to pass a migration test between the version of the operating system on the source computer and the version of the operation system in the destination computer being migrated to. Under one embodiment, the user is presented with a list of application to migrate that includes indicia indicating which applications have been verified as successfully migrated be the software provider, which application have been verified as not to be successfully migrated, and which applications have yet to be confirmed.

Next, in a block 4712, the migration of selected applications and files is performed. In some embodiments, this will involve concurrent execution of software on both the source and destination computing cards. For example, a virtual network connection is established between the computing cards, and application code and data, is copied from the source computing card to the destination computing card in a similar manner used by PC Mover®. However, under the conventional usage of PC Mover® to migrate data between computers, PC Mover® migration code is run on each computer and there must be some sort of physical connection between the two computers that must be setup by the user. Under the dual-slot embodiments, any configuration information for setting up communication between the source and destination computing cards is automatically perform without requiring any user involvement.

After the migration has been completed, one or more test operations are performed in a block 4716 to verify successful migration to the destination card. If all of the test pass, the user is informed that the migration was successful in a block 4716. The user may also be presented with a list of applications selected by the user for migration that were not detected to be successfully migrated.

Figure 48:
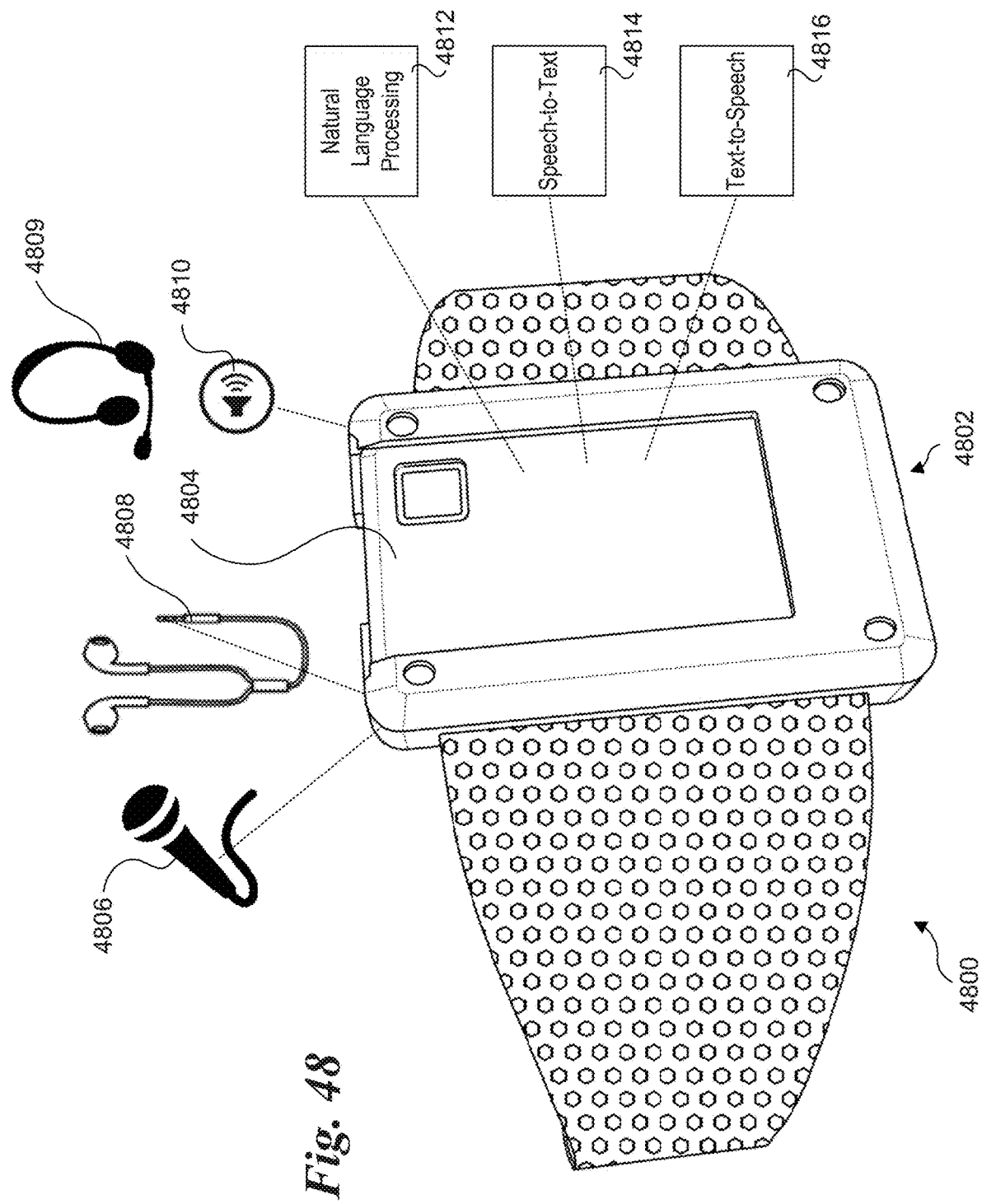
FIG. 48 is a schematic diagram of one embodiment of a smart armband.

Further details of one embodiment of a "smart" armband 4800 is shown in FIG. 48. Smart armband 4800 includes a cradle 4802 in which a computing card 4804 is installed. Cradle 4802 includes one or more microphones 4806, an earphone jack receptacle 4808 configured to interface with an earphone jack, and one or more optional speakers 4810. In one embodiment, the earphone jack receptacle 4808 is configured to receive signals from a microphone that is part of a portable headset 4809 or the like, such as provided with devices such as smartphones. Internally, computing card 4804 includes software code for performing natural language processing 4812, speech-to-text conversion 4814, and text-to-speech conversion 4816.

During operation of smart armband 4800, a user is enabled to control operations pertaining to things such as music playback via verbal control input, such as play "Let it be" or "Purple Rain," "skip," or "next," "back," etc. Basically, any physical control for music playback may be implemented using corresponding verbal commands.

Figure 49A:
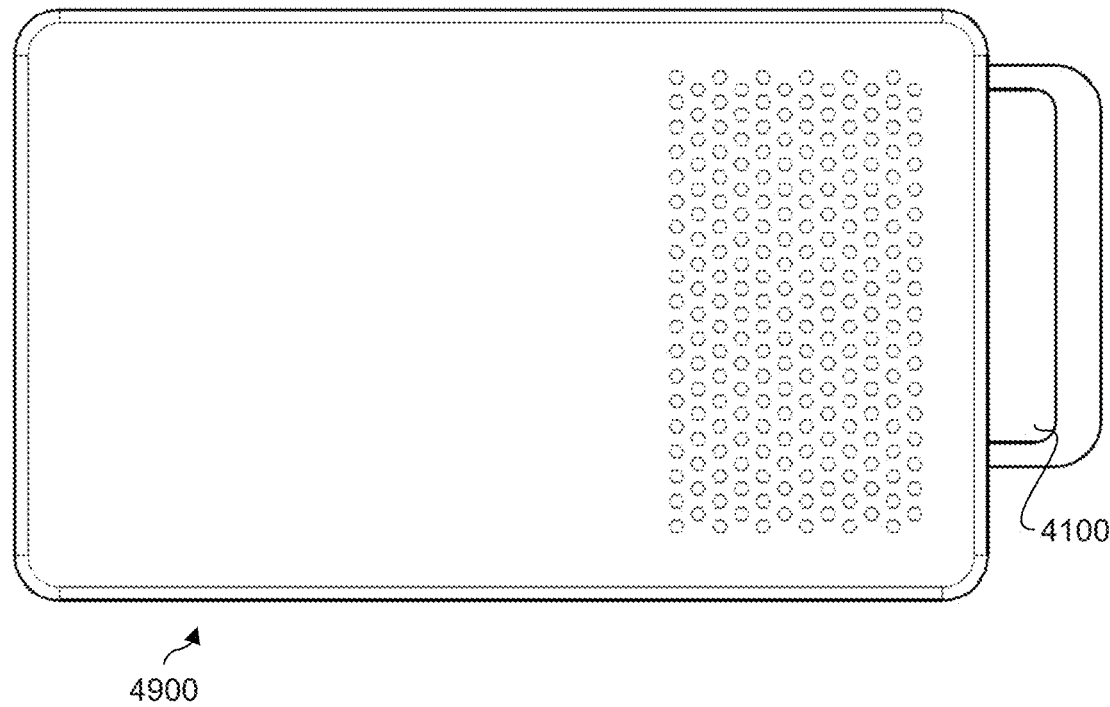
FIGS. 49a and 49b are plan and elevation views of a slim dock in which a computing card is inserted.
Figure 49B:
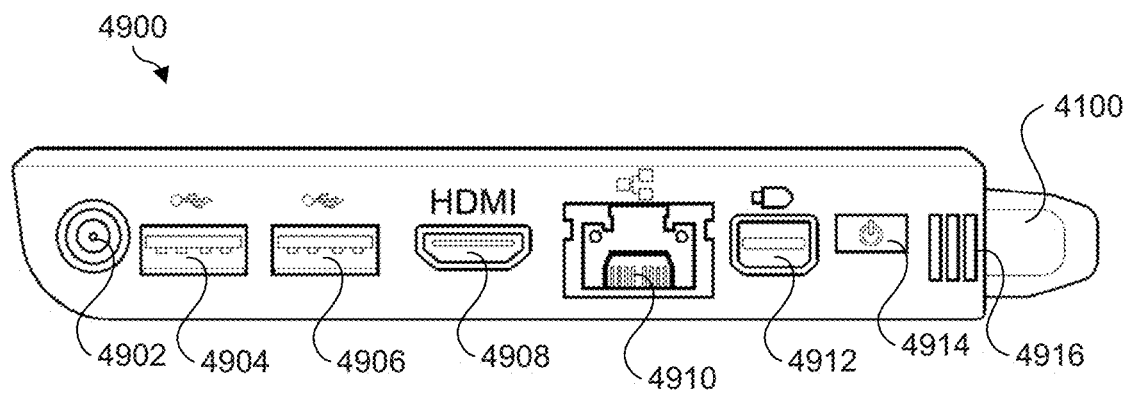

FIGS. 49*a* and 49*b* show plan and elevation views of a slim dock 4900 in which a computing card 4100 is inserted. Slim dock 4900 includes a DC power input 4902, a pair of USB ports 4904 and 4906, an HDMI port 4908, an RJ-45 Ethernet jack 4910, a DisplayPort 4912, and power button 4914, and LEDs 4916.

Branded Retailer Computing Card Model

Figure 50:
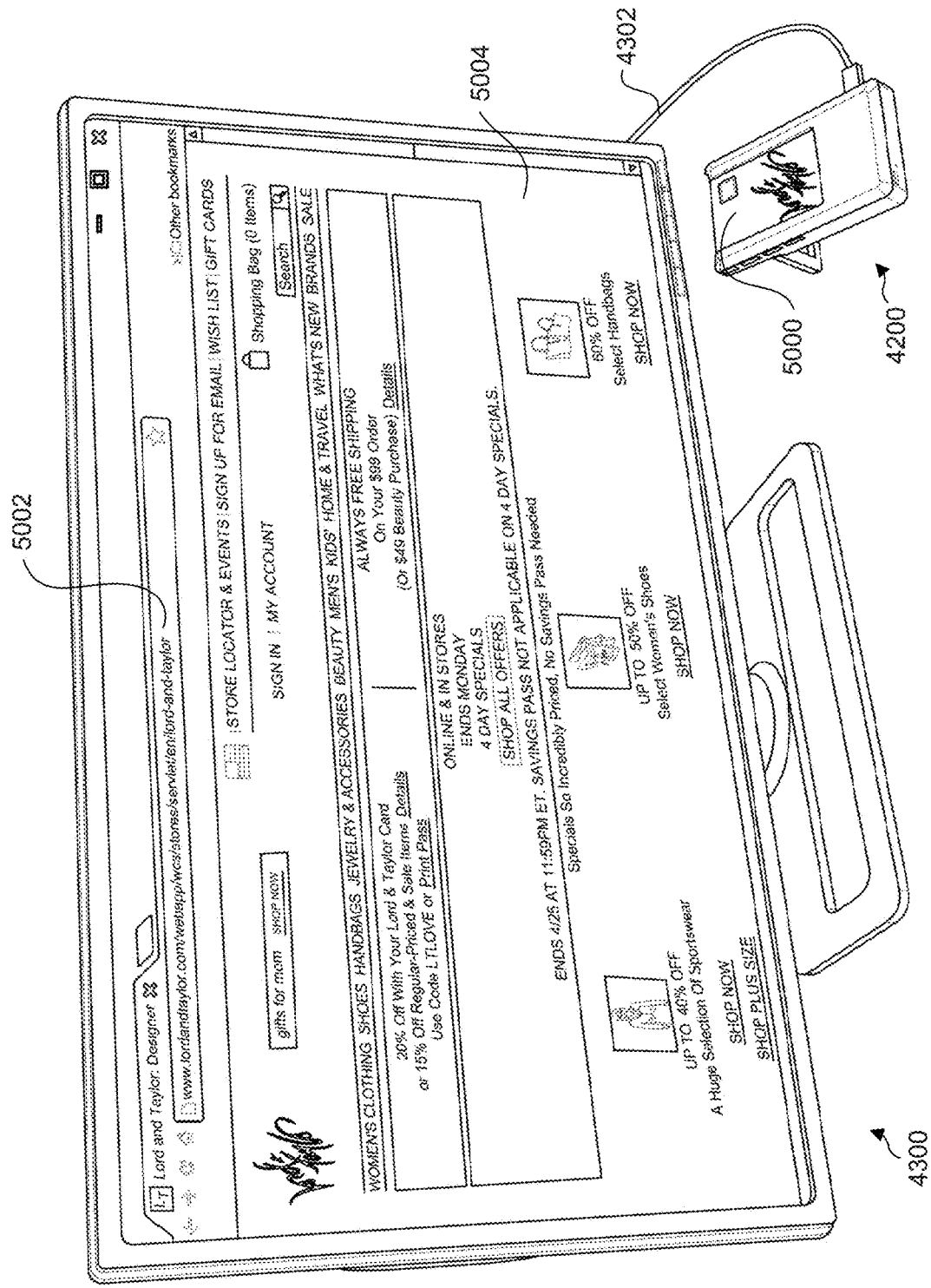
FIG. 50 is a diagram illustrating a branded retailer computing card installed in a mobile dock that is coupled to a video monitor, and further illustrating the Website for the branded retailer.

In one embodiment, a computing card is preconfigured by a branded retailer (or third-party for the branded retailer) to facilitate an enhanced retailer shopping experience. For example, FIG. 50 depicts usage of a Lord & Taylor® computing card 5000 installed in a dock 4200 connected to a monitor 4300 over a DisplayPort cable 4302. Under the branded retailer usage model, a user receives a branded computing card from a retailer or purchases a branded computing card from the retailer or another store in-person. In some instances, the price of the branded computing card is reduced (relative to the cost of non-branded computing cards with similar performance) or may even be free. In one embodiment, software on the computing card is configured to automatically launch the retailer's Website upon startup of the card. For example, in FIG. 50 the software has launched a browser using the URL 5002 for the Lord & Taylor® landing page 5004 (e.g., the page the browser is redirected to upon entry of lordandtaylor.com in the browser's address bar). The home page for the browser may also be preconfigured to use the retailer's home page or landing page.

In one embodiment, the user's login information is pre-populated based on user information associated with the card. In one embodiment purchases may be authenticated using the fingerprint reader, providing an extra layer of security. Each card has a UUID (such as user account number or alphanumeric string). In one embodiment, the UUID is used to track online usage of the computing card with the retailer. For example, a servlet for the Website may submit an HTTP request to the client host device asking for a UUID or during an initial handshake with the Website the UUID can be provided in an HTTP header or message.

Further aspects of the subject matter described herein are set out in the following numbered clauses:

1. A computing card, having approximately the same width and height dimensions as a standard credit card and configured to run a desktop operating system and one or more applications, the computing card further configured to:

run the operating system and at least one application when installed in a first host apparatus;

detect the computing card is removed from the first host apparatus, store a current operating state of the operating system and the at least one application, and put the computing card into a sleep state, in response to being installed into one of the first host apparatus or second host apparatus;

awake from the sleep state and resume operation of the operating system and the at least one application at the same state the operating system and the at least one application was in when the computing card was removed from the first host apparatus.

2. The computing card of clause 1, wherein the first host apparatus is associated with a first set of keyboard, video, and mouse (KVM) resources and the second host apparatus as associated with a second set of KVM resources wherein at least one of the keyboard, video, and mouse resources is different in the first and second sets of KVM resources, and wherein the computing card is further configured to reconfigure itself to use the second set of KVM resources in response to being installed in the second host apparatus.

3. The computing card of clause 1 or 2, wherein the computing apparatus is further configured to, when installed in the second host apparatus:

interrogate the second host apparatus to determine each of the KVM resources associated with the second host apparatus; and reconfigure at least one operating system driver associated with a KVM resource associated with the second host apparatus that is different than a corresponding KVM resource associated with the first host apparatus.

4. The computing card of any of the preceding clauses, wherein the computing apparatus includes a USB Type-C connector and is configured to mate with a USB Type-C plug when installed in a host apparatus.

5. The computing card of clause 4, wherein the computing apparatus is configured to generate DisplayPort graphic signals that are sent to a video display device via the USB Type-C connector.

6. The computing card of any of the preceding clauses, wherein at least one of the first and second host apparatus comprises a clamshell apparatus having a built-in keyboard, video screen, and at least one pointing device, and the computing card is configured to be installed in a slot in the clamshell apparatus.

7. The computing card of any of the preceding clauses, wherein the computing card is configured to be installed into a first slot of a dual-slot host apparatus having a second computing card installed in a second slot, and wherein the computing card includes logic for facilitating cloning of the computing card to the second computing card.

8. The computing card of any of the preceding clauses, wherein the computing card is configured to be installed into a first slot of a dual-slot host apparatus having a second computing card installed in a second slot, and wherein the computing card includes logic for facilitating a migration to the second computing card.

9. The computing card of any of the preceding clauses, wherein the computing card is configured to be installed into a first slot of a dual-slot host apparatus having a second computing card installed in a second slot, and wherein the computing card includes logic for facilitating a migration for the second computing card to the computing card.

10. A computing card, comprising:

a housing, containing a main board having a plurality of components mounted thereto and wiring pathways electrically coupling the plurality of components, the components including, a Universal Serial Bus (USB) Type-C connector;

a processor System on a Chip (SoC) including a graphics processor to generate video graphics data and a plurality of Input/Output (I/O) interfaces including a DisplayPort interface and at least one USB interface;

interface circuitry, operatively coupling signal lines associated with the USB Type-C connector to corresponding interfaces on the processor SoC including the DisplayPort interface and at least one USB interface;

dynamic random access memory (DRAM), communicatively coupled to the processor SoC;

a non-volatile storage device, operatively coupled to the processor SoC, having instructions stored therein configured to be executed on the processor SoC, the instructions including a desktop operating system, wherein the instructions, upon execution, enable the computing card when coupled to a USB Type-C plug in a host apparatus to, send DisplayPort video signals to at least one of a video screen built-into the host apparatus or a video monitor communicatively coupled to the host apparatus; and receive keyboard input from one of a keyboard build into host apparatus or a keyboard communicatively coupled to the host apparatus; and receive pointer device input from at least one of a pointing device built into the host apparatus or a pointing device communicatively coupled to the host apparatus.

11. The computing card of clause 10, wherein the computing card has a width and height that is approximately the same as a standard credit card.

12. The computing card of clause 10 or 11, wherein the instructions include instructions corresponding to a desktop operating system.

13. The computing card of clause 12, wherein the desktop operating system is a Microsoft Windows operating system.

14. The computing card of clause 12, wherein the instructions further include one or more applications and wherein execution of the instructions enables the computing card to:

facilitate operation of the operating system and at least one application using a host apparatus;

in response to removing the computing card from the first host apparatus, storing a current state of the operating system and at least one application and putting the processor SoC into a sleep state;

in response to re-installing the computing card in the host apparatus, waking the processor SoC and resuming operation of the operating system and the at least one application at the same state the operating system and the at least one application was in when the computing card was removed from the host apparatus.

15. The computing card of clause 12, wherein the instructions further include one or more applications and wherein execution of the instructions enables the computing card to:

facilitate operation of the operating system and at least one application using a first host apparatus, the first host apparatus having associated keyboard, video, and mouse (KVM) resources comprising one of a built-in keyboard, video screen, and at least one pointing device or an external keyboard, video monitor, and at least one pointing device communicatively coupled to the first host apparatus;

in response to removing the computing card from the first host apparatus, storing a current state of the operating system and at least one application and putting the processor SoC into a sleep state;

in response to installing the computing card in a second host apparatus having associated KVM resources including at least one of a keyboard, video, or mouse resource that is different than the KVM resources for the first host apparatus, waking the processor SoC, reconfiguring the computing card to operate with the KVM resources associated with the second host apparatus; and resuming operation of the operating system and the at least one application at the same state the operating system and the at least one application was in when the computing card was removed from the first host apparatus.

16. The computing card of clause 15, wherein execution of the instructions further enables the computing card to:

interrogate the second host apparatus to determine each of the KVM resources associated with the second host apparatus; and reconfigure at least one operating system driver associated with a KVM resource associated with the second host apparatus that is different than a corresponding KVM resource associated with the first host apparatus.

17. The computing card of any of clauses 10-16, wherein the processor SoC supports execution of x86 instructions.

18. The computing card of any of clauses 10-17, further comprising a power subsystem including a battery, battery charging circuitry, and voltage regulation circuitry, configured to provide power to components on the computing card and having at least one component operatively coupled to the processor SoC and at least one component operatively coupled to the USB Type-C connector.

19. The computing card of any of clauses 10-18, wherein the power subsystem includes a power management integrated circuit (PMIC), and the interface circuitry couples the PMIC to signal lines associated with the USB Type-C connector.

20. The computing card of any of clauses 10-19, further comprising a fingerprint reader, communicatively coupled to the processor SoC.

21. A system, comprising:

a computing card host apparatus including a keyboard, a video screen, and at least one of a touchpad and a touchscreen associated with the video screen and having at least one computing card slot;

a computing card, having approximately the same width and height dimensions as a standard credit card and configured to run a desktop operating system and one or more applications, the computing card further configured to, when installed in a computing card slot of the computing card host apparatus, interrogate the computing card host apparatus to determine configuration information corresponding to the keyboard, video screen, and the at least one touchpad and touchscreen; and configure drivers in the operating system to enable the computing card to operate with the keyboard, video screen, and the at least one touchpad and touchscreen.

22. The system of clause 21, wherein the computing card host apparatus comprises a clamshell apparatus having a physical keyboard and a video screen integrated into a folding lid.

23. The system of clause 21 or 22, wherein the computing card host apparatus comprises a tablet apparatus having a touchscreen and implementing a virtual keyboard via the touchscreen.

24. The system of clause of any of clauses 21-23, wherein the computing card is configured to:

run the operating system and at least one application when installed in a slot of the computing card host apparatus;

detect the computing card is removed from the computing card host apparatus, store a current operating state of the operating system and the at least one application, and put the computing card into a sleep state, in response to being installed into a slot in the computing card host apparatus, awake from the sleep state and resume operation of the operating system and the at least one application at the same state the operating system and the at least one application was in when the computing card was removed from the computing card host apparatus.

25. The system of any of clauses 21-24, wherein the computing card host apparatus includes first and second computing card slots, and wherein the computing card is configured to create a clone of itself by performing a cloning operation with a second computing card when the first and second computing cards are installed in respective computing card slots in the computing card host apparatus.

26. A mobile computing device comprising a processor operatively coupled at least one of a wired and wireless communication interface and operatively coupled to memory in which computer readable instructions are stored which when executed by the processor causes the mobile computing device to:

establish a linked connection with a second device having a display and an operating system employing native graphics commands to render content to the display; and throwing native graphics commands to the second device.

27. The mobile computing device of clause 26, wherein the second device comprises an Android device and the native graphics commands include OpenGL commands.

28. The mobile computing device of clause 27, wherein the native graphics commands include Skia commands;

29. The mobile computing device of any of clauses 26-28, wherein the computer readable instruction include a Microsoft Windows operating system.

30. The mobile computing device of clause 29, wherein the Microsoft Windows operating system comprising a desktop operating system.

31. The mobile computing device of clause 29, wherein the native graphics commands include DirectX graphics commands.

32. The mobile computing device of clause 31, wherein the native graphics commands include at least one of GDI (Graphics Display Interface) and GDI+ drawing commands.

33. The mobile computing device of clause 29, wherein the second device comprises an Android device and the native graphics commands native Android graphics commands.

34. The mobile computing device of clause 33, wherein the instructions include a module configured to convert native Windows graphics commands including DirectX commands into native Android graphics commands including OpenGL commands and throw the OpenGL commands to the Android device;

35. The mobile computing device of any of clauses 26-34, wherein said at least one of a wired and wireless communication interface comprise a Universal Serial Bus (USB)

interface, and the mobile computing device is linked to the second device via a USB cable.

36. The mobile computing device of clause 35, wherein the link between the mobile computing device and the second computing device comprises one or more sockets implemented over the USB link.

37. The mobile computing device of clause any of clauses 26-36, wherein said at least one of a wired and wireless communication interface comprise a High-Definition Media Interface (HDMI) interface.

38. The mobile computing device of clause any of clauses 26-37, wherein said at least one of a wired and wireless communication interface comprise an IEEE 802.11-based wireless interface.

39. The mobile computing device of clause 38, wherein the mobile computing device and the second device are coupled via a peer-to-peer Wi-Fi Direct link.

40. The mobile computing device of any of clauses 26-39, wherein the mobile computing device and the second device are coupled via one of a INTEL Wireless Display (WiDi) connection, and an INTEL WiGig (wireless with gigabit capability) connection.

41. The mobile computing device of any of clauses 26-40, wherein the processor and memory are mounted on a processor board having width and height dimension that are approximately the size of a credit card or smaller.

42. The mobile computing device of any of clauses 26-41, wherein the mobile computing device does not include an integrated display.

43. The mobile computing device of clause 42, wherein the instructions include a plurality of applications, and where execution of the instructions enables the mobile computing device to receive inputs from the second device to enable remote control of plurality of applications.

44. The mobile computing device of any of clauses 26-43, wherein the processor supports execution of x86 instructions.

45. The mobile computing device of any of clauses 26-44, wherein the processor includes a plurality of low-power cores.

46. The mobile computing device of any of clauses 26-45, wherein the processor includes a plurality of little cores and at least one big core, and the processor is configured to operate in a reduced power mode under which execution of instructions is performed by at least one of the plurality of little cores, and wherein the processor is further configured to operate in a high performance mode under which execution of instructions is performed by at least one big core.

47. A mobile computing device, comprising:
a processor board, including,
a processor;
at least one of a wired and wireless communication interface operatively coupled to the processor;
memory, operatively coupled to the processor; and
non-volatile storage in which,
a plurality of instructions comprising an operating system are stored,
a plurality of instructions comprising applications configured to run on the operating system are stored; and
a plurality of instruction comprising a plurality of software modules are stored,
wherein, execution of the instructions enable the mobile computing device to,
establish a communication link with a second device;
retrieve data from the second device and data generated by one or more of the plurality of applications; and
present a unified view of the data retrieved from the second device and the data generated by the one or more of the plurality of applications.

48. The mobile computing device of clause 47, wherein the plurality of modules includes a file caching agent that syncs data that is generated and/or retrieved from the mobile computing device with one or more cloud-hosted data services.

49. The mobile computing device of clause 47 or 48, wherein the operating system in the mobile computing device is a first type of operating system that is different than an operating system used by the second mobile computing device.

50. The mobile computing device of any of clauses 47-49, wherein the processor board has width and height dimension that are approximately the size of a credit card or smaller, and the operating system comprises a kernel components corresponding to a full-version of a Microsoft Windows operating system configured to be implemented on a desktop or laptop computer.

51. The mobile computing device of any of clauses 47-50, wherein execution of the instructions enables the mobile computing device to:
receive sensor data from a plurality of sensors via the at least one of a wired and wireless communication interface; and
securely store the sensor data on the mobile computing device.

52. The mobile computing device of clause 51, wherein execution of the instructions further enables the mobile computing device to:
process at least a portion of the sensor data; and
enable a user to selectively publish a portion of the processed sensor data to a cloud-hosted service.

53. The mobile computing device of clause 51, wherein execution of the instructions further enables the mobile computing device to:
process at least a portion of the sensor data; and
generate recommendations to a user of the mobile computing device based on the sensor data that is processed.

54. The mobile computing device of clause 53, wherein a portion of the instruction comprises an analytics engine that is configured to receive analytics of data from a cloud-based service and process the analytics of data to generate one or more user recommendations.

55. The mobile computing device of any of clauses 47-54, wherein the instructions include a secure device data management module that enables the mobile computing device, when the instructions are executed, to access data from a plurality of different types of devices and securely store the data that is accessed on a least one of the mobile computing device and a cloud-based storage service accessible to the mobile computing device.

56. The mobile computing device of clause 55, wherein execution of the secure device data management module enables the mobile computing device to access data from a plurality of different cloud-based services and securely store the data that is accessed on a least one of the mobile computing device and a cloud-based storage service accessible to the mobile computing device.

57. The mobile computing device of any of clauses 47-56, wherein the instructions include an integrator and analytics engine and a plurality of Application Program Interfaces (APIs) that are configured, upon execution, to enable the mobile computing device to:

receive inputs from a plurality of sensors;
integrate and analyze the inputs from the plurality of sensors;
output data that has been at least one of integrated and analyzed to the plurality of APIs,
wherein the plurality of APIs are configured to enable third-party applications to access the data that is output to the APIs.

58. The mobile computing device of clause 57, wherein execution of the instructions enable the mobile computing device to implement a personal analytic usage model that includes:
collecting sense data from a plurality of usage categories;
integrating the collected sense data across at least two of the plurality of usage categories; and
generating recommendations for each of the plurality of usage categories.

59. The mobile computing device of any of clauses 47-58, wherein the mobile computing device does not include an integral display, and wherein the unified view of the data is presented by the mobile computing device throwing graphics commands to the second device.

60. The mobile computing device of clause 59, wherein the mobile computing device is configured to throw native Windows graphics commands including DirectX commands to the second device.

61. The mobile computing device of clause 59, wherein second device is an Android device that includes an Android graphics catcher, wherein the operating system comprises a Microsoft Windows operating system, and wherein the mobile computing device is configured to convert native Windows graphics commands including DirectX commands into native Android graphics commands including OpenGL commands and throw the OpenGL commands to the Android graphics catcher.

62. The mobile computing device of any of clauses 47-61, wherein the at least one of a wired and wireless communication interface operatively coupled to the processor comprises a Universal Serial Bus (USB) interface, and wherein establishing a communication link with a second device comprises implementing at least one socket over a USB link between the mobile computing device and the second device.

63. The mobile computing device of any of clauses 47-62 wherein the mobile computing device comprises a computing card including a housing in which the processor board is disposed, wherein the processor board includes an edge connector and the housing is configured such that the edge connector is external to the housing, and the computing card has width and height dimension that are approximately the size of the width and height of a credit card or smaller 64. The mobile computing device of any of clauses 47-64, wherein the processor supports execution of x86 instructions.

65. The mobile computing device of any of clauses 47-64, wherein the processor includes a plurality of little cores and at least one big core, and the processor is configured to operate in a reduced power mode under which execution of instructions is performed by at least one of the plurality of little cores, and wherein the processor is further configured to operate in a high performance mode under which execution of instructions is performed by at least one big core.

66. The mobile computing device of any of clauses 47-65, wherein the processor includes a plurality of low-power cores.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A computing card, including a processor and memory and having approximately the same width and height dimensions as a standard credit card and configured to run a desktop operating system and one or more applications, the computing card further configured to:
   run the operating system and at least one application on the processor when installed in a first host apparatus;
   detect the computing card is removed from the first host apparatus, store a current operating state of the operating system and the at least one application in the memory, and put the computing card into a sleep state, in response to being installed into one of the first host apparatus or second host apparatus;
   awake from the sleep state and resume operation of the operating system and the at least one application on the processor at the same state the operating system and the at least one application was in when the computing card was removed from the first host apparatus.

2. The computing card of claim 1, wherein the first host apparatus is associated with a first set of keyboard, video, and mouse (KVM) resources and the second host apparatus as associated with a second set of KVM resources wherein at least one of the keyboard, video, and mouse resources is different in the first and second sets of KVM resources, and wherein the computing card is further configured to reconfigure itself to use the second set of KVM resources in response to being installed in the second host apparatus.

3. The computing card of claim 1, wherein the computing apparatus is further configured to, when installed in the second host apparatus:
   interrogate the second host apparatus to determine each of the KVM resources associated with the second host apparatus; and
   reconfigure at least one operating system driver associated with a KVM resource associated with the second host apparatus that is different than a corresponding KVM resource associated with the first host apparatus.

4. The computing card of claim 1, wherein the computing apparatus includes a USB Type-C connector and is configured to mate with a USB Type-C plug when installed in a host apparatus.

5. The computing card of claim 4, wherein the computing apparatus is configured to generate DisplayPort graphic signals that are sent to a video display device via the USB Type-C connector.

6. The computing card of claim 1, wherein at least one of the first and second host apparatus comprises a clamshell apparatus having a built-in keyboard, video screen, and at least one pointing device, and the computing card is configured to be installed in a slot in the clamshell apparatus.

7. The computing card of claim 1, wherein the computing card is configured to be installed into a first slot of a dual-slot host apparatus having a second computing card installed in a second slot, and wherein the computing card includes logic for facilitating cloning of the computing card to the second computing card.

8. The computing card of claim 1, wherein the computing card is configured to be installed into a first slot of a dual-slot host apparatus having a second computing card installed in a second slot, and wherein the computing card includes logic for facilitating a migration to the second computing card.

9. The computing card of claim 1, wherein the computing card is configured to be installed into a first slot of a dual-slot host apparatus having a second computing card installed in a second slot, and wherein the computing card includes logic for facilitating a migration for the second computing card to the computing card.

10. A system, comprising:

a computing card host apparatus including a keyboard, a video screen, and at least one of a touchpad and a touchscreen associated with the video screen and having at least one computing card slot;

a computing card, including a processor and memory and having approximately the same width and height dimensions as a standard credit card and configured to run a desktop operating system and one or more applications on the processor, the computing card further configured to, when installed in a computing card slot of the computing card host apparatus, interrogate the computing card host apparatus to determine configuration information corresponding to the keyboard, video screen, and the at least one touchpad and touchscreen; and configure drivers in the desktop operating system on the computing card to enable the computing card to operate with the keyboard, video screen, and the at least one touchpad and touchscreen.

11. The system of claim 10, wherein the computing card host apparatus comprises a clamshell apparatus having a physical keyboard and a video screen integrated into a folding lid.

12. The system of claim 10, wherein the computing card host apparatus comprises a tablet apparatus having a touchscreen and implementing a virtual keyboard via the touchscreen.

13. The system of claim 10, wherein the computing card is configured to:

run the operating system and at least one application on the processor when installed in a slot of the computing card host apparatus;

detect the computing card is removed from the computing card host apparatus, store a current operating state of the operating system and the at least one application in the memory, and put the computing card into a sleep state, in response to being installed into a slot in the computing card host apparatus, awake from the sleep state and resume operation of the operating system and the at least one application on the processor at the same state the operating system and the at least one application was in when the computing card was removed from the computing card host apparatus.

14. The system of claim 10, wherein the computing card host apparatus includes first and second computing card slots, and wherein the computing card is configured to create a clone of itself by performing a cloning operation with a second computing card when the first and second computing cards are installed in respective computing card slots in the computing card host apparatus.

* * * * *